(12) United States Patent
D'Souza et al.

(10) Patent No.: US 10,127,056 B2
(45) Date of Patent: Nov. 13, 2018

(54) AUTOMATIC APPLICATION WIZARD

(71) Applicant: Honeywell International Inc., Morristown, NJ (US)

(72) Inventors: Aaron Francis D'Souza, Bangalore (IN); Lavanya Bhadriraju, Bangalore (IN); Soumya Ramesh, Bangalore (IN); Thejasvini Shivanagendra, Bangalore (IN); Gutha Stalin Sanghamitra, Bangalore (IN); Subramanya Tavarekere Nagaraj, Bangalore (IN); Kevin B. Moore, Chaska, MN (US)

(73) Assignee: Honeywell International Inc., Morris Plains, NJ (US)

( * ) Notice: Subject to any disclaimer, the term of this patent is extended or adjusted under 35 U.S.C. 154(b) by 274 days.

(21) Appl. No.: 14/639,939

(22) Filed: Mar. 5, 2015

(65) Prior Publication Data

US 2015/0248300 A1 Sep. 3, 2015

Related U.S. Application Data

(63) Continuation of application No. 13/092,062, filed on Apr. 21, 2011.

(51) Int. Cl.
*G06F 3/048* (2013.01)
*G06F 9/44* (2018.01)
*G06F 3/0481* (2013.01)
*G06F 3/0484* (2013.01)
*G06F 9/451* (2018.01)

(52) U.S. Cl.
CPC .......... *G06F 9/4446* (2013.01); *G06F 3/0481* (2013.01); *G06F 3/0484* (2013.01); *G06F 9/453* (2018.02)

(58) Field of Classification Search
CPC .............................. G06F 9/4446; G06F 3/0481
See application file for complete search history.

(56) References Cited

U.S. PATENT DOCUMENTS

| | | | |
|---|---|---|---|
| 6,502,234 B1 | 12/2002 | Gauthier et al. | |
| 6,560,776 B1 | 5/2003 | Breggin et al. | |
| 6,574,791 B1 | 6/2003 | Gauthier et al. | |
| 6,871,340 B1 | 3/2005 | Gillis | |
| 7,117,451 B2 | 10/2006 | Sielken | |

(Continued)

OTHER PUBLICATIONS

"InstallShield User Guide Version 2009", release date Jun. 5, 2008.*

(Continued)

*Primary Examiner* — Tuyetlien T Tran
(74) *Attorney, Agent, or Firm* — Seager Tufte & Wickhem LLP

(57) ABSTRACT

A system to automate creation of a configuration wizard from, for example, an underlying control application. In one instance, a complex application may be represented with a simple configuration view such as that of a configuration wizard. When an application is being created, a user may be provided with a feature that defines the configuration wizard. Some aspects of the present approach are that a wizard user interface may be automatically generated, a standard approach may be provided to define the wizard, and, for changes which are performed in the application, the wizard may easily be edited and regenerated.

8 Claims, 60 Drawing Sheets

(56) References Cited

U.S. PATENT DOCUMENTS

| | | |
|---|---|---|
| 7,308,678 B2 | 12/2007 | Allor |
| 7,356,773 B1 * | 4/2008 | Barraclough ............. G06F 8/30 |
| | | 715/705 |
| 7,389,474 B2 | 6/2008 | Rettig et al. |
| 7,437,342 B2 | 10/2008 | Khandekar |
| 7,526,457 B2 | 4/2009 | Duevel et al. |
| 7,587,668 B2 | 9/2009 | Bala |
| 7,630,965 B1 | 12/2009 | Erickson et al. |
| 7,941,506 B2 | 5/2011 | Bonal et al. |
| 7,966,604 B2 | 6/2011 | Tomar |
| 2002/0087966 A1 | 7/2002 | Wiginton et al. |
| 2003/0030656 A1 | 2/2003 | Ang et al. |
| 2004/0130572 A1 | 7/2004 | Bala |
| 2005/0193001 A1 | 9/2005 | Shoham |
| 2006/0098685 A1 * | 5/2006 | Mase ...................... H04L 67/36 |
| | | 370/467 |
| 2006/0206814 A1 | 9/2006 | Tonomura et al. |
| 2007/0045441 A1 | 3/2007 | Ashworth et al. |
| 2010/0100829 A1 * | 4/2010 | Laberge ............... F24F 11/0012 |
| | | 715/762 |
| 2012/0272146 A1 | 10/2012 | D'Souza et al. |

OTHER PUBLICATIONS

All Foreign and NPL References Have Been Previously Provided in Parent U.S. Appl. No. 13/092,062, filed Apr. 21, 2011.
Honeywell Spyder User's Guide, Honeywell, pertinent pp. 1-10, 157, published on Jul. 2007.
InstaiiAnywhere User Guide 2010, Flexera Software, pertinent pages including pp. 15-21, 65, 87-103, published on Feb. 2, 2010.
Web Vision User's Guide, Honeywell, pertinent pp. 1-4, 10, 19, published on May 2010.

* cited by examiner

Figure 7:
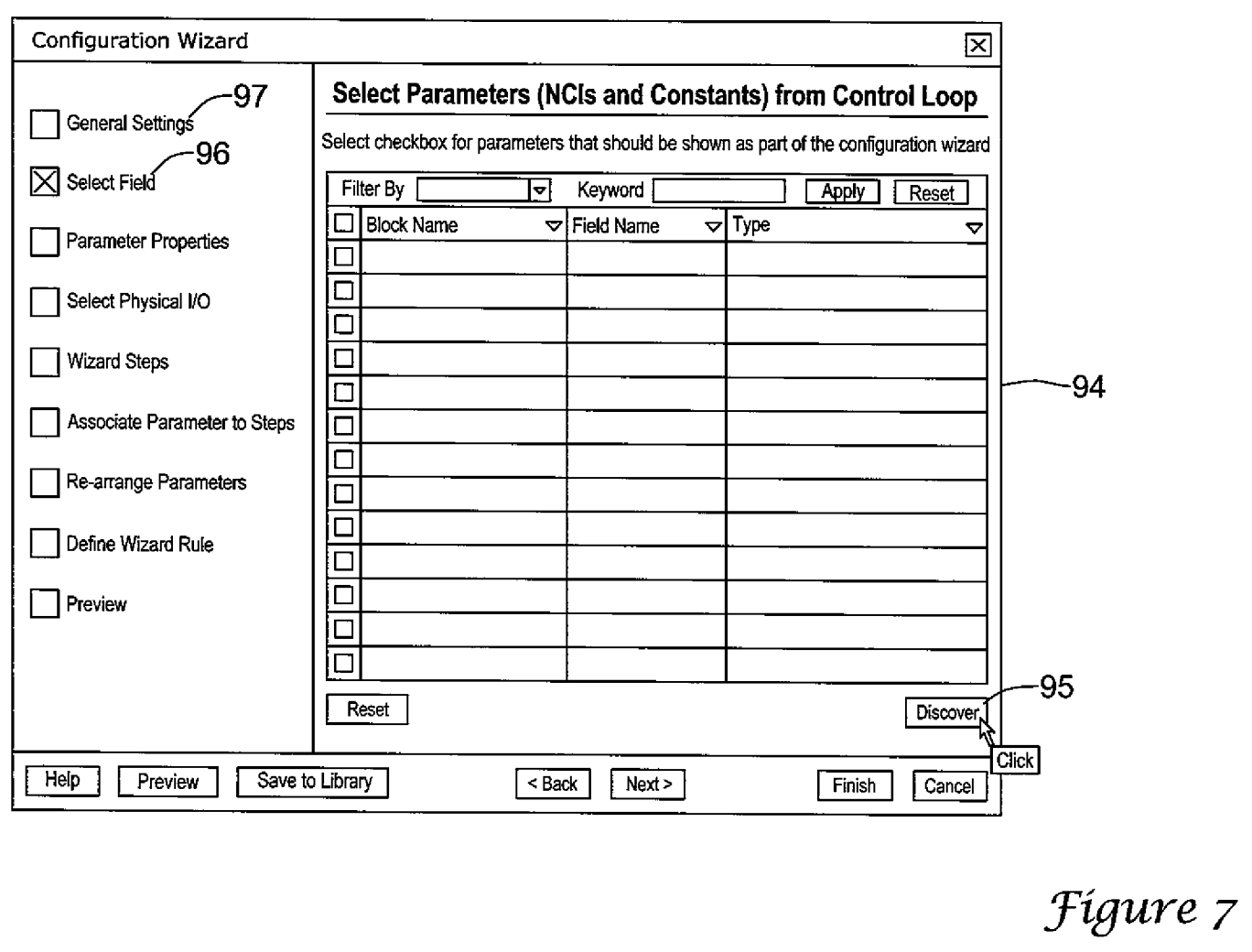

Configuration Wizard

Select Parameters (NCIs and Constants) from Control Loop

Select checkbox for parameters that should be shown as part of the configuration wizard Filter By [ ▽ ]  Keyword [ ]  [Apply] [Reset]

| ☐ Block Name | ▽ Field Name | ▽ Type |
|---|---|---|

[Discover] ← Click

- ☐ General Settings — 97
- ☒ Select Field — 96
- ☐ Parameter Properties
- ☐ Select Physical I/O
- ☐ Wizard Steps
- ☐ Associate Parameter to Steps
- ☐ Re-arrange Parameters
- ☐ Define Wizard Rule
- ☐ Preview

[Reset]

[Help] [Preview] [Save to Library]   [< Back] [Next >]   [Finish] [Cancel]

94 (table area), 95 (Discover button)

Configuration Wizard

- ☐ General Settings — 97
- ☒ Select Field — 96
- ☐ Parameter Properties — 101
- ☐ Select Physical I/O — 90
- ☐ Wizard Steps
- ☐ Associate Parameter to Steps
- ☐ Re-arrange Parameters
- ☐ Define Wizard Rule
- ☐ Preview

Select Parameters (NCIs and Constants) from Control Loop — 94

Select checkbox for parameters that should be shown as part of the configuration wizard Filter By [ ▽ ]  Keyword [ ]  [Apply] [Reset]

| | Block Name | Field Name | Type |
|---|---|---|---|
| ☐ | xxxxxxxxxxxx | yyyyyyyyyy | NCI |
| ☐ | Select aaaaa | bbbbbbbbbb | NCI |
| ☐ | dddddddddd | eeeeeeeeee | NCI |
| ☐ | ffffffffffff | gggggggggg | Constant |
| ☐ | | | |
| ☐ | | | |
| ☐ | | | |
| ☐ | | | |
| ☐ | | | |
| ☐ | | | |
| ☐ | | | |
| ☐ | | | |

[Reset]  [Discover] — 95

[Help] [Preview] [Save to Library]   [< Back] [Next >]   [Finish] [Cancel]

Figure 40

Configuration Wizard

- ☐ General Settings
- ☐ Select Field — 186
- ☒ Map Parameters to Fields
- ☐ Parameter Properties
- ☐ Select Physical I/O
- ☐ Wizard Steps
- ☐ Associate Parameter to Steps
- ☐ Re-arrange Parameters
- ☐ Define Wizard Rule
- ☐ Preview

Map Parameters to Fields

Map field to existing parameters in the template by selecting field in first table and selecting corresponding parameter in second table and click Map List of Selected Fields — 187

| Block Name | Field Name | Type | Mapped Parameter |
|---|---|---|---|
| xxxxxxxxxxxx | yyyyyyyyy | NCI | |
| dddddddd | eeeeeeeee | NCI | |
| ffffffffffff | ggggggggg | Constant | [Select] — 191 |

[Map]  [Un Map] — 188

List of Existing Parameter in Templates — 189

| Parameter Name | Step Name | Type | Mapped Field |
|---|---|---|---|
| Room Setpoint | Setpoint | Constant | [Select] — 192 |

[Help] [Preview] [Save to Library]    [< Back] [Next >]    [Finish] [Cancel]

Configuration Wizard

Map Parameters to Fields

Map field to existing parameters in the template by selecting field in first table and selecting corresponding parameter in second table and click Map

List of Selected Fields — 188

| Block Name | ▽ Field Name | Type | Mapped Parameter |
|---|---|---|---|
| xxxxxxxxxx | yyyyyyyy | NCI | |
| dddddddd | eeeeeeee | NCI | |
| ffffffffffff | gggggggg | Constant | |
| | | | |

List of Existing Parameter in Template — 189

| Parameter Name ▽ | Step Name | Type | Mapped Field |
|---|---|---|---|
| Room Setpoint | Setpoint | Constant | |
| | | | |
| | | | |
| | | | |

[Map] — 194    [Un Map]    Click

☐ General Settings
☐ Select Field
☒ Map Parameters to Fields — 186
☐ Parameter Properties
☐ Select Physical I/O
☐ Wizard Steps
☐ Associate Parameter to Steps
☐ Re-arrange Parameters
☐ Define Wizard Rule
☐ Preview

[Help] [Preview] [Save to Library]    [< Back] [Next >]    [Finish] [Cancel]

Configuration Wizard

☐ General Settings
☐ Select Field
☒ Map Parameters to Fields — 186
☐ Parameter Properties
☐ Select Physical I/O
☐ Wizard Steps
☐ Associate Parameter to Steps
☐ Re-arrange Parameters
☐ Define Wizard Rule
☐ Preview

Map Parameters to Fields — 187

Map field to existing parameters in the template by selecting field in first table and selecting corresponding parameter in second table and click Map

List of Selected Fields — 188

| Block Name ▽ | Field Name | Type | Mapped Parameter |
|---|---|---|---|
| xxxxxxxxxx | yyyyyyyy | NCI | |
| dddddddd | eeeeeeee | NCI | |
| ffffffffffff | gggggggg | Constant | Room_Setpoint |

[ Map ] — 194    [ Un Map ]

List of Existing Parameter in Templates — 189

| Parameter Name ▽ | Step Name | Type | Mapped Field |
|---|---|---|---|
| Room_Setpoint | Setpoint | Constant | ffffffffffff_gggggggg |
| | | | |
| | | | |

[ < Back ]  [ Next > ]  [ Finish ]  [ Cancel ]
        129 — Click

[ Help ]  [ Preview ]  [ Save to Library ]

AUTOMATIC APPLICATION WIZARD

This application is a continuation of U.S. patent application Ser. No. 13/092,062, filed Apr. 21, 2011. U.S. patent application Ser. No. 13/092,062, filed Apr. 21, 2011, is hereby incorporated by reference.

BACKGROUND

The present disclosure pertains to applications and particularly to approaches for providing simple views of the applications.

SUMMARY

The disclosure reveals a tool or approach to automate creation of a configuration wizard from, for example, an underlying control application. In one instance, a complex application may be represented with a simple configuration view such as that of a configuration wizard. When an application is being created, a user may be provided with a feature that defines the configuration wizard. Some aspects of the present approach are that a wizard user interface may be automatically generated, a standard approach may be provided to define the wizard, and, for changes which are done in the application, the wizard may easily be edited and regenerated.

BRIEF DESCRIPTION OF THE DRAWING

FIGS. 3-32 are diagrams of an illustrative example of a first scenario of a configuration wizard;

FIGS. 33-43 are diagrams of an illustrative example of a second scenario of a configuration wizard;

DESCRIPTION

A wizard may be a user interface element that presents a user with a sequence of dialog boxes that leads the user through a series of well-defined steps. Tasks that are complex, infrequently performed, or unfamiliar may be easier to perform using a wizard. In contrast, an expert system may guide a user through a series of questions to utilize an application. For instance, many web applications may make use of the wizard paradigm to perform lengthy interactive processes.

Contractors or others who create complex building control applications often need to present their field technicians with a simple configuration view for a complex application. The application may often be represented with a configuration wizard. Creating the wizard may take a considerably large amount of time and effort. Furthermore, whenever the application is changed, the wizard should be modified. Modifications may be prone to errors.

The wizard functionalities may be exemplified as a feature in the configuration tool that could avoid the development cost of a wizard and also mitigate failures of manual interventions.

When a control application is being created, a contractor or another may be provided with a feature that defines the configuration wizard. The wizard feature may have the following sub-features: 1) Select data points from the application that will appear in the wizard; 2) Map data points to widget/user interface fields in the wizard; and 3) Define validations and rules for the wizard. Given the above information, the wizard may be generated for a configuration.

The advantages of the present approach may be: 1) The user does not have to spend effort defining the wizard user interface as it is automatically generated; 2) A standard approach may be used to define the wizard and thus will be less error prone; and 3) If any changes are done in the application, the wizard may be edited and regenerated in a quick, multi-step process.

The wizard creator may be provided as a feature in a Spyder™ programming tool. The Spyder programming tool is merely an illustrative example with the wizard. The wizard creator feature may also be provided independent of the Spyder Programming tool.

When a user creates a Spyder application, the user may get an additional command to launch a wizard creator tool. Here, the user may select data points and map them to fields in the wizard. The user may also have options to define the wizard layout and steps in the wizard.

Figure 1:
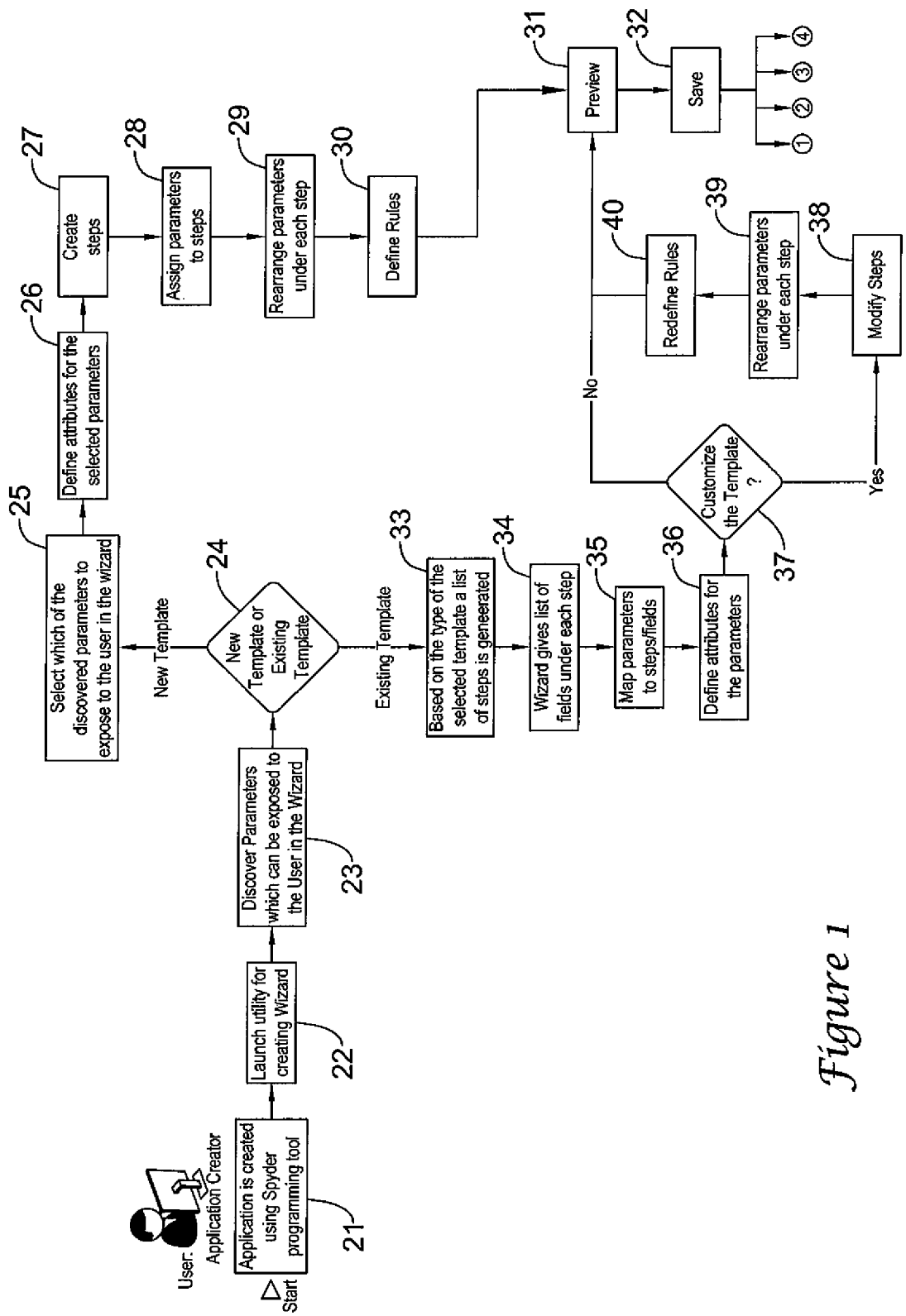
FIG. 1 is a diagram of an illustrative example of a present tool used by an application creator.

FIG. 1 is a flow diagram of the present tool used by an application creator. An application may be created using a Spyder programming tool as indicated in symbol 21. At symbol 22, a utility may be launched for creating a wizard. Parameters from the application may be discovered which can be exposed to the user in the wizard, at symbol 23. At symbol 24, a new template or an existing template may be chosen. Based on the application, the tool should be able to suggest a template from the list of available templates, or a new template may be chosen or developed. If an existing template is to be chosen, then it may be standard template by an established entity or it may be one of the custom templates which the user has created earlier and saved for re-use.

A new template approach may be taken at symbol 24. At symbol 25, one or more discovered parameters may be selected for exposure to the user in the wizard. Attributes for the selected parameters may be defined at symbol 26. Examples of attributes may be data type, limits, range incremental, and so on. Steps may then be created at symbol 27. There may be some standard blocks from which the user can create steps. At symbol 28, the parameters may be assigned to the steps. The parameters may be rearranged under each step at symbol 29. Rules may be defined at symbol 30. There may be a library of rules from which the user can select to provide rules. A resultant new template may be previewed at symbol 31, and saved at symbol 32.

Returning to symbol 24, the user may decide to choose an existing template instead of developing a new template. Based on the type of template selected, a list of steps may be generated at symbol 33. At symbol 34, the wizard may give a list of fields under each step. The discovered parameters of symbol 23 may be mapped to the steps and/or fields at symbol 35. At symbol 36, attributes may be defined for the parameters.

A decision to customize a template may be made at symbol 37. If the template is to be customized at symbol 37, then the steps may be modified at symbol 38, the parameters may be rearranged under each step at symbol 39, and the rules may be redefined at symbol 40. The resultant customized existing template may be previewed at symbol 31 and saved at symbol 32.

If a decision is made at symbol 37 not to customize the existing template, then the resultant non-customized existing template may be previewed at symbol 31 and saved at symbol 32. A saved template from symbol 32 may be output in various formats which could be used by different types of users.

Figure 2A:
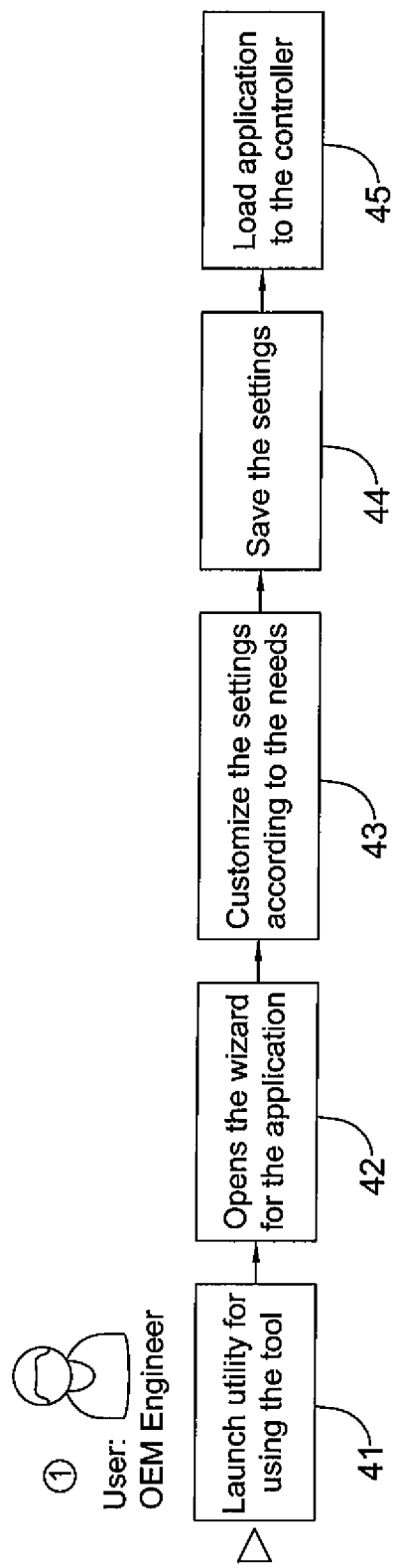
FIGS. 2a, 2b, 2c and 2d are diagrams that reveal various kinds of uses of the present tool as illustrative examples.

FIGS. 2a, 2b, 2c and 2d are diagrams that reveal various kinds of users of the present tool as illustrative examples. In FIG. 2a, a user may be an OEM engineer who launches a utility for using the tool at symbol 41. At symbol 42, the wizard may be opened for the application. If the user does not have access to Niagara™, the user may open wizard in another way. The settings may be customized according to the user's needs at symbol 43. The settings may be saved at symbol 44. At symbol 45, the application may be loaded to the controller.

Figure 2B:
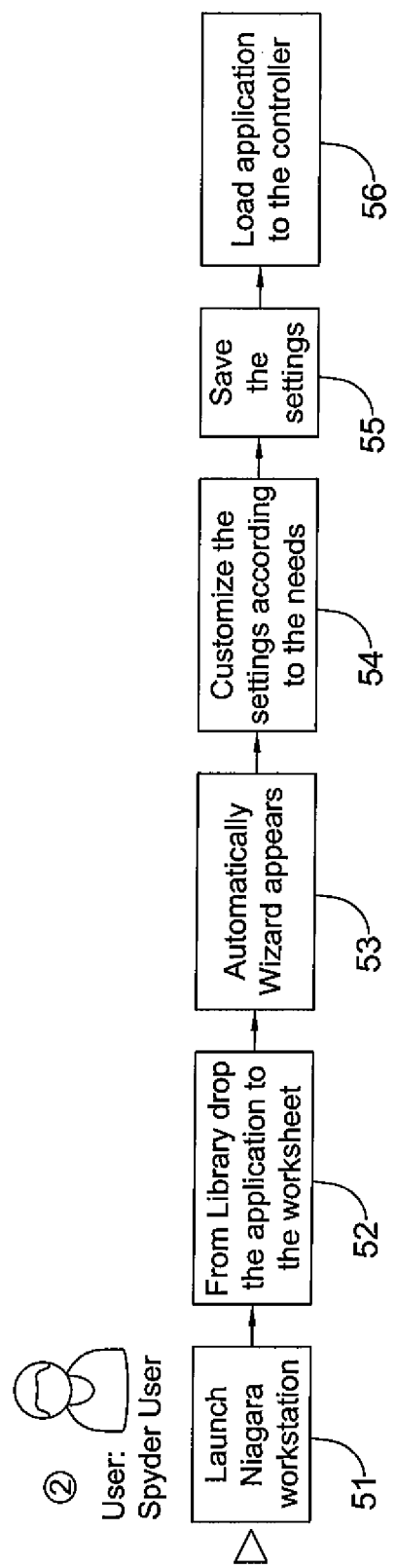

In FIG. 2b, a Spyder application user may launch a Niagara work station at symbol 51. From a library, an application may be dropped to a worksheet at symbol 52. Incidentally, if the wizard is created using a Spyder tool, the wizard may get bundled with the application. At symbol 53, a wizard may automatically appear. The settings may be customized according to the user's needs at symbol 54. At symbol 55, the settings may be saved. The application may be loaded to a controller at symbol 56.

It may be noted here that WebVision™ is a building manager controller that may provide features like scheduling, alarming trending and default device graphics. Configuration wizards for Honeywell International Inc.'s XL10™ family of controllers may be provided as a part of the WebVision device. Ease of installation and support for up to 120 devices may be other features of the WebVision building manager.

Figure 2C:
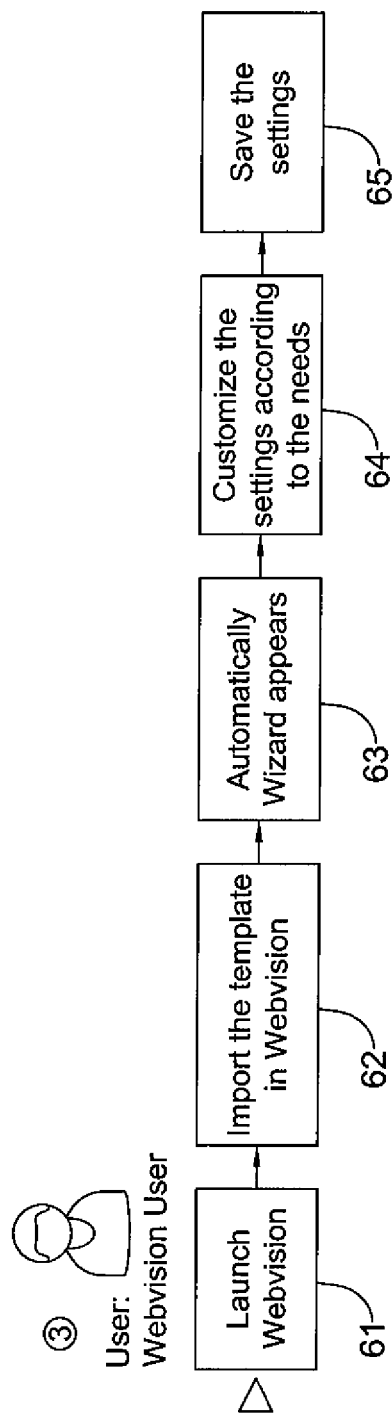

In FIG. 2c, a WebVision user may launch WebVision at symbol 61. The template may be imported in Webvision at symbol 62. A wizard may automatically appear at symbol 63. At symbol 64, the settings may be customized according to the user's needs. The settings may be saved at symbol 65.

It can be noted here that LNS may be regarded as the control networking industry's first multi-client network operating system for LONWORKS™ protocol based devices. Like many operating systems, the LNS network operating system may encapsulate common LONWORKS network operations, providing an essential directory, installation, management, monitoring and control services often needed by network applications. LNS may represent a LONWORKS network as a hierarchy of objects that corresponds to network devices, characteristics and operations. These objects may provide a set of methods, properties and events which implement the network/application interface.

Figure 2D:
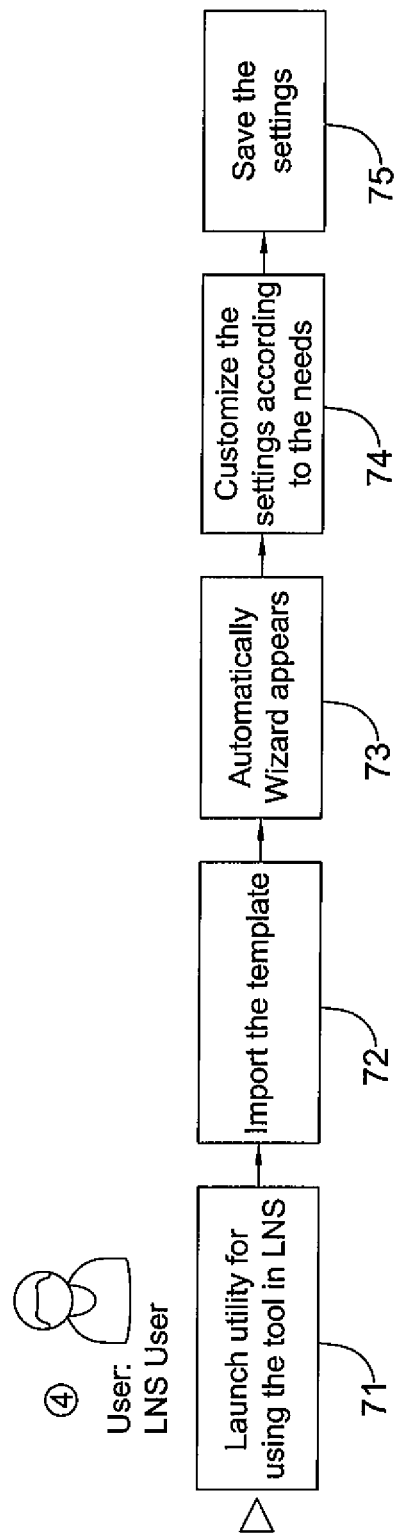

In FIG. 2d, an LNS user may launch a utility for using the tool in LNS at symbol 71. The template may be imported at symbol 72. At symbol 73, wizard may automatically appear. The settings may be customized according to the needs, at symbol 74. At symbol 75, the settings may be saved. Various other kinds of users may launch a utility for using the tool in their respective application or technology.

A first scenario being a Spyder configuration wizard may be illustrated by diagrams of screen prints as shown in FIGS. 3-32. An application may be created using a Spyder programming tool, and then a wizard may be created for this application using a wizard creation tool.

Figure 3:
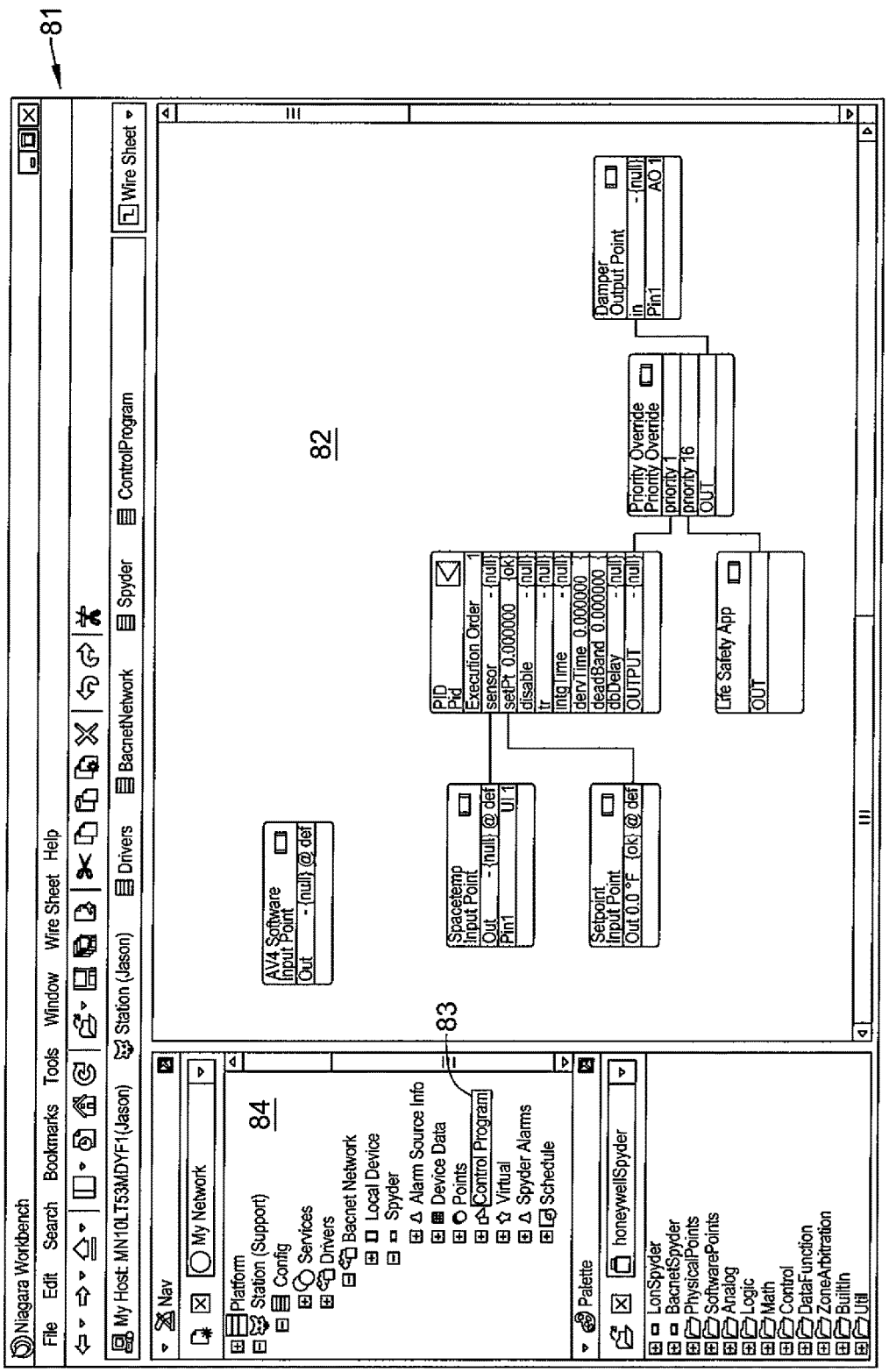
Figure 4:
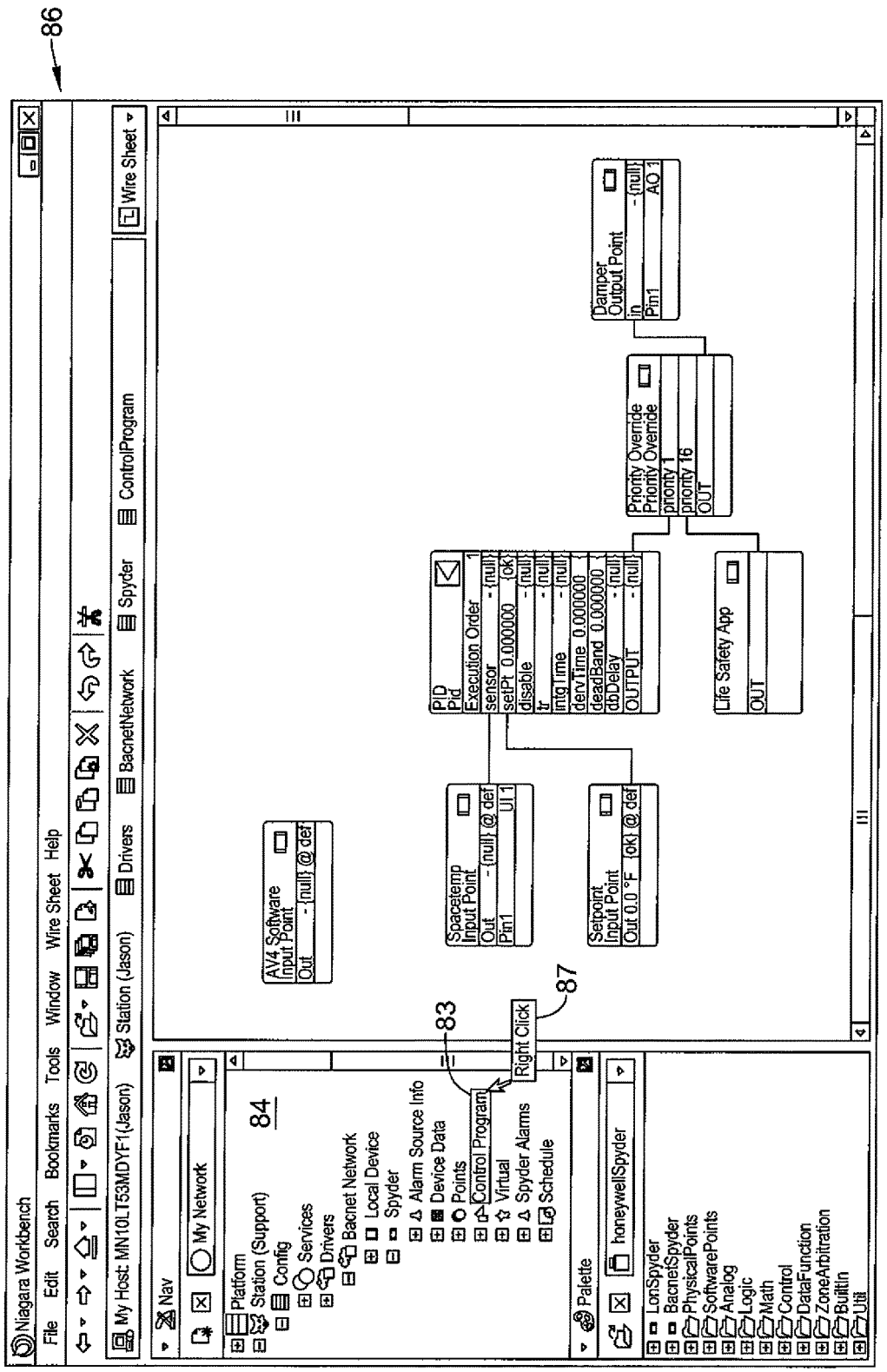
Figure 5:
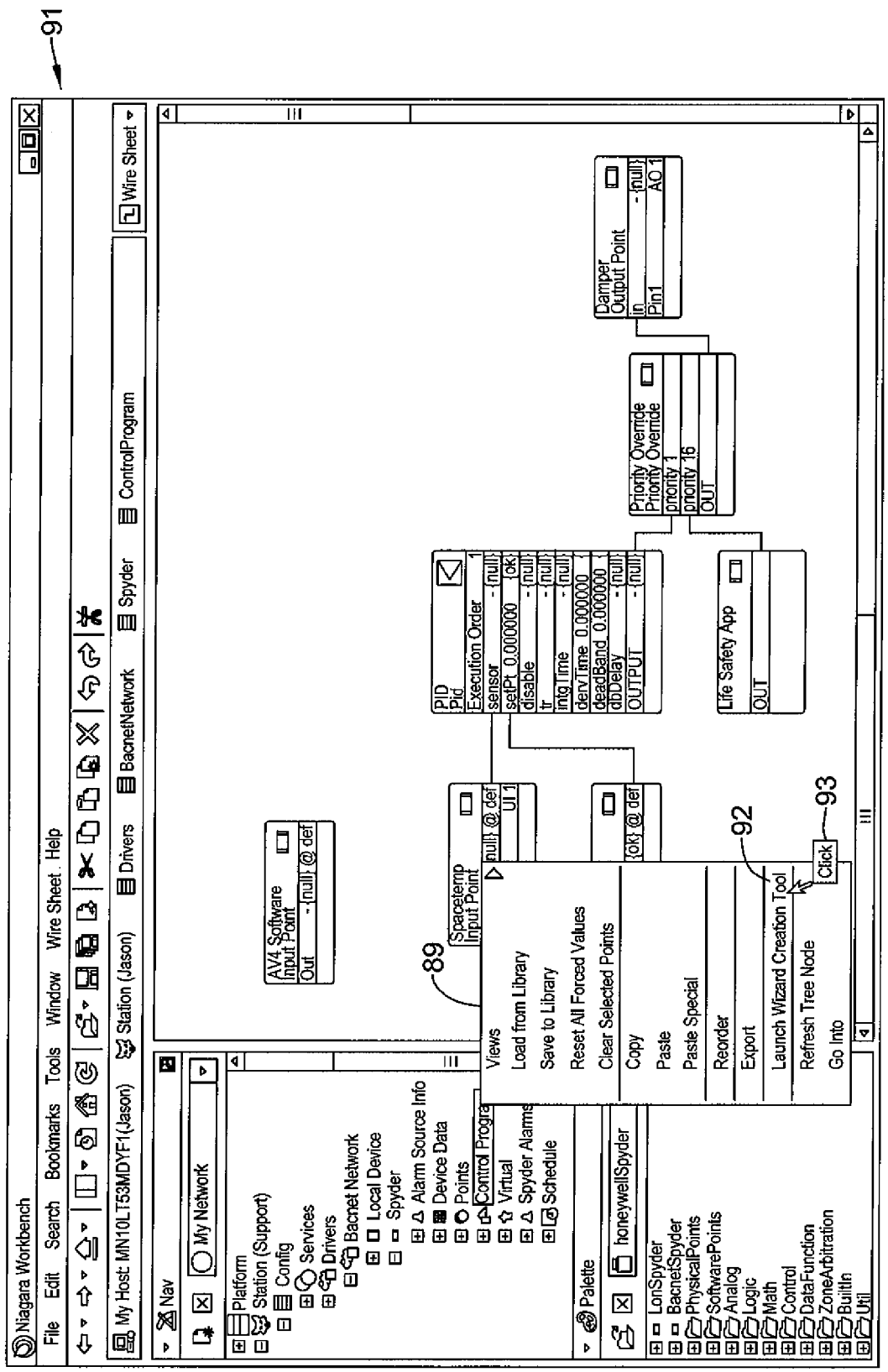
Figure 6:
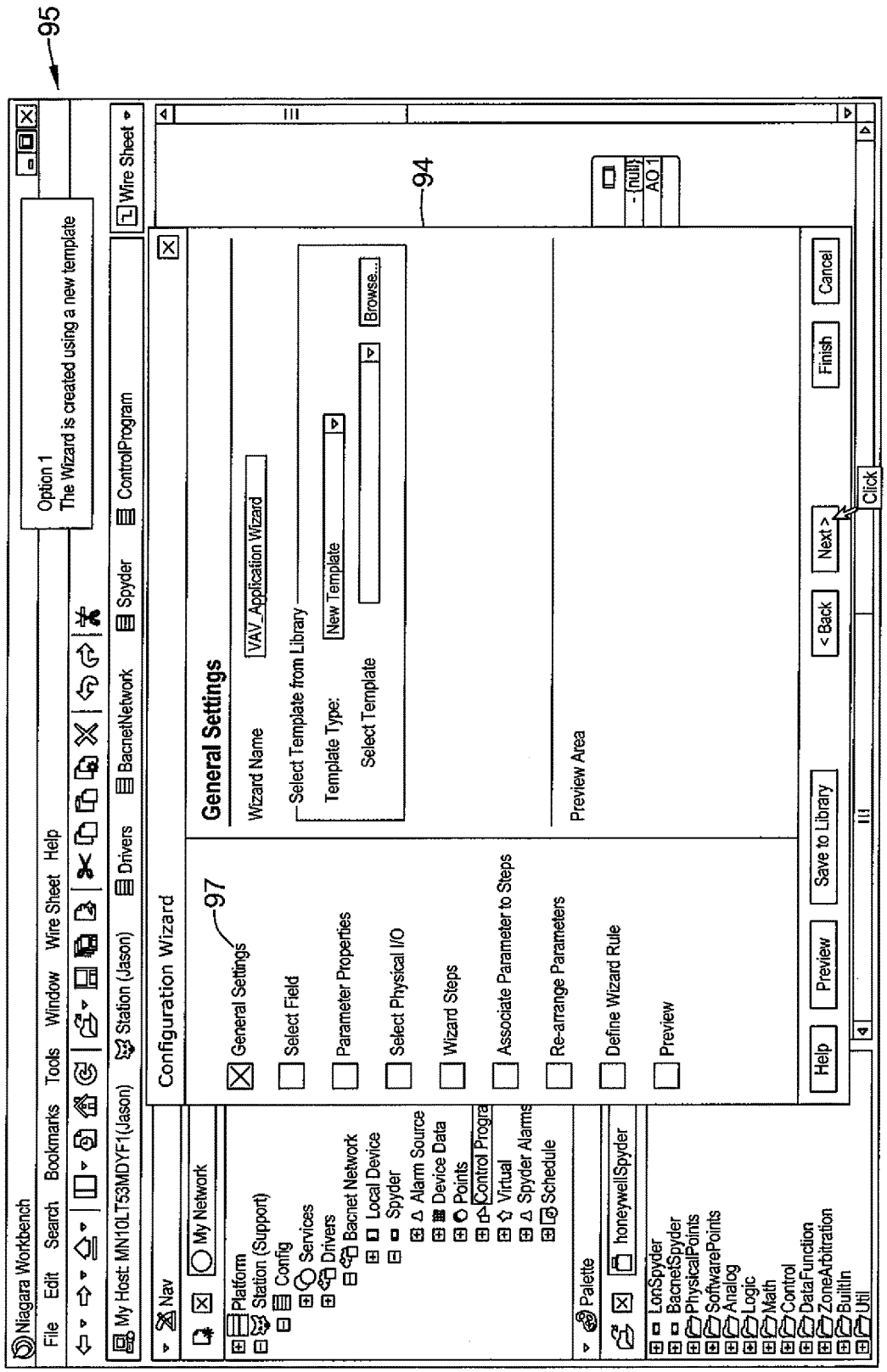

FIG. 3 is a diagram of a screen print 81 of a Niagara workbench in display 82 showing an engineering mode. A function block layout is shown. A control program label 83 is shown as selected in a navigation tree 84. In a diagram of a screen print 86 in FIG. 4, on label 83, there may be a right click on control program 83. As a result of the right click 87, a menu 89 may drop down as shown in a screen print 91 of a diagram in FIG. 5. A label 92, entitled "Launch Wizard Creation Tool", may have a click 93 made on it. This click 93 may result in a "General Settings" menu 94 for a configuration wizard in FIG. 6. A wizard name and a selection of a library may be a part of general settings 97 in menu 94 of a screen print diagram 95. Here, an option 1 is shown where the wizard is created using a new template.

Figure 9:
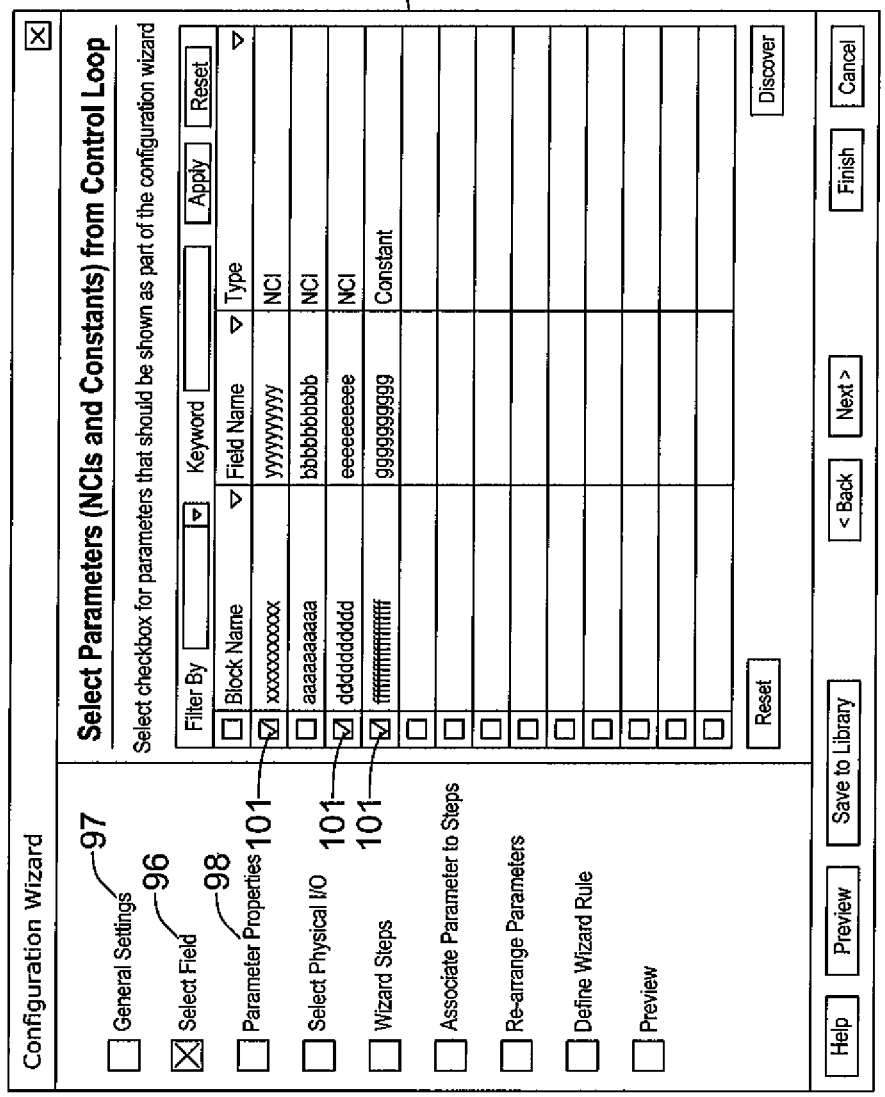

FIG. 7 is a diagram of the configuration wizard menu 94 where a select field block 96 showing parameters (NCIs and constants) which may be selected for a control loop. The user may select a checkbox for parameters which should be shown as part of the configuration wizard. A discover button 95 may be clicked on to result in a list of parameters which may be selectively picked by a select 90 with a mouse pointer on the check box 101 of each parameter to be desired from the list. FIG. 9 shows the blocks 101 for the parameters which have been selected.

Figure 10:
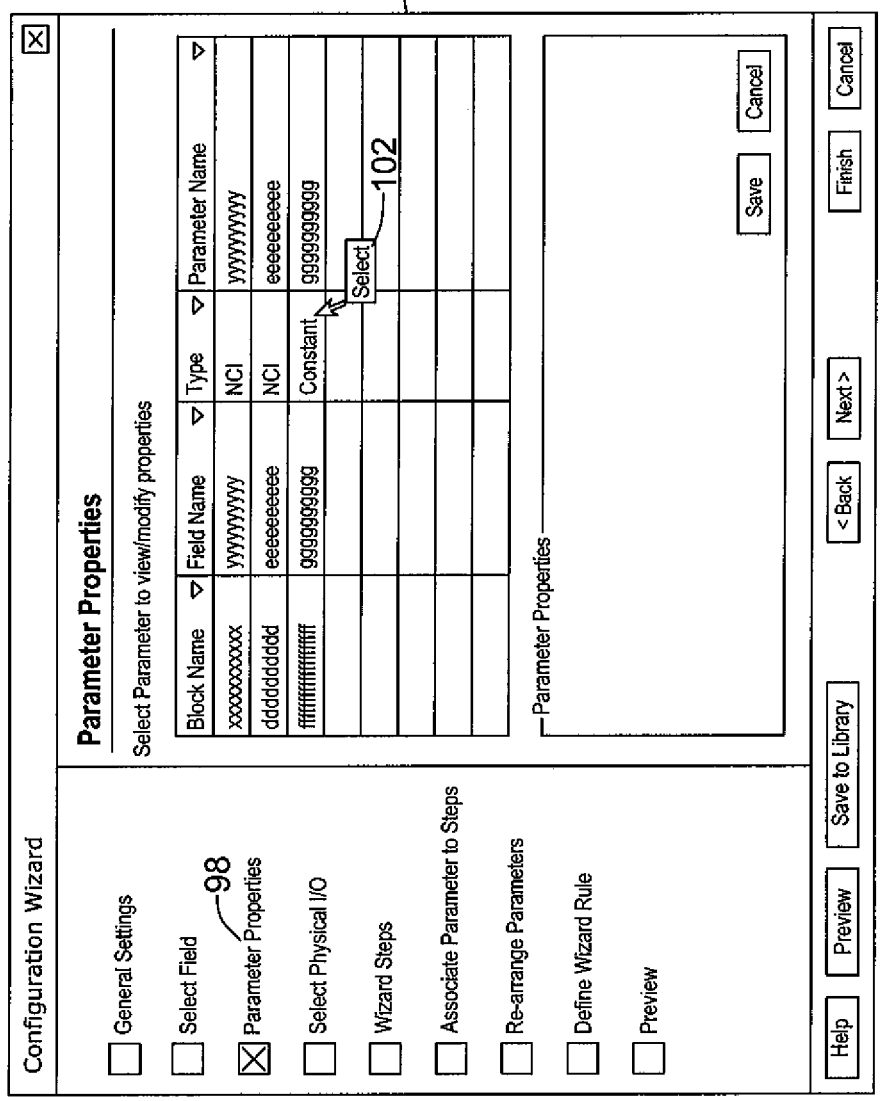
Figure 11:
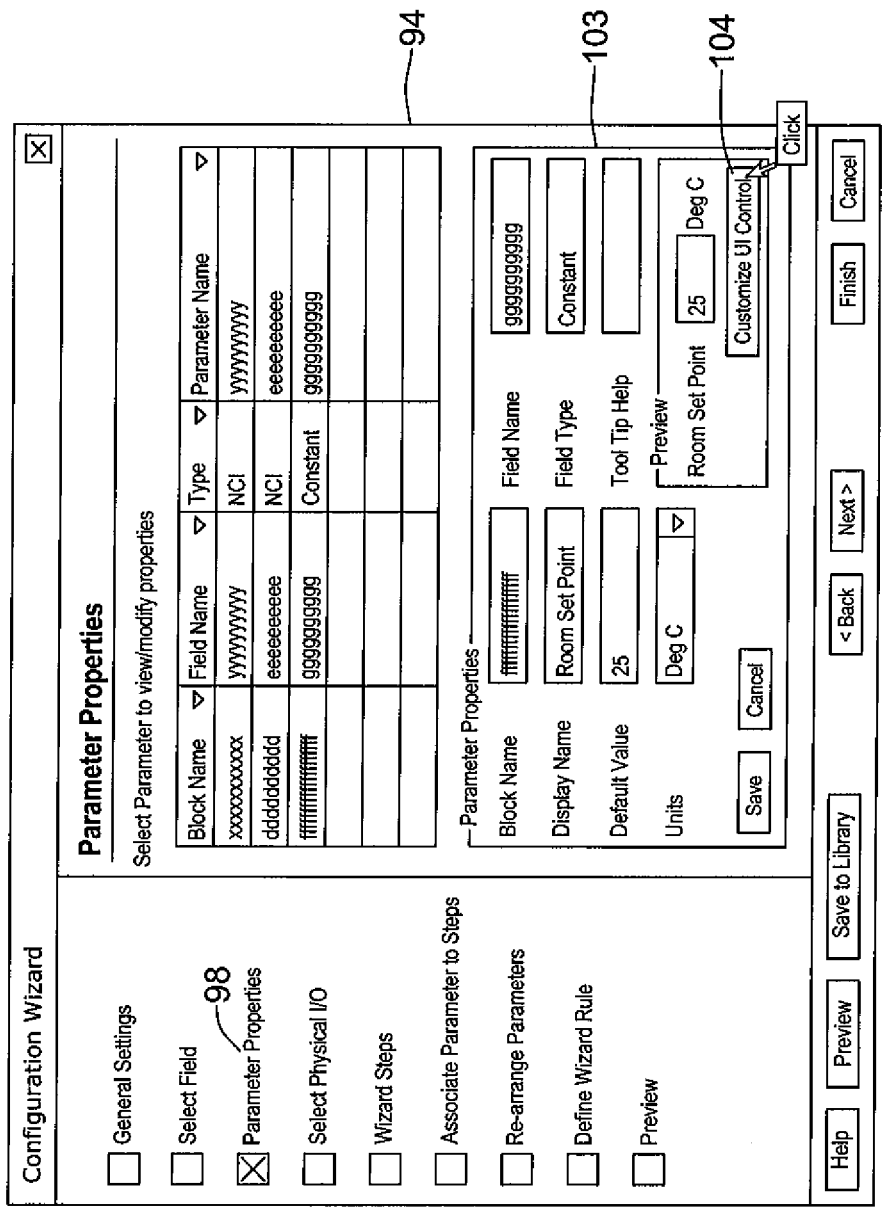
Figure 12:
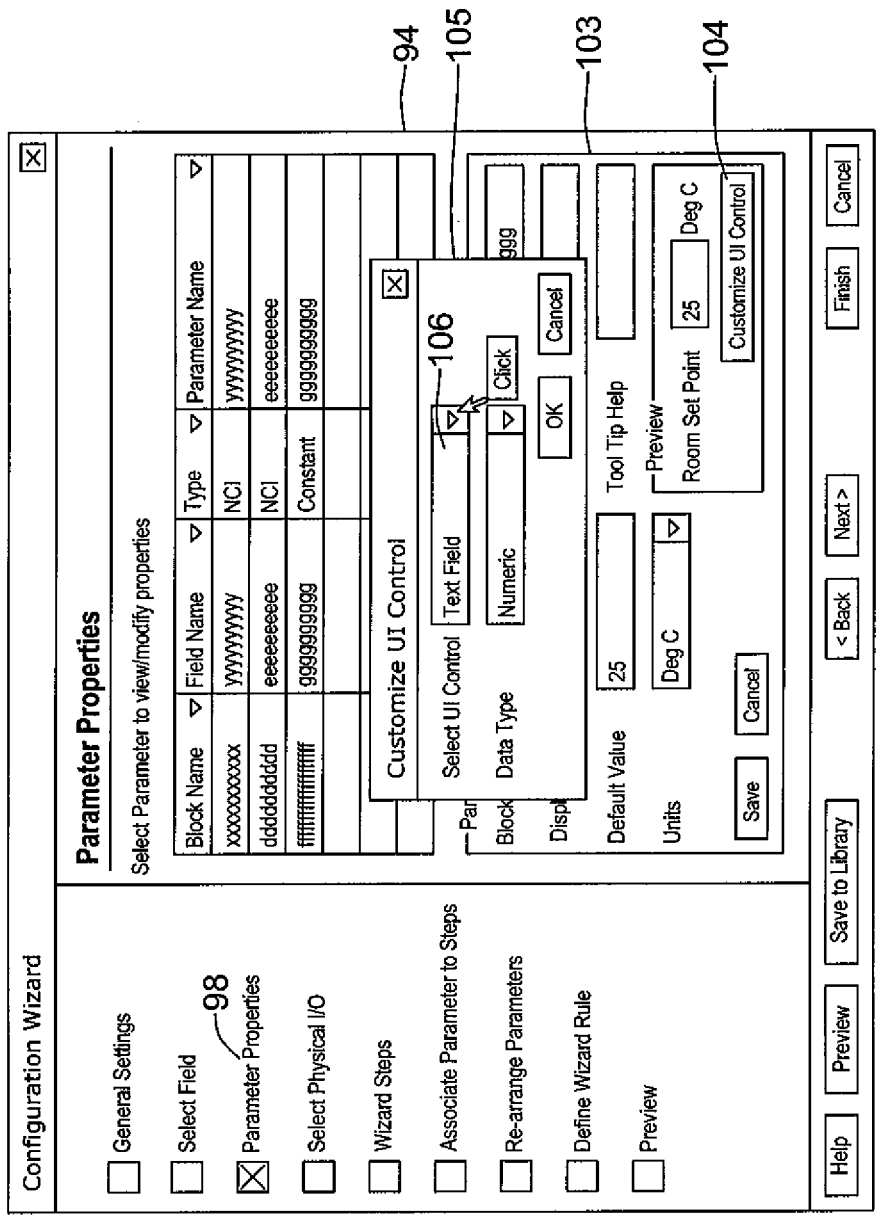
Figure 13:
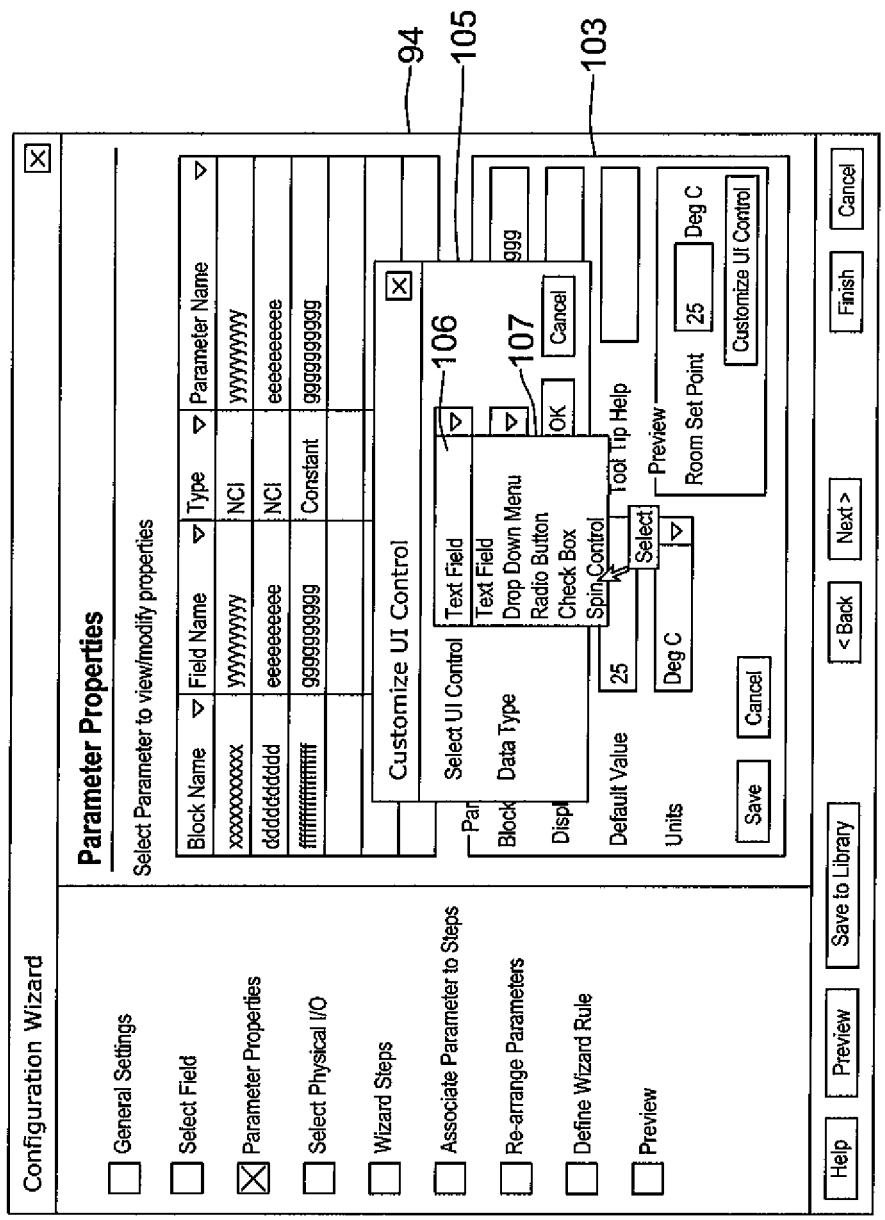
Figure 14:
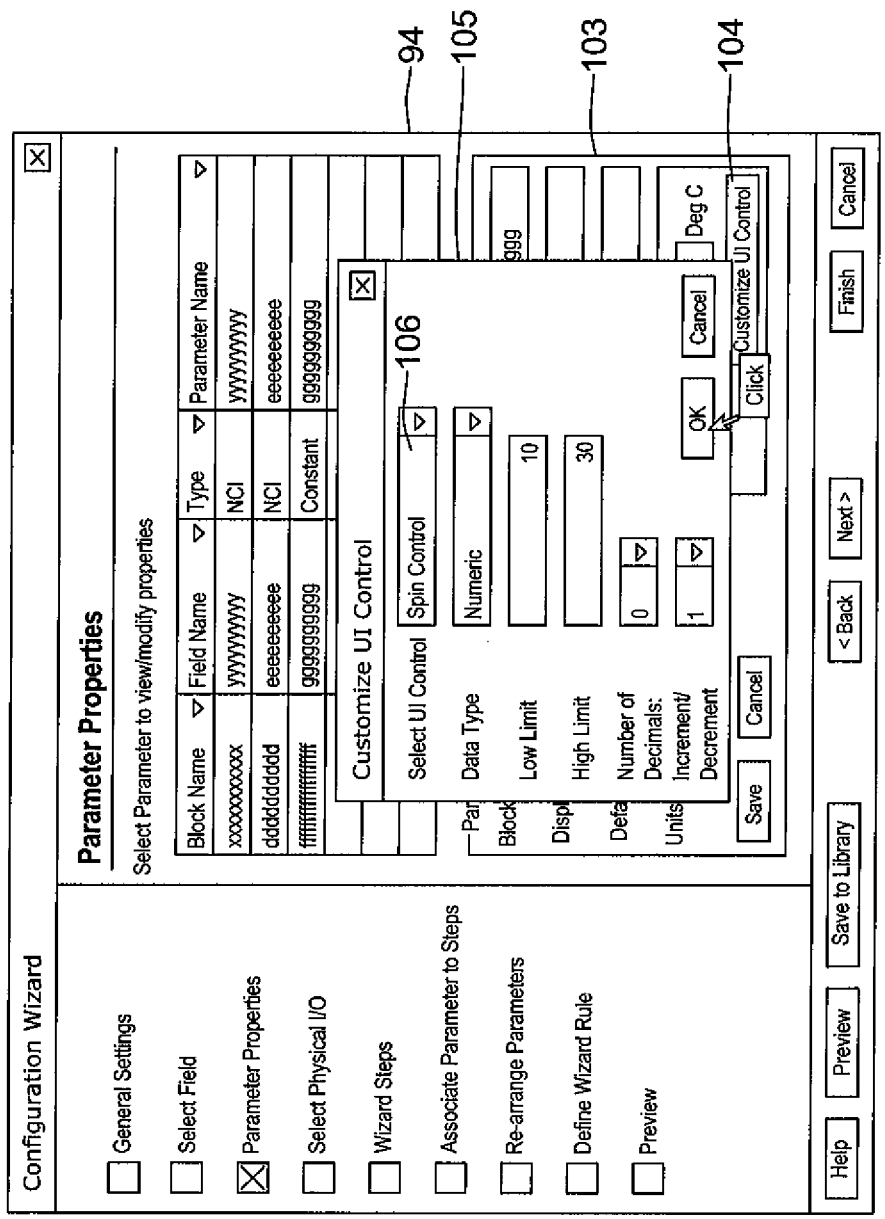
Figure 15:
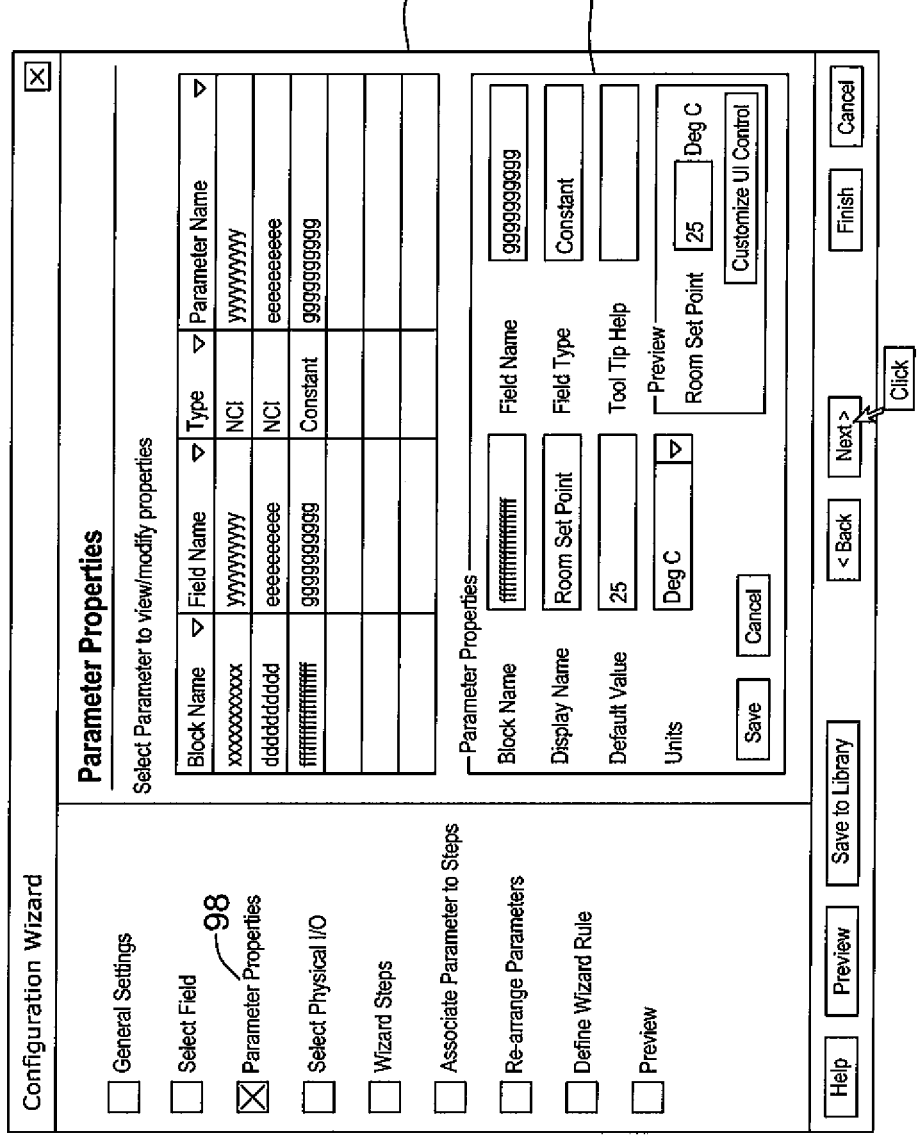

FIG. 10 shows parameter properties 98 selected in menu 94. Each parameter may be selected to view and/or modify properties by select 102 on one of the lines of the parameters, such as the third parameter on the list. This may result in a display 103 of properties for the parameter selected of menu 94 in FIG. 11. One may customize UI (user interface) control by clicking on box 104, in FIG. 12, which may result in a box 105 which shows a select UI control box 106 which may be clicked on to get choices of text field, drop down menu, radio button, check box and spin control in a list 107, in FIG. 13. "Spin Control" may be selected to result in the select UI control box 106 to indicate "Spin Control", in FIG. 14. Box 105 may also show data type as numeric, low limit as 10, high limit as 30, a number of decimals and an increment/decrement unit amount. An "OK" or "Cancel" of box 105 may be clicked on in FIG. 14, thereby removing box 105, as shown in FIG. 15.

Figure 16:
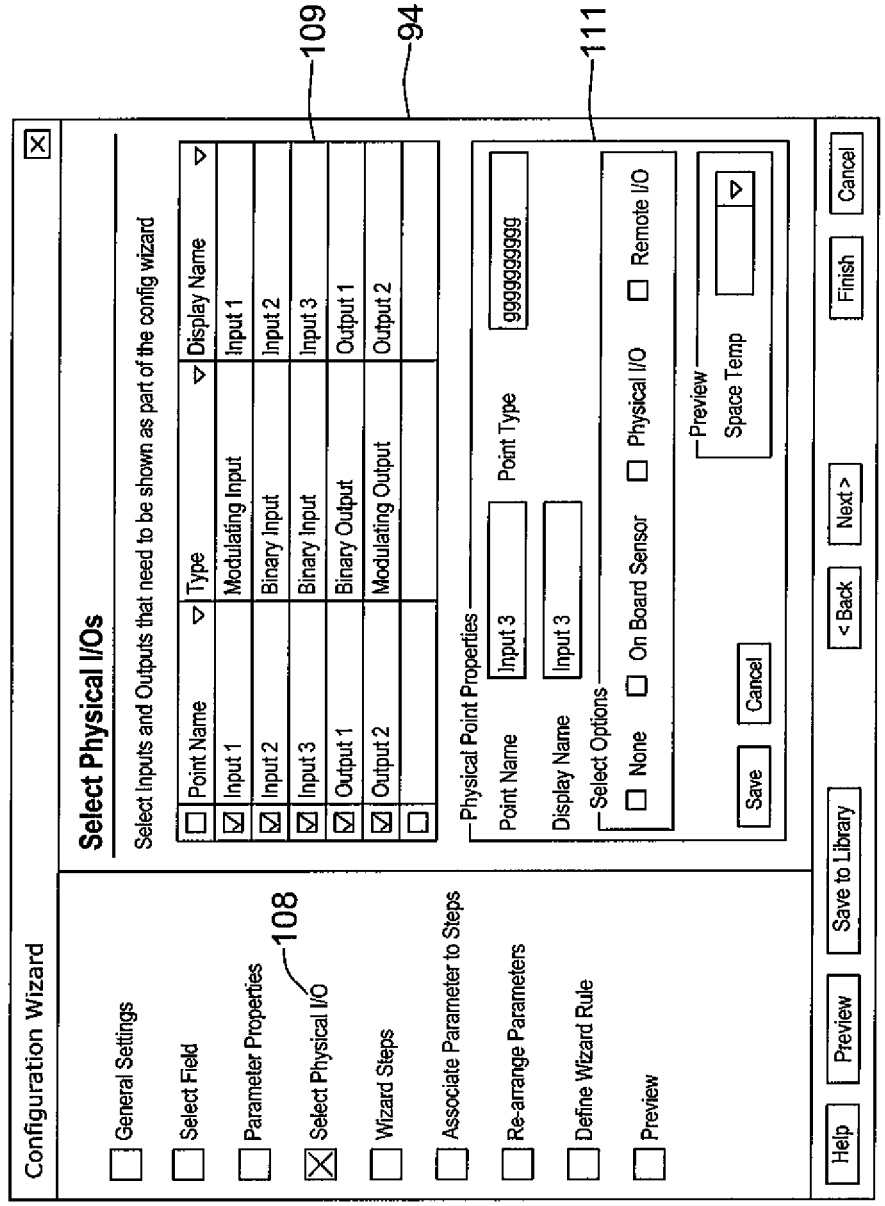
Figure 17:
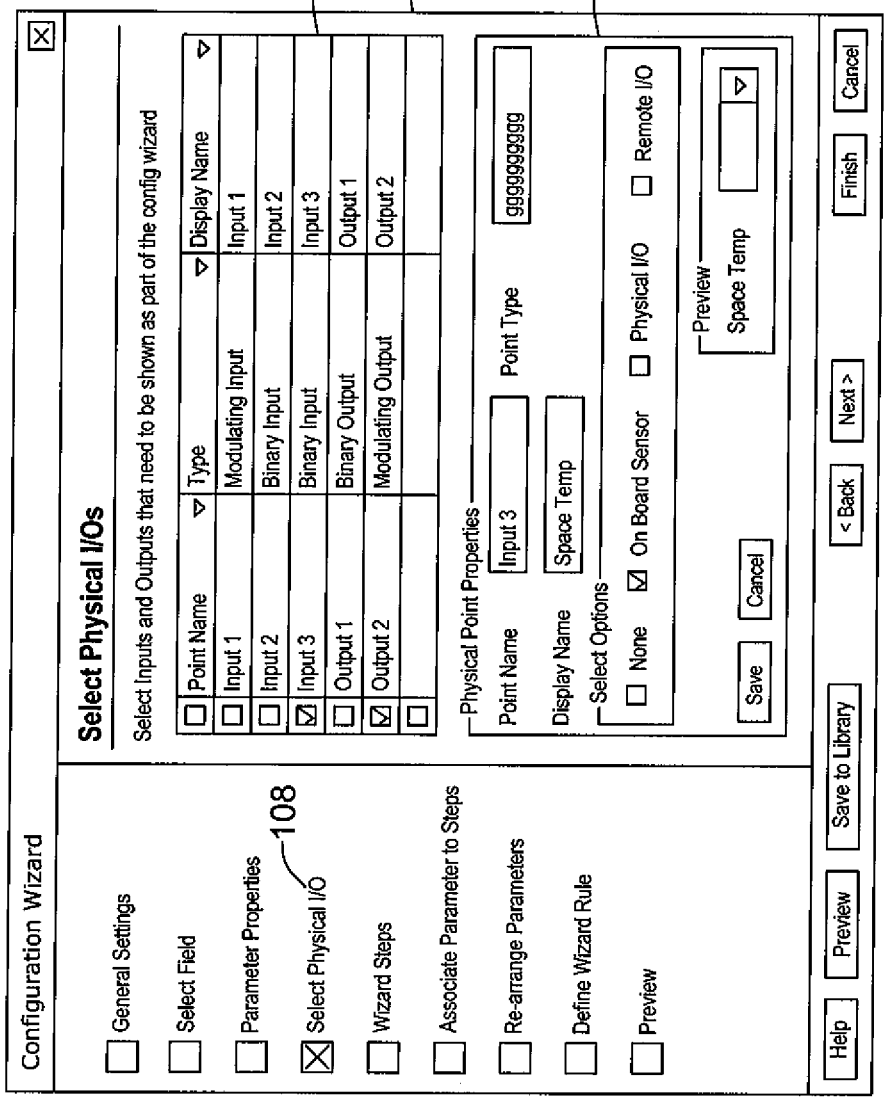
Figure 18:
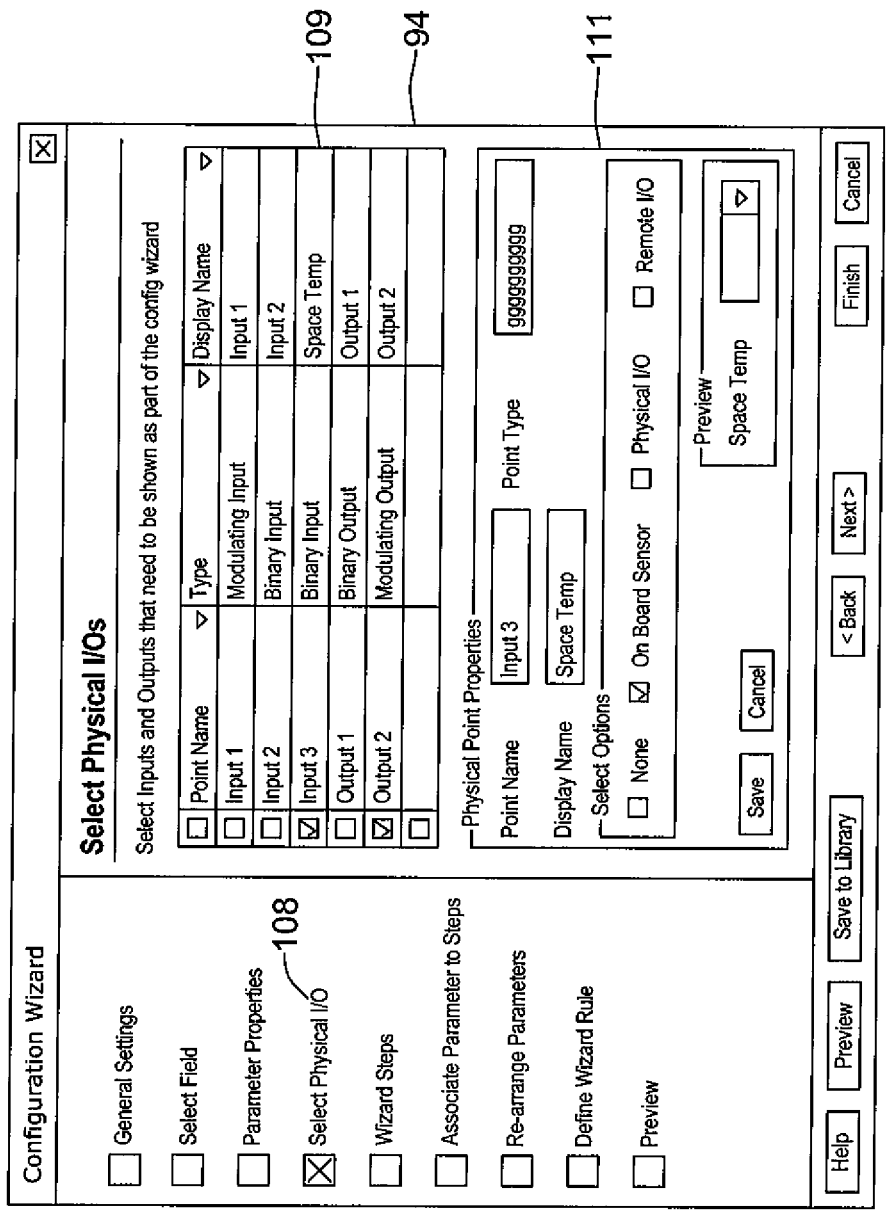

A block for "select physical I/O" may be indicated in FIG. 16 with a list of inputs and outputs which may be selected to be a part of the configuration wizard. A point name, type, and display name may be shown in a box 109 for the selected inputs and outputs. A box 111 shows physical point properties which may be determined for each selected input and/or output. In FIG. 17, the "select physical I/Os" box 109 may have inputs 1 and 2, and an output 1 deselected in contrast to FIG. 16. FIG. 17 may also have an "on board sensor" checked in box 111, which has a display name with "Space Temp" indicated. FIG. 18 may be similar to FIG. 17 except that a display name for input 3 in box 109 is indicated as "Space Temp".

Figure 19:
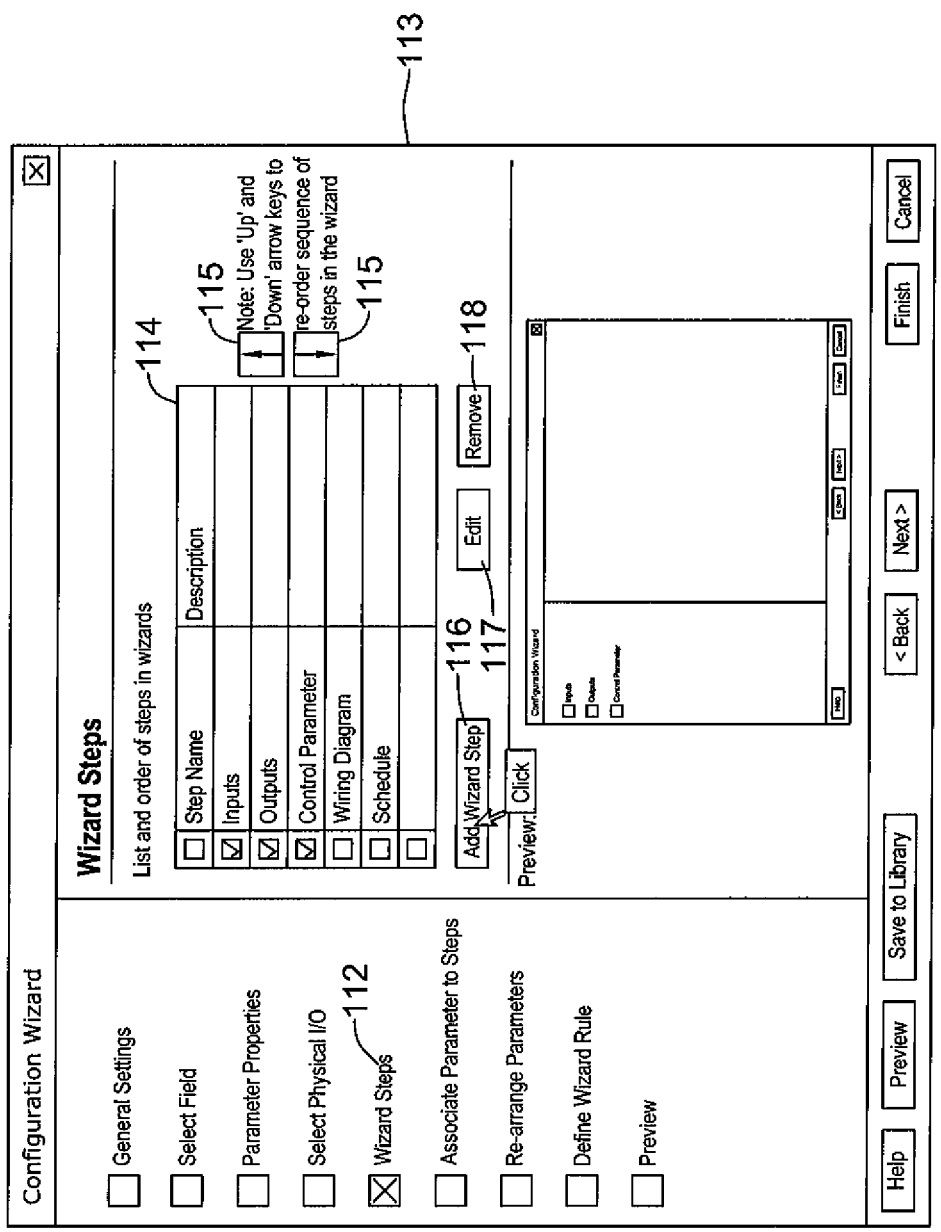
Figure 20:
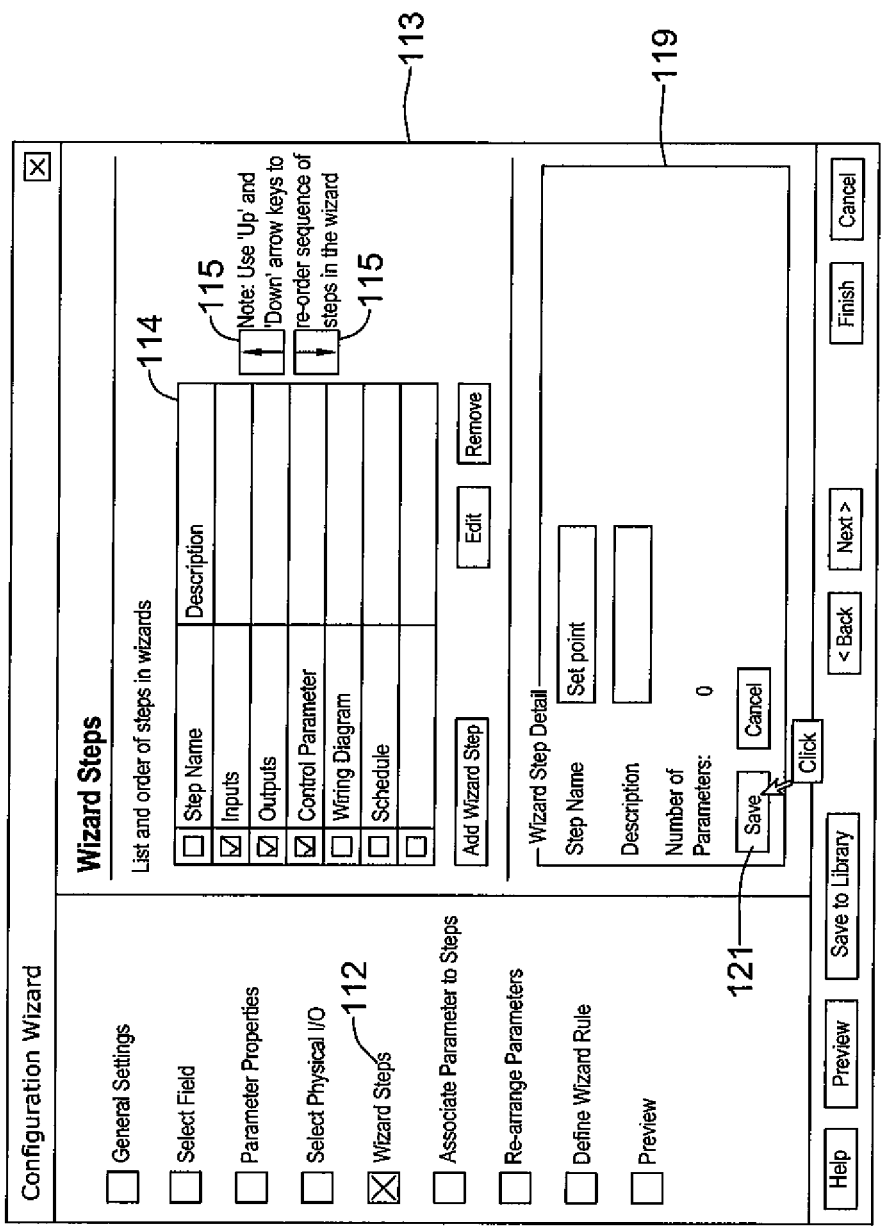
Figure 21:
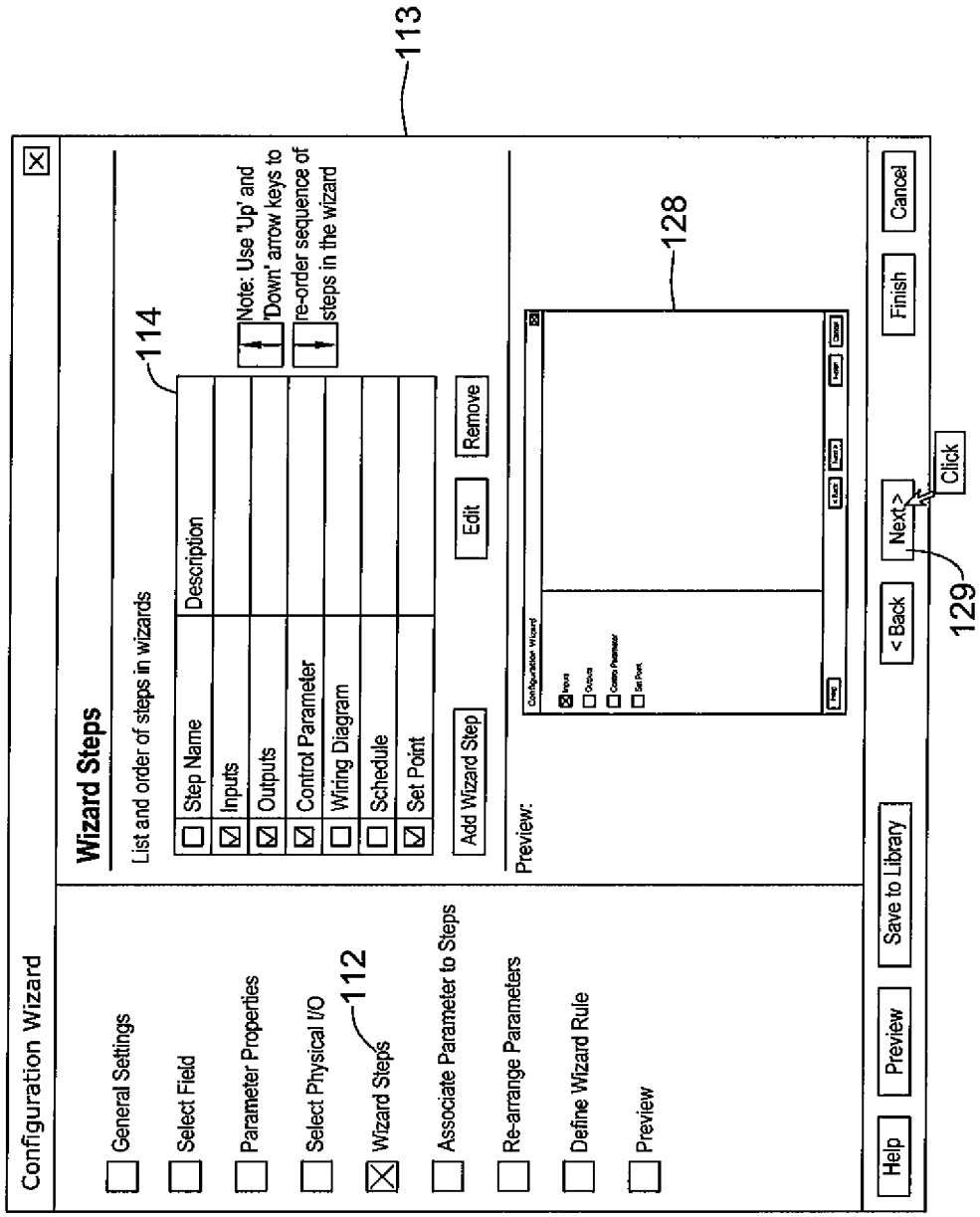

FIG. 19 is a diagram of a screen print 113 with "wizard steps" 112 in the left box selected. Box 114 indicates a list and order of steps in wizards. The sequence of steps may be re-ordered with buttons 115. A wizard step may be added, edited or removed with buttons 116, 117 or 118, respectively. An add wizard step button may be clicked to get a block 119 in FIG. 20 with wizard detail such as a step name of "Setpoint" which might be saved with a button 121 click. A resulting diagram 113 with block 114 in FIG. 21 shows "Setpoint" added as a step in wizard.

Figure 22:
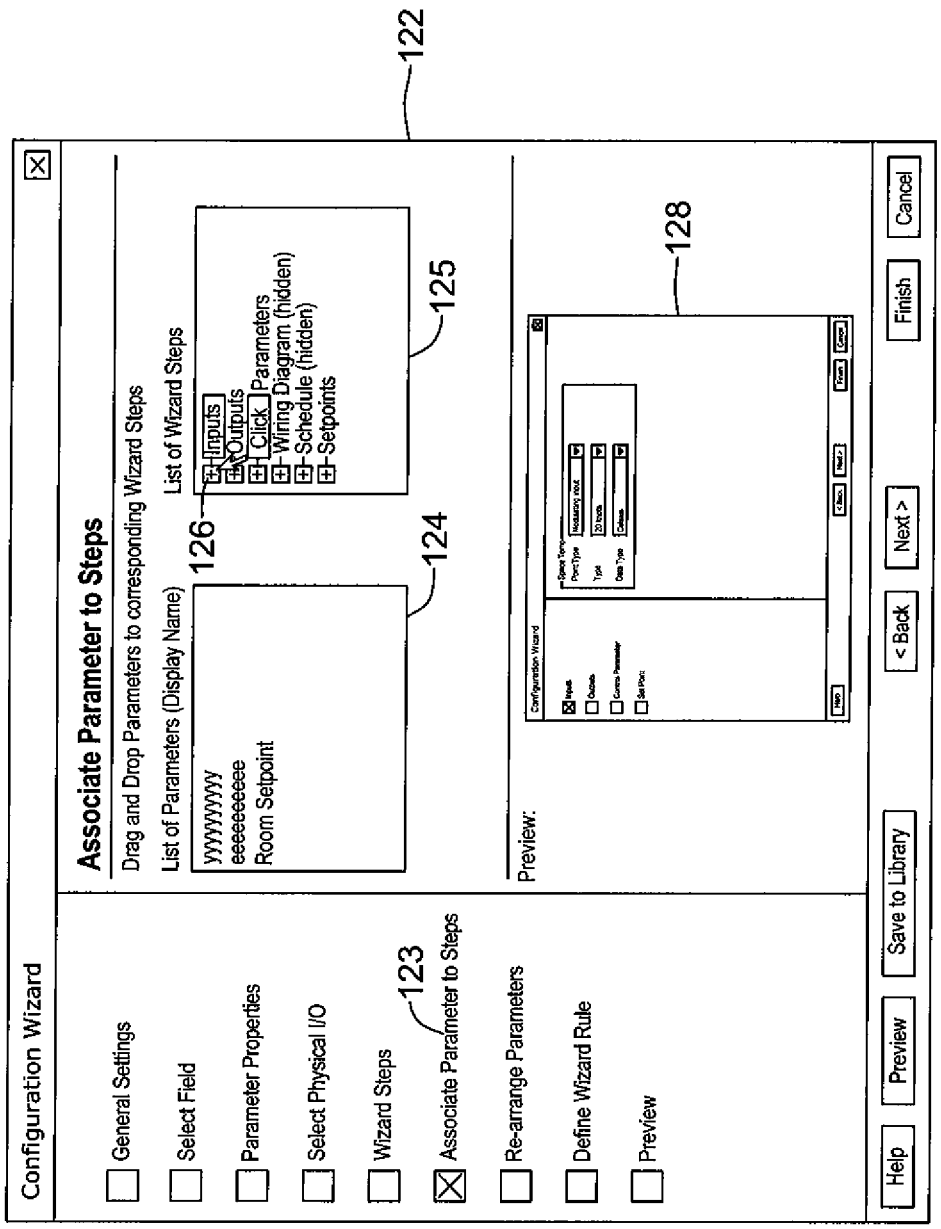
Figure 23:
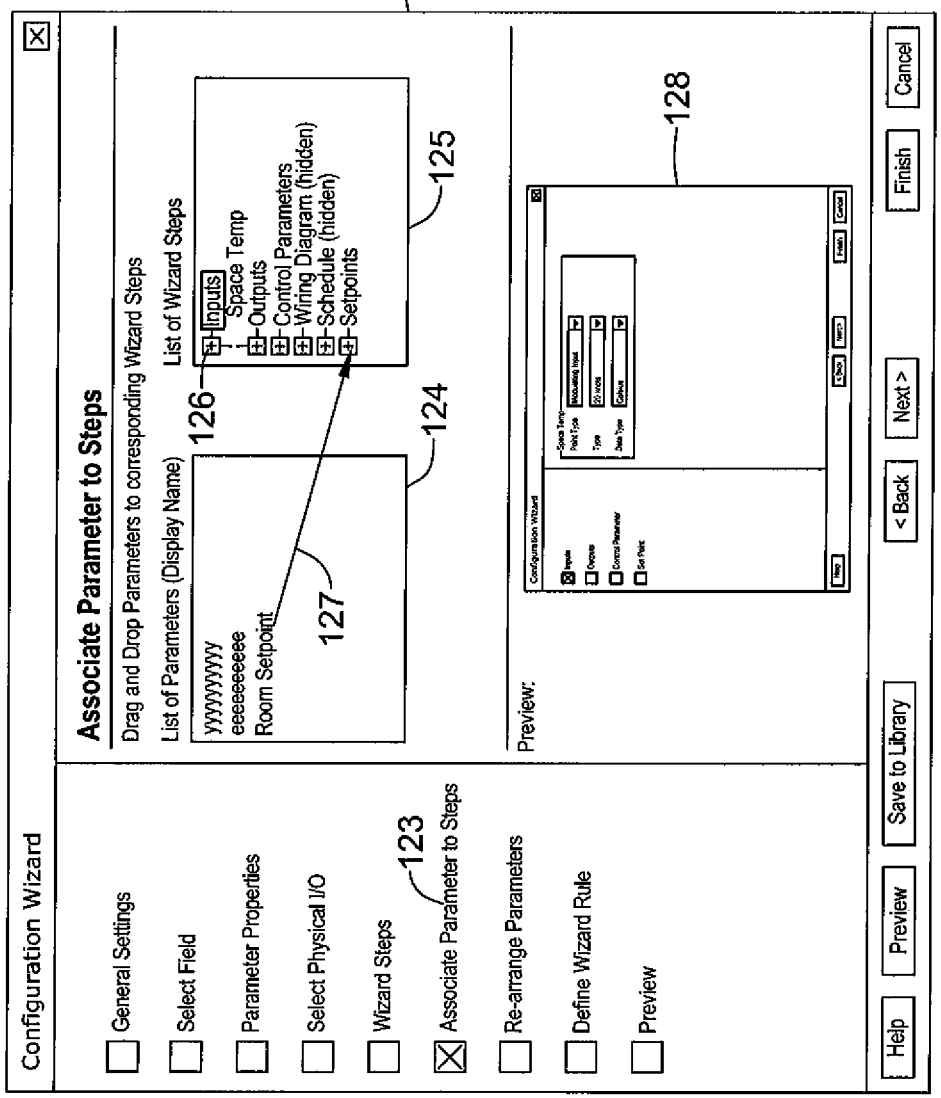
Figure 24:
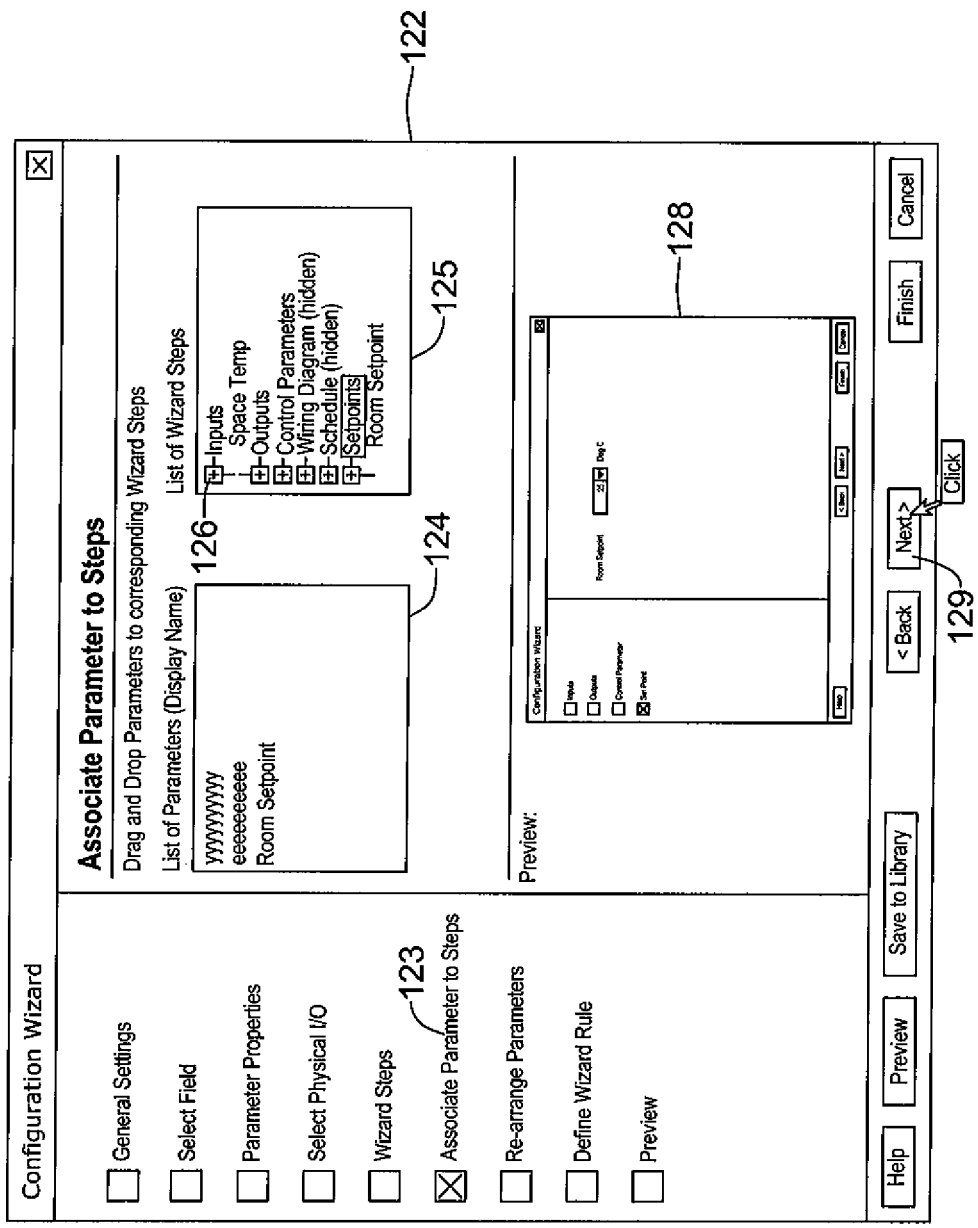
Figure 25:
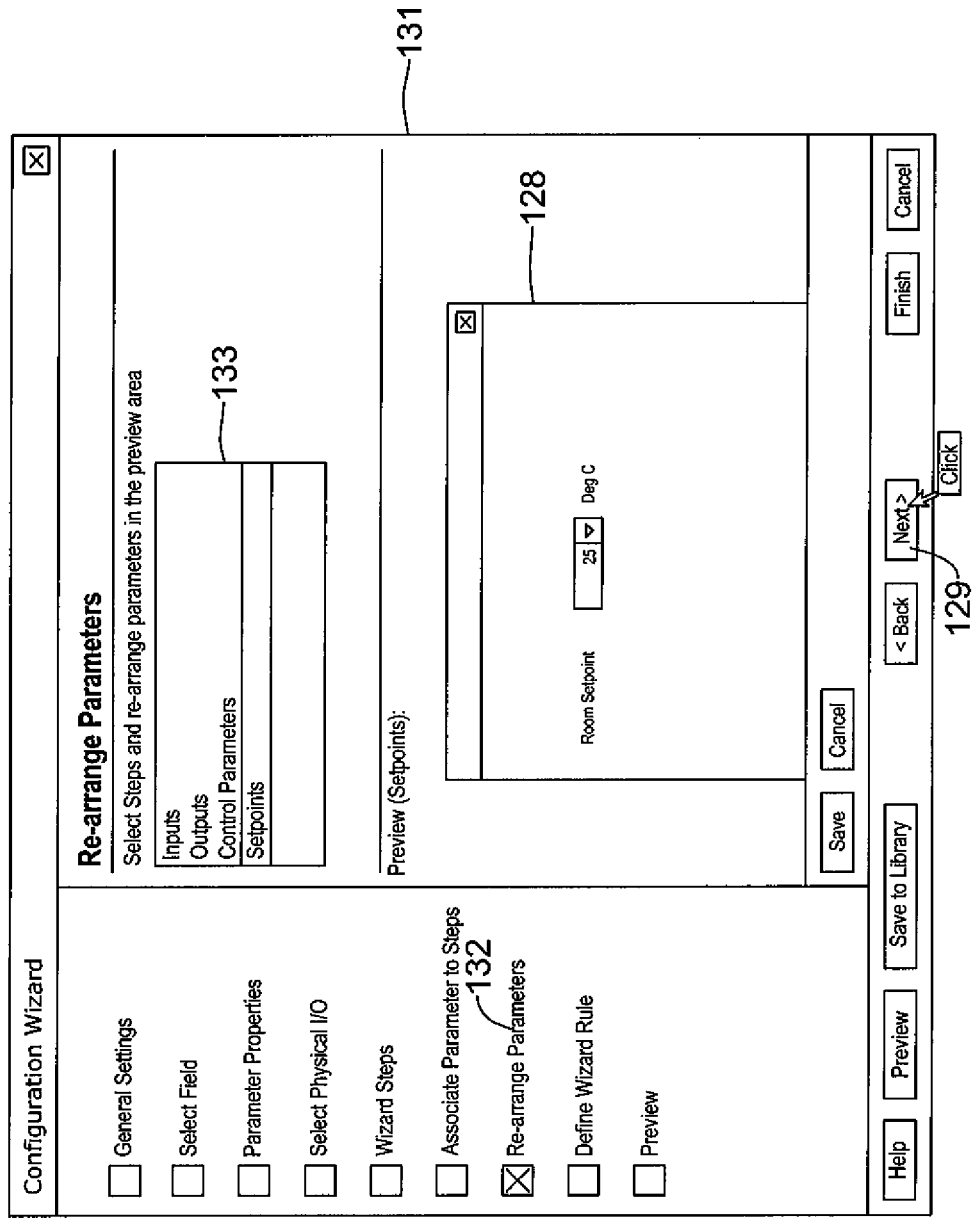
Figure 26:
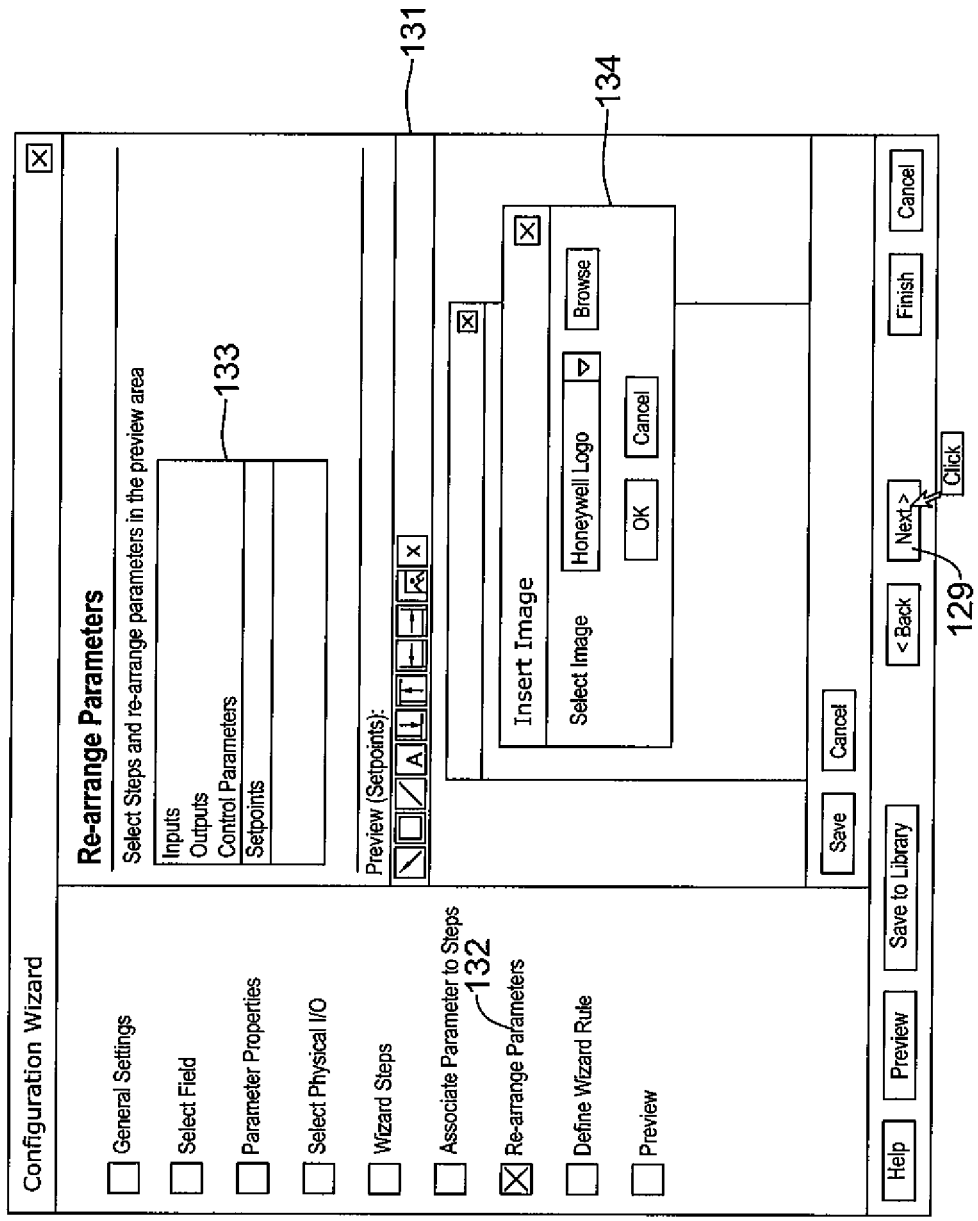
Figure 27:
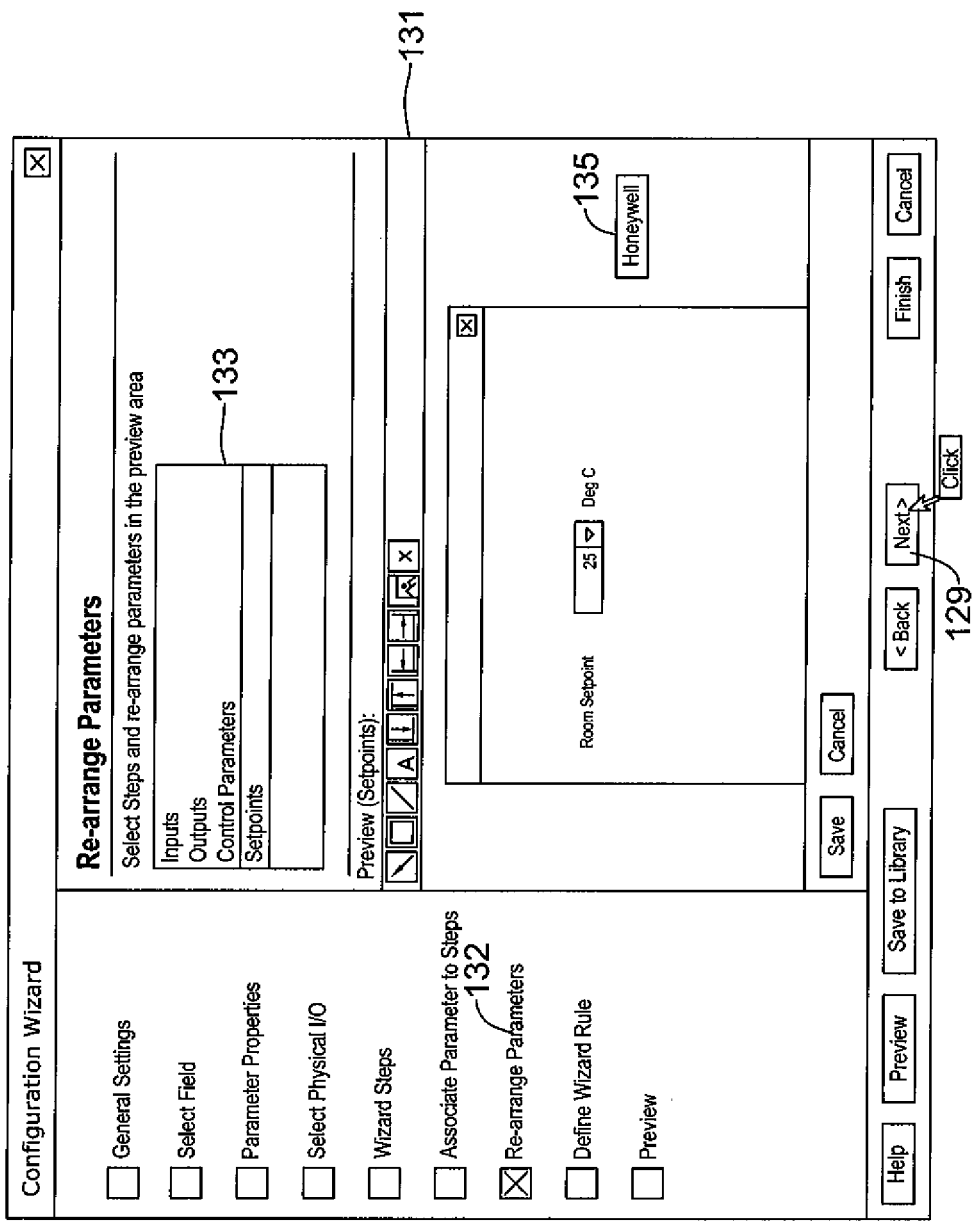
Figure 28:
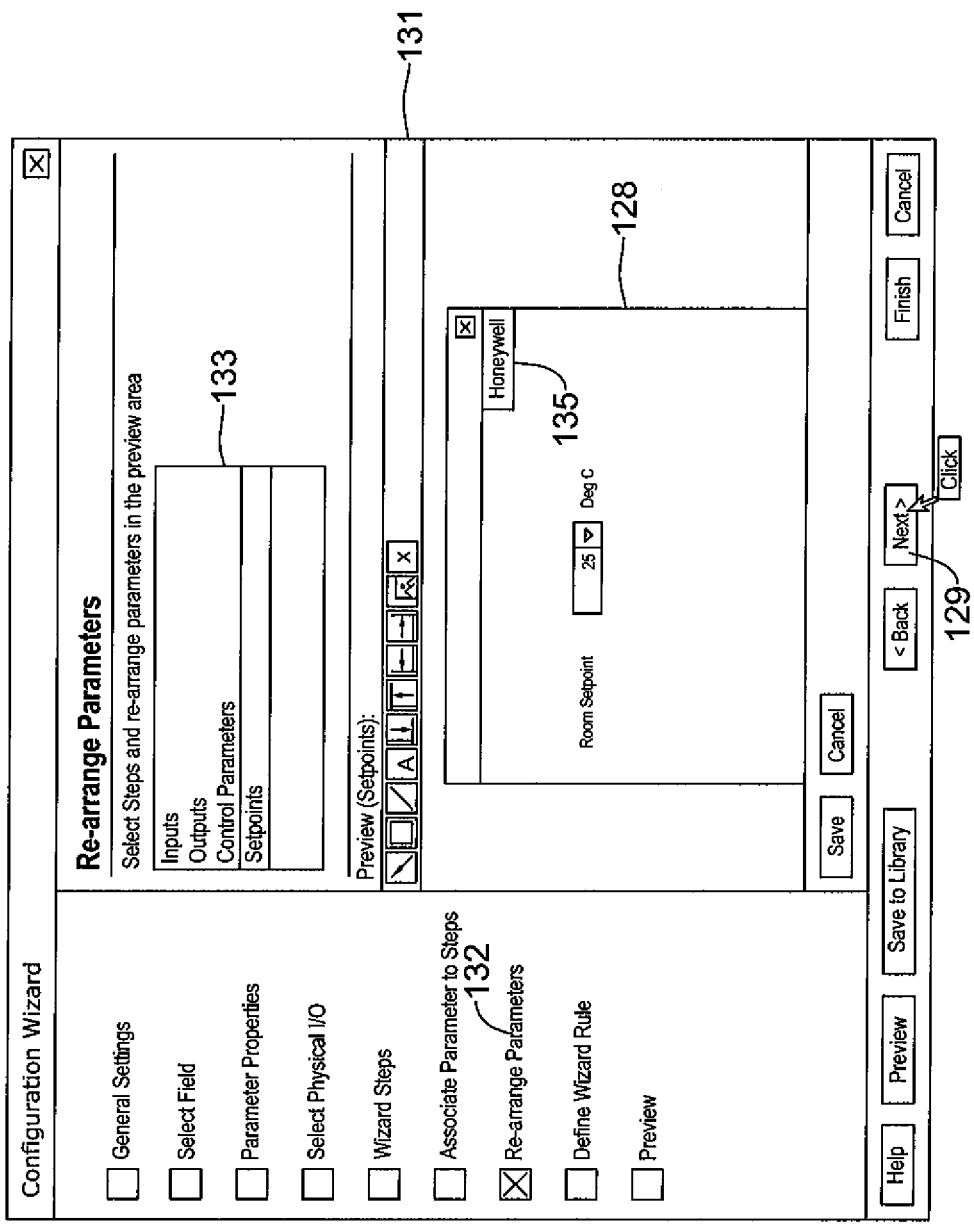

FIG. 22 is a diagram of a screen print 122 having a block 123 selected and entitled "Associate Parameter to Steps". Block 124 reveals a list of parameters and block 125 reveals a list of wizard steps. Parameters may be dragged and dropped to corresponding wizard steps. An input tab 126 may be clicked to pull up a name "Space Temp" under button 126 and a "Room Setpoint" which may be dragged from block 124 to block 125 under the "Setpoints" listing as shown by an arrow 127. "Space Temp" and/or "Room Setpoint" may be an illustrative example. Any such parameters may be discovered and setup.

A preview block 128 of a parameter is shown in FIGS. 21-24. Room setpoint is shown to be listed in blocks 125 and 128 of block 122 of FIG. 24. The Next button 129 may be clicked to get a diagram of a screen print 131 having a block 132 selected and entitled "Re-arrange Parameters", in FIG. 25.

Steps may be selected in block 133 and parameters may be re-arranged in a preview area. The Next button 129 may be clicked to get a screen print 131 as in FIG. 26. A block 134 may appear for inserting an image of, for example, a Honeywell logo, into a preview area. Clicking Next button 129 may bring forth a FIG. 27 revealing an insertion of the Honeywell logo in a preview area of screen print 131. Button 129 may be clicked for a next FIG. 28 of screen print 131 showing the Honeywell logo 135 placed in preview block 128.

Figure 29:
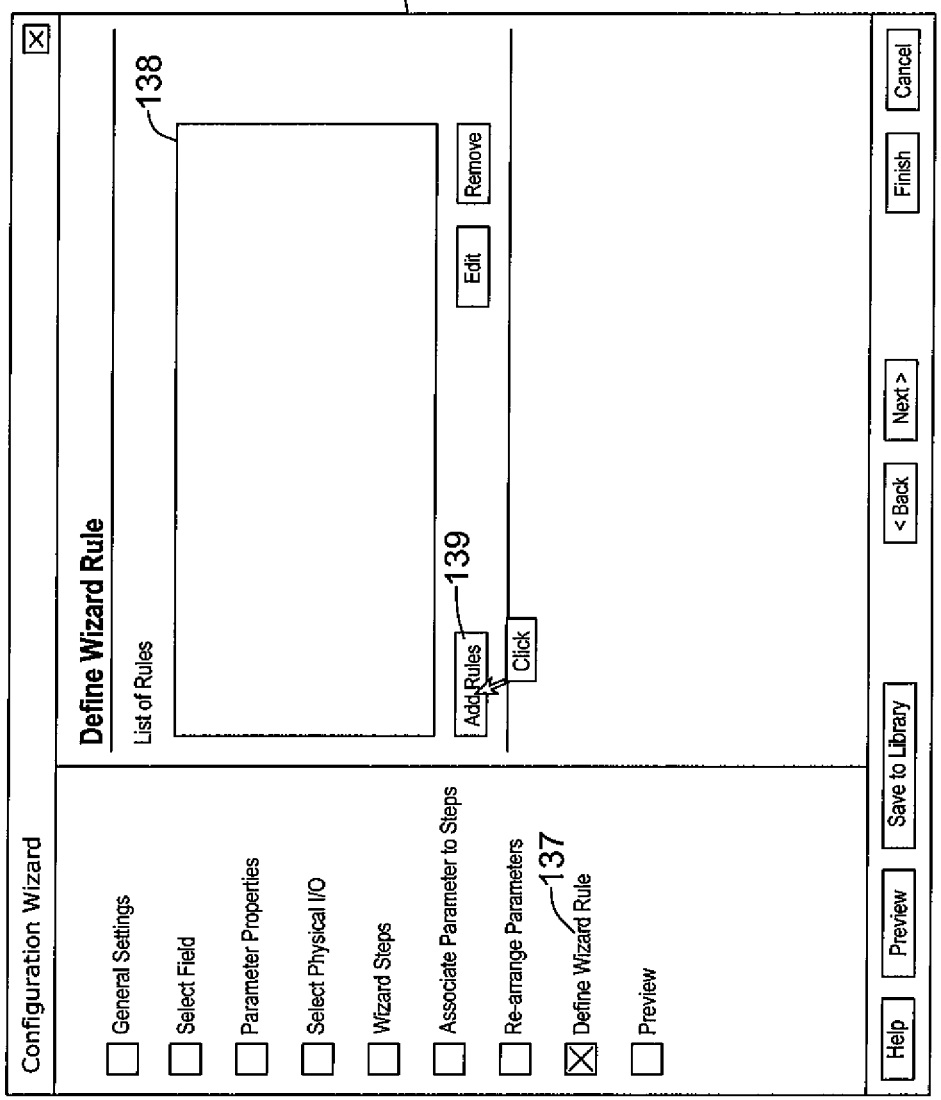
Figure 30:
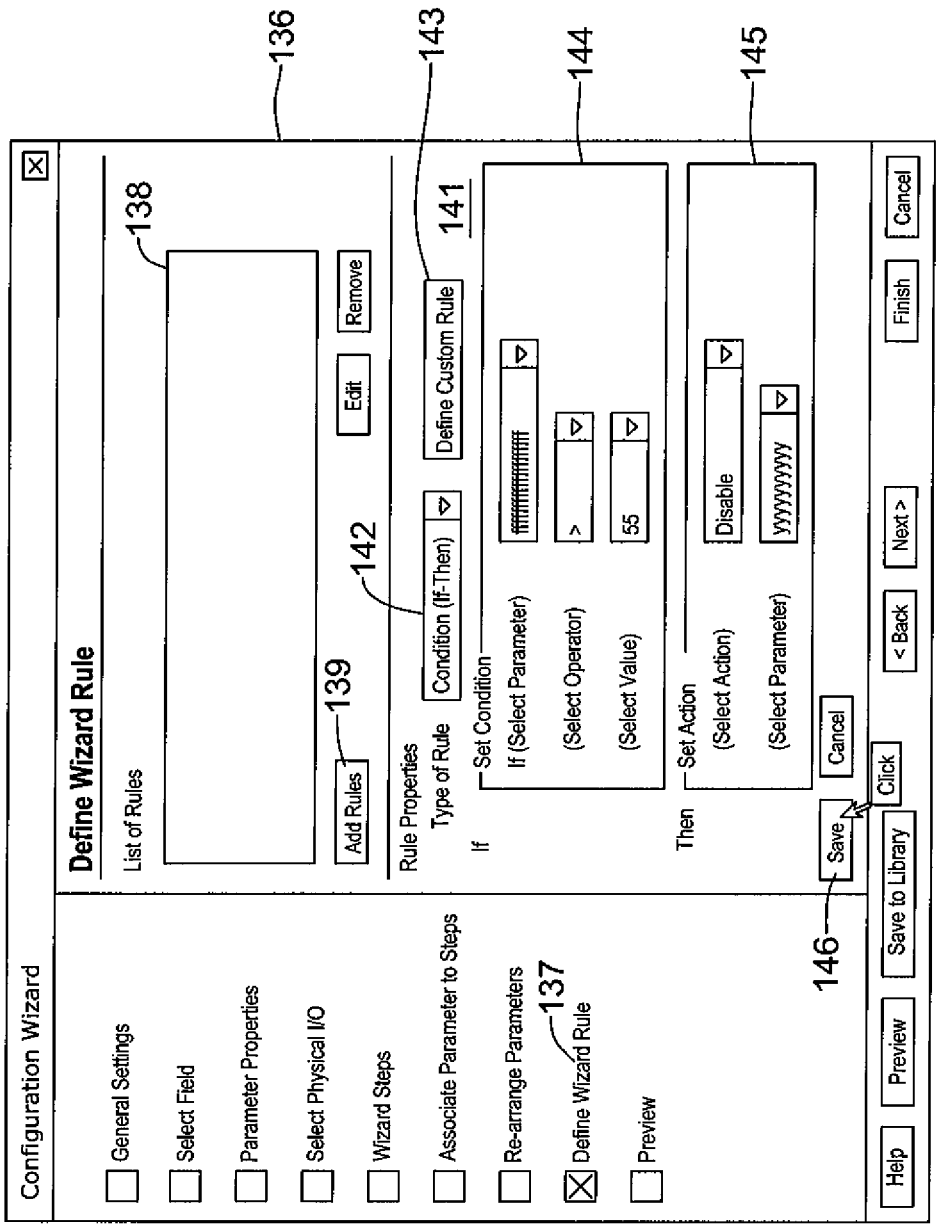
Figure 31:
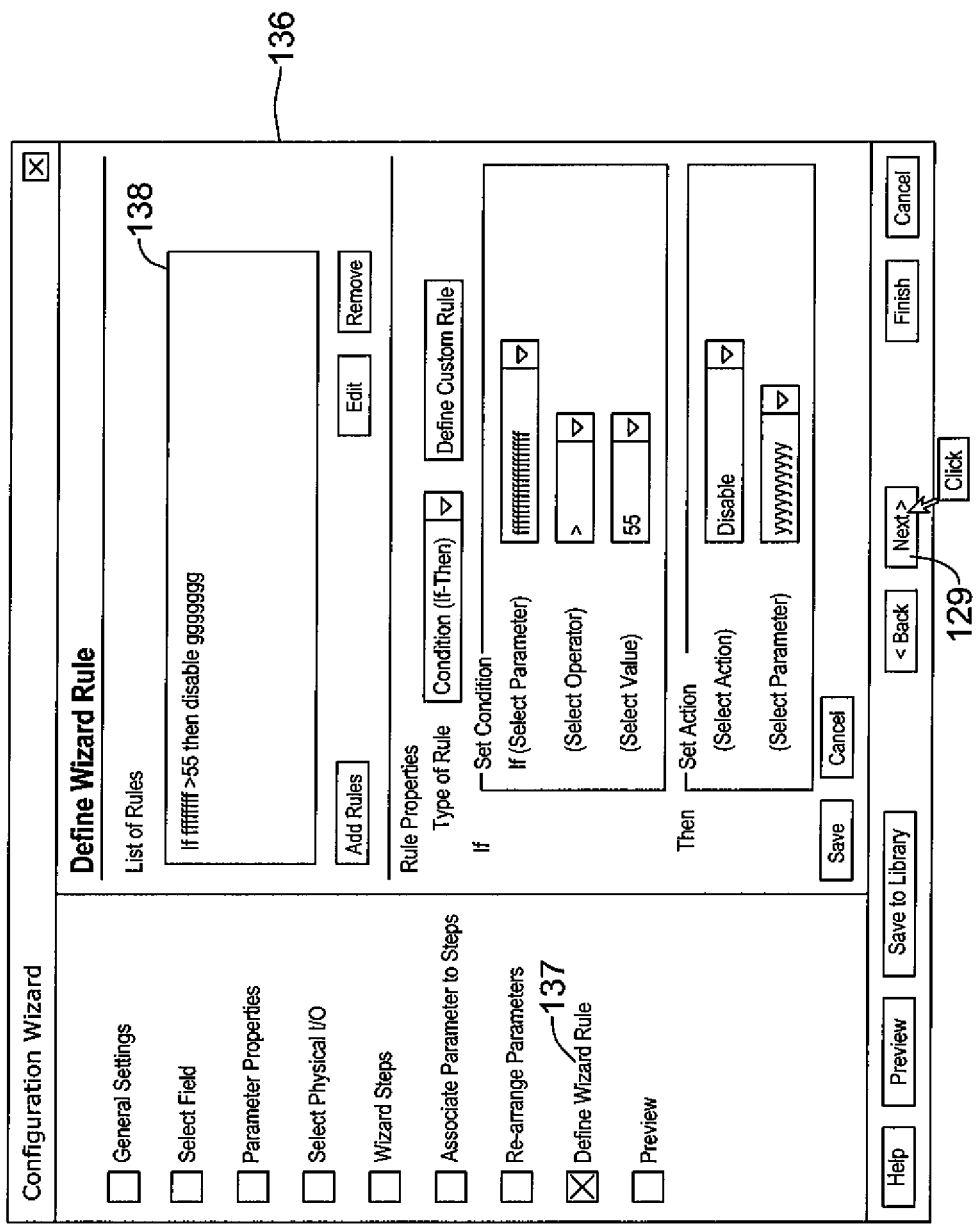

The Next button 129 may be clicked to get a FIG. 29 showing a screen print 136 revealing a selection of a "Define Wizard Rule" block 137. A block 138 may be an area for a list of rules in screen print 136. An "add rules" button may be clicked to bring forth a screen 136 having a rule properties block 141 as in FIG. 30. A type of rule or a custom rule may be selected in button 142 or 143, respectively. A condition in block 144 may be set with a parameter, an operator and a value. The "then" action may be selected with a parameter in block 145. A save button 146 may be clicked which puts an added rule into box 138 of screen 136 in FIG. 31.

Figure 32:
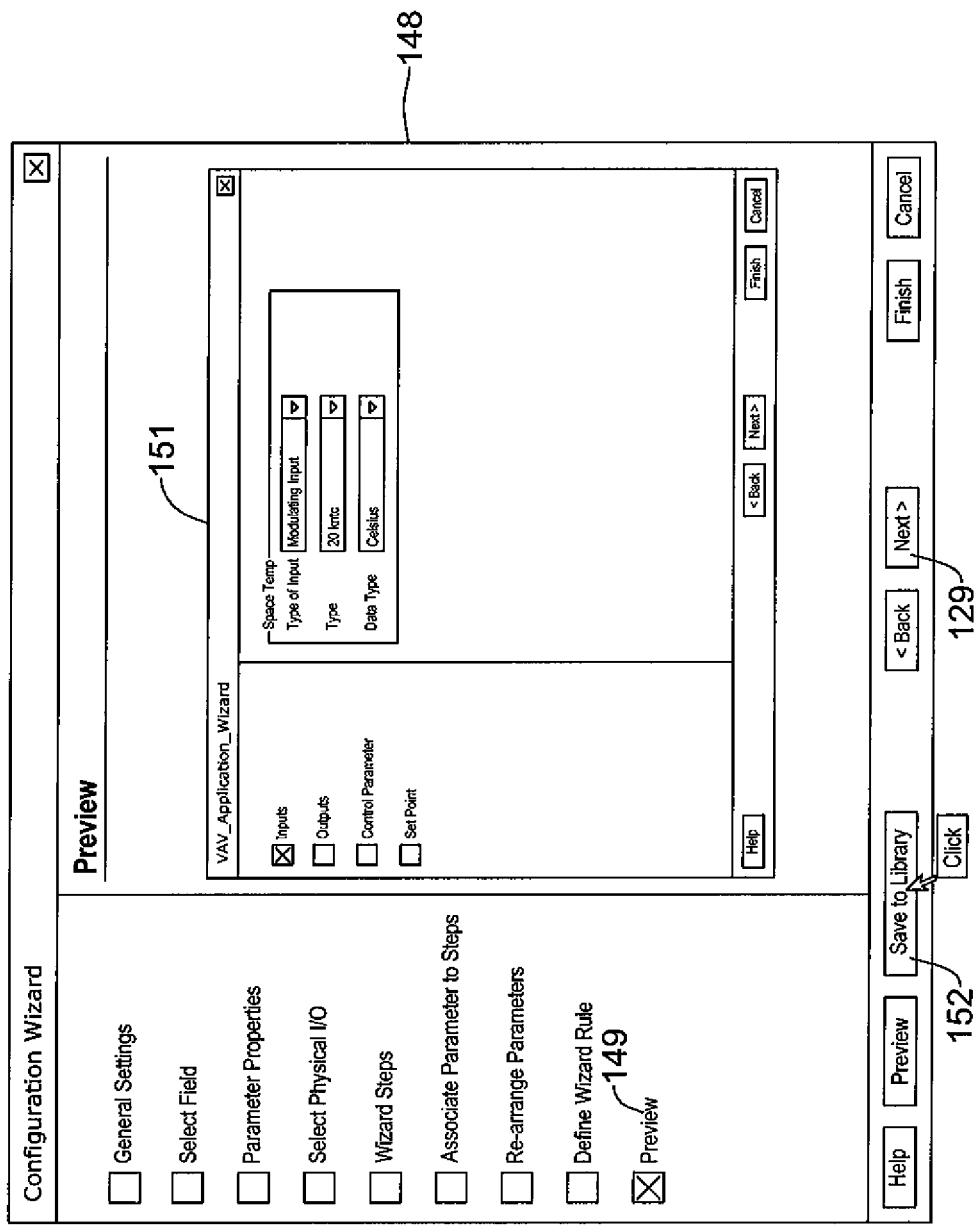

The Next button 129 may be clicked to move to a screen 148 in FIG. 32 which has a block 149 entitled "Preview" being selected. A block 151 shows a preview of inputs selected. Outputs, a control parameter or a setpoint may be selected for a preview. A "save to library" button 152 may be clicked.

Figure 33:
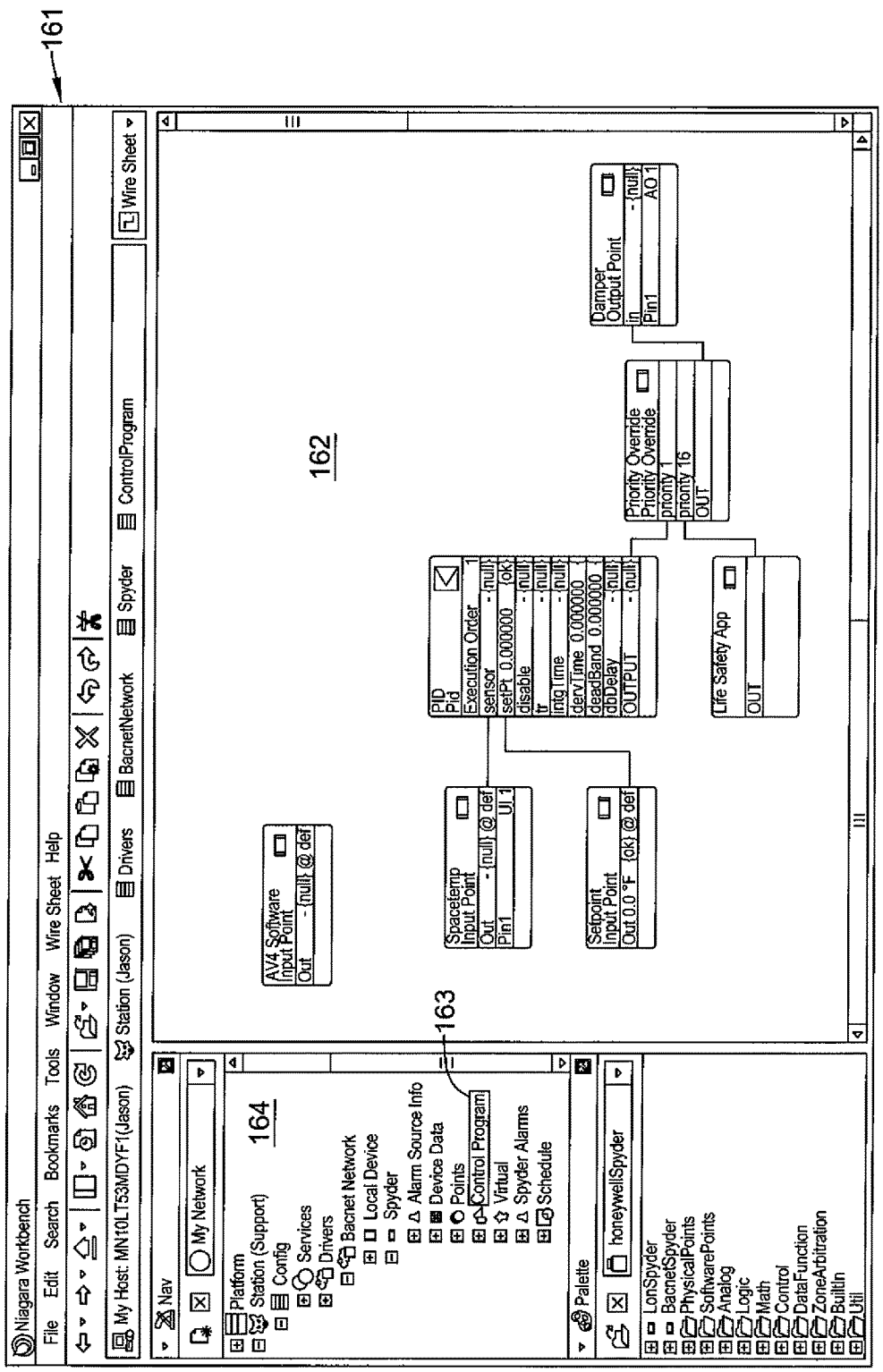
Figure 34:
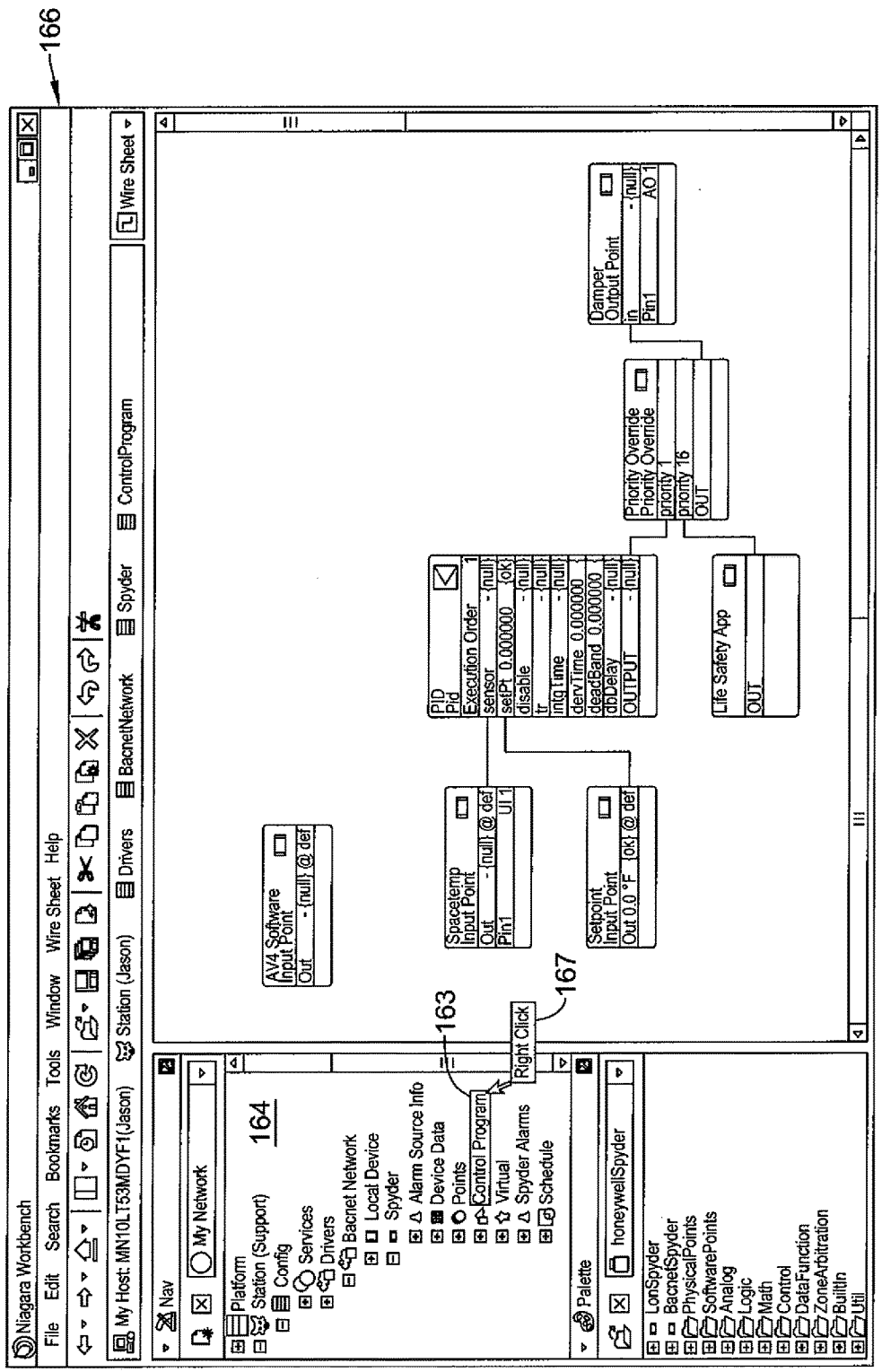
Figure 35:
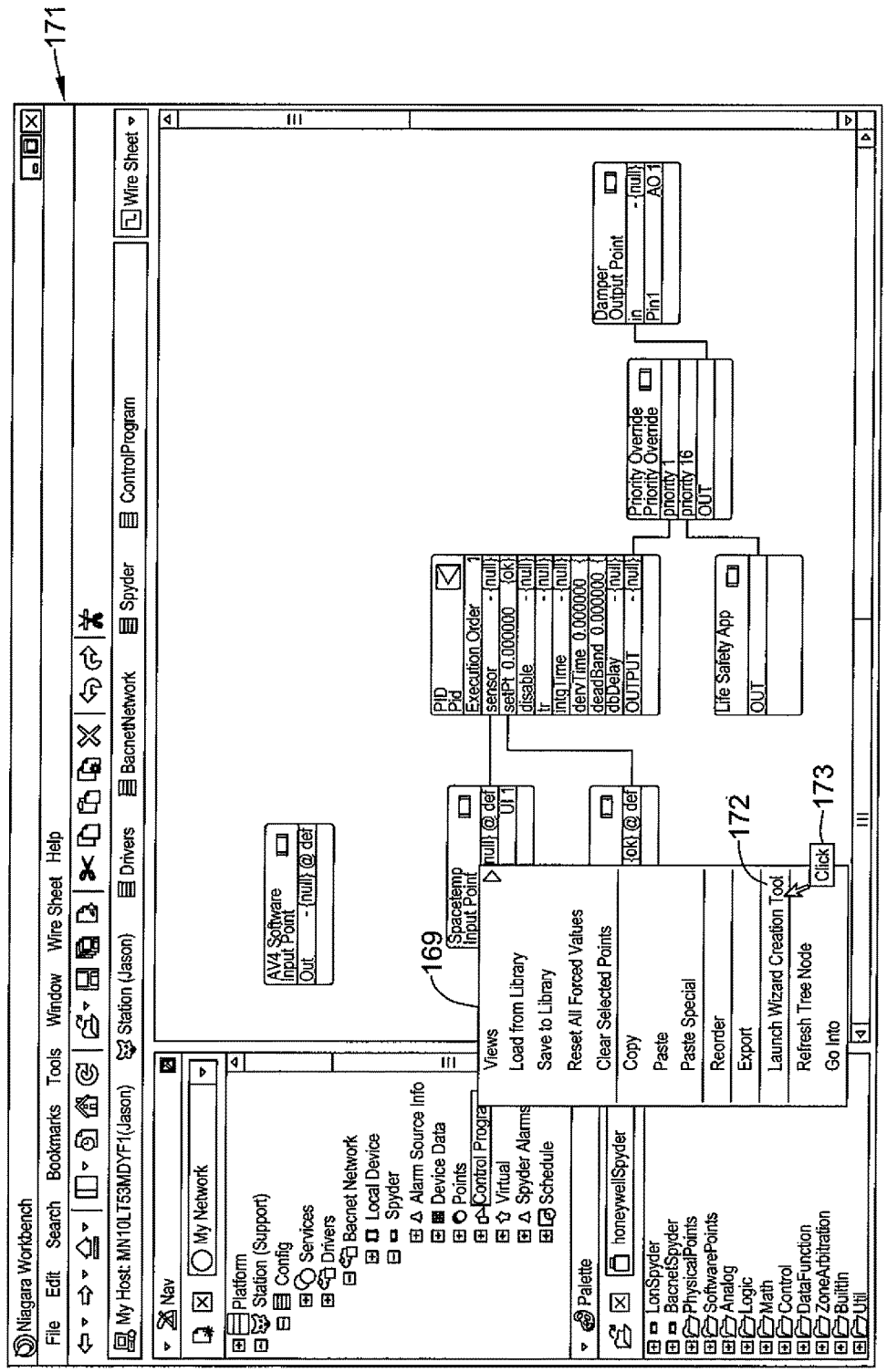
Figure 36:
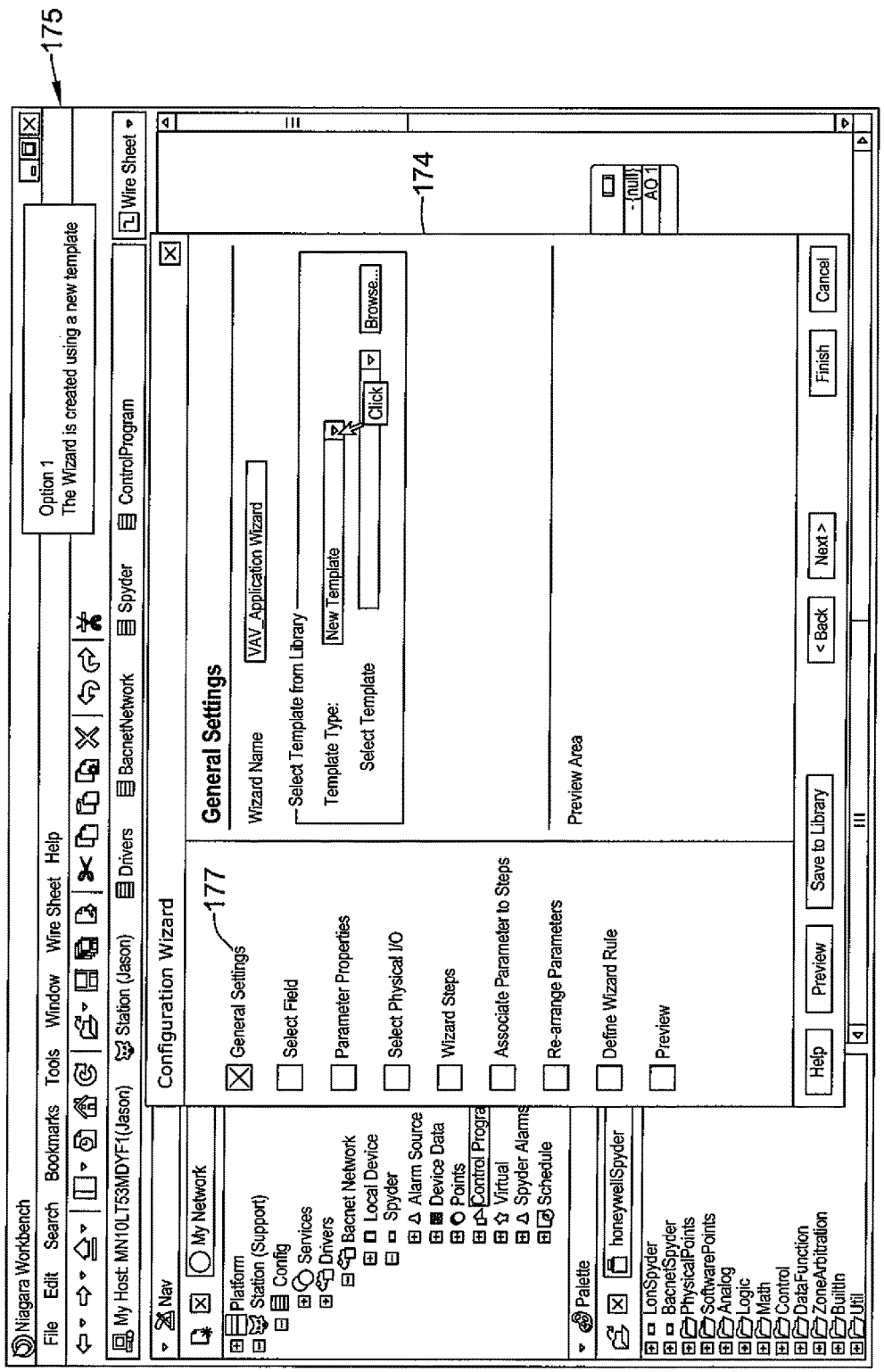

FIGS. 33-43 of diagrams of screen prints may illustrate a second scenario of a Spyder configuration wizard. An application may be created by using a Spyder programming tool. One may use an existing wizard template and customize it for the program. FIG. 33 is a diagram of a screen print 161 of a Niagara workbench in display 162 showing an engineering mode. A function block layout is shown. A control program label 163 is shown as selected in a navigation tree 164. In a diagram of a screen print 166 in FIG. 34, on label 163, there may be a right click 167 on control program 163. As a result of the right click 167, a menu 169 may drop down as shown in a screen print 171 of a diagram in FIG. 35. A label 172, entitled "Launch Wizard Creation Tool", may have a click 173 made on it. This click 173 may result in a "General Settings" menu 174 for a configuration wizard in FIG. 36. A wizard name and a selection of a library may be a part of general settings 177 in menu 174 of a screen print diagram 175. Here, an option 1 may be shown where the wizard is created using a new template.

Figure 37:
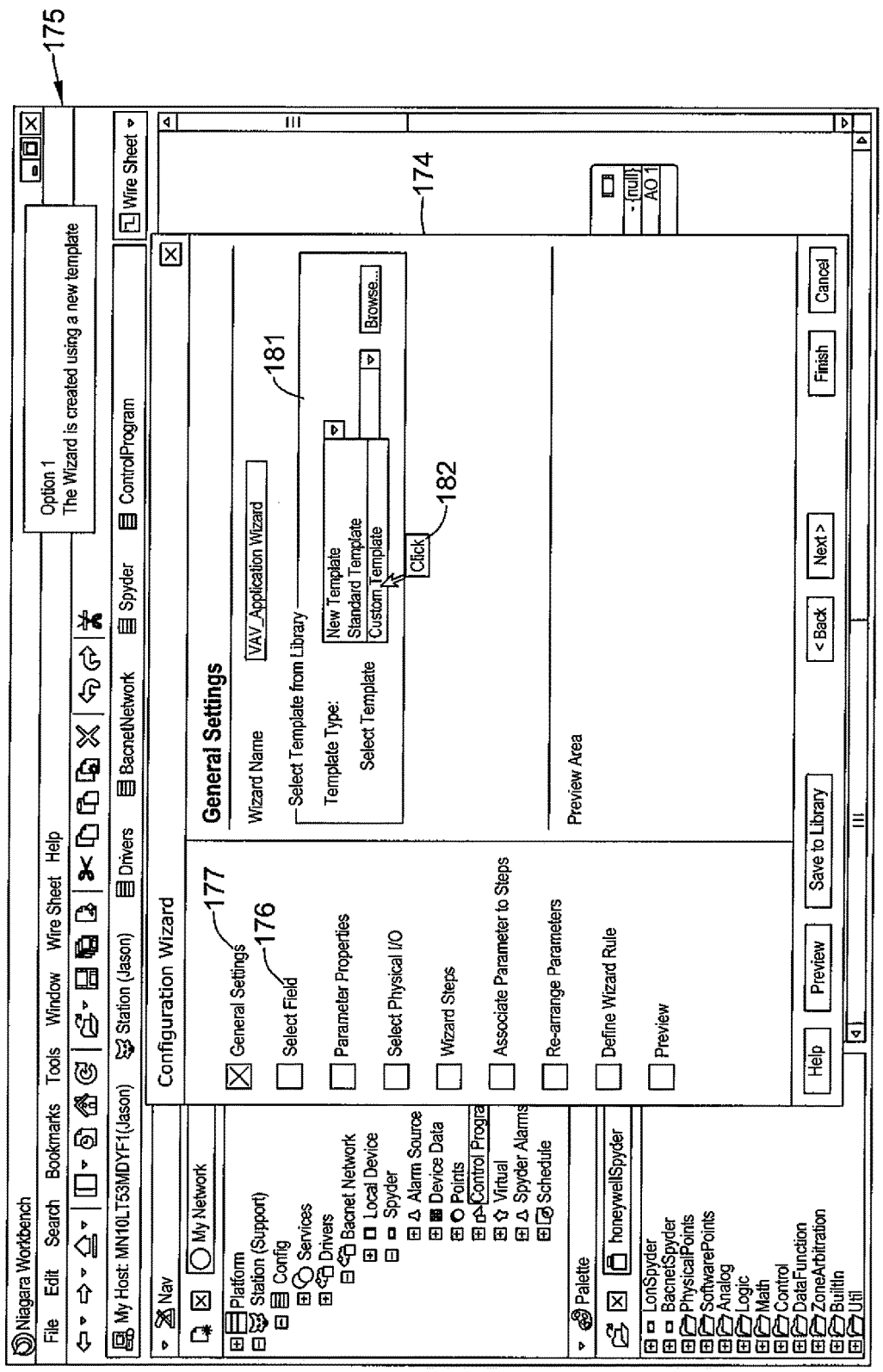

A selection 177, for a general settings box 174 of screen 175 in FIG. 37, shows a box 181 for selecting a template from a library. A template type may be selected from a drop-down menu 182 listing a new template, standard template and custom template, as examples. Here, a click on menu 182 may be on the custom template.

Figure 38:
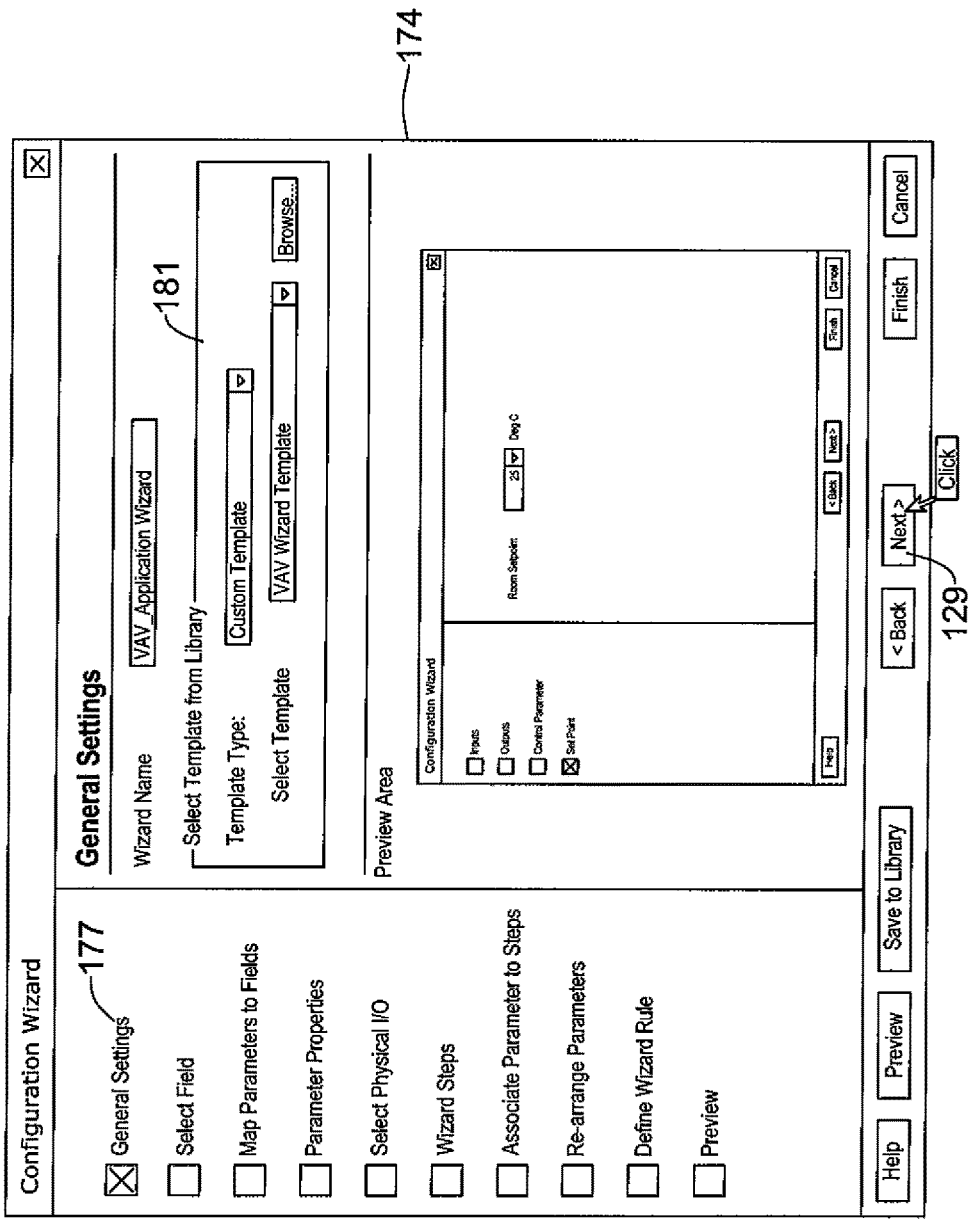
Figure 39:
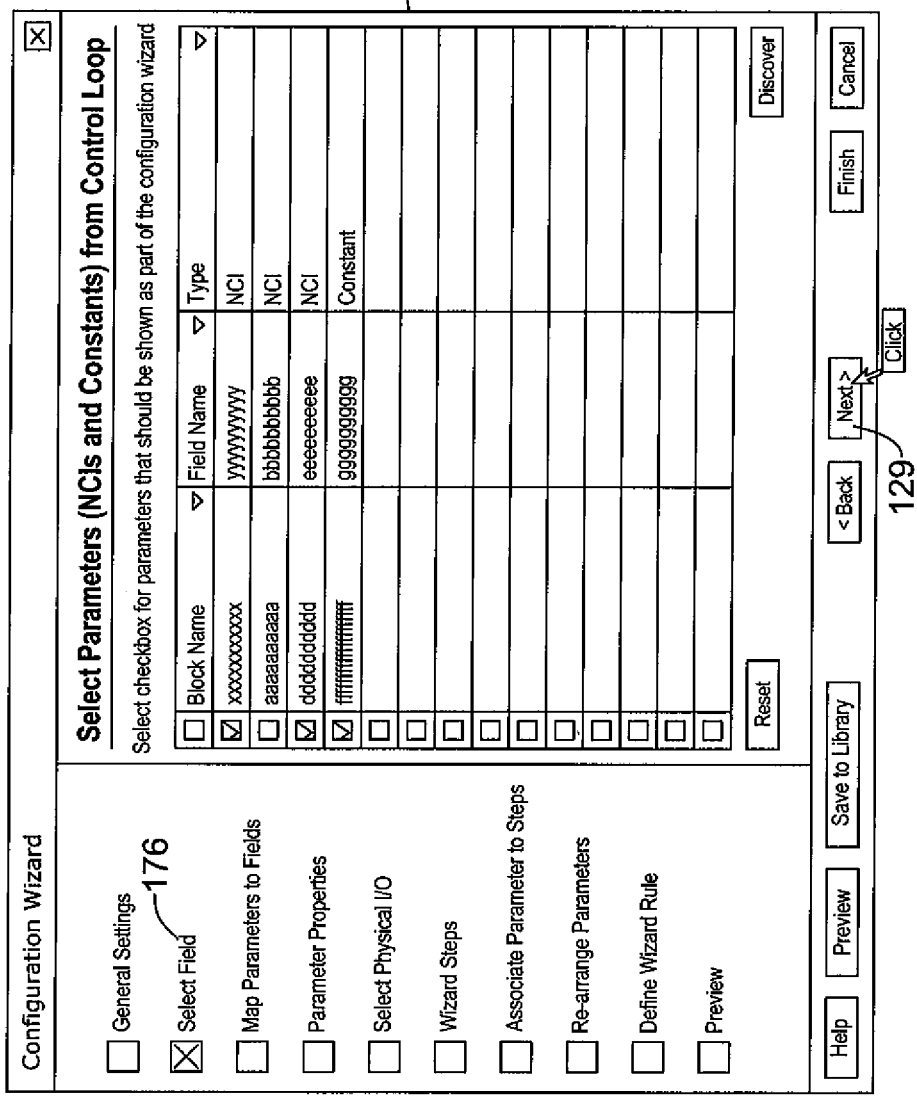

FIG. 38 shows the selection of custom template in box 181. The Next button 129 may be clicked to result in a select field 176 along with a box 184, as shown in FIG. 39. Box 184 may be for selecting parameters (NCIs and constants) from a control loop. Check boxes for various parameters may be selected which should be shown as a part of the configuration wizard. Upon selection, the Next button 129 may be clicked on to result in a selection 186 in FIG. 40 of a map parameters to fields and a box 187 where a field may be mapped to existing parameters in the template by selecting a field in a first table 188 at an example click or select 191, and selecting a corresponding parameter in a second table 189 at an example click or select 192.

Table 188 may be a list of selected fields and table 189 may be a list of existing parameters in templates. The result of selects 191 and 192 is shown in FIG. 41. A map button 194 may be clicked to show a mapped parameter room setpoint in table 188 and a mapped field for room setpoint in table 189, as shown in FIG. 42.

Figure 43:
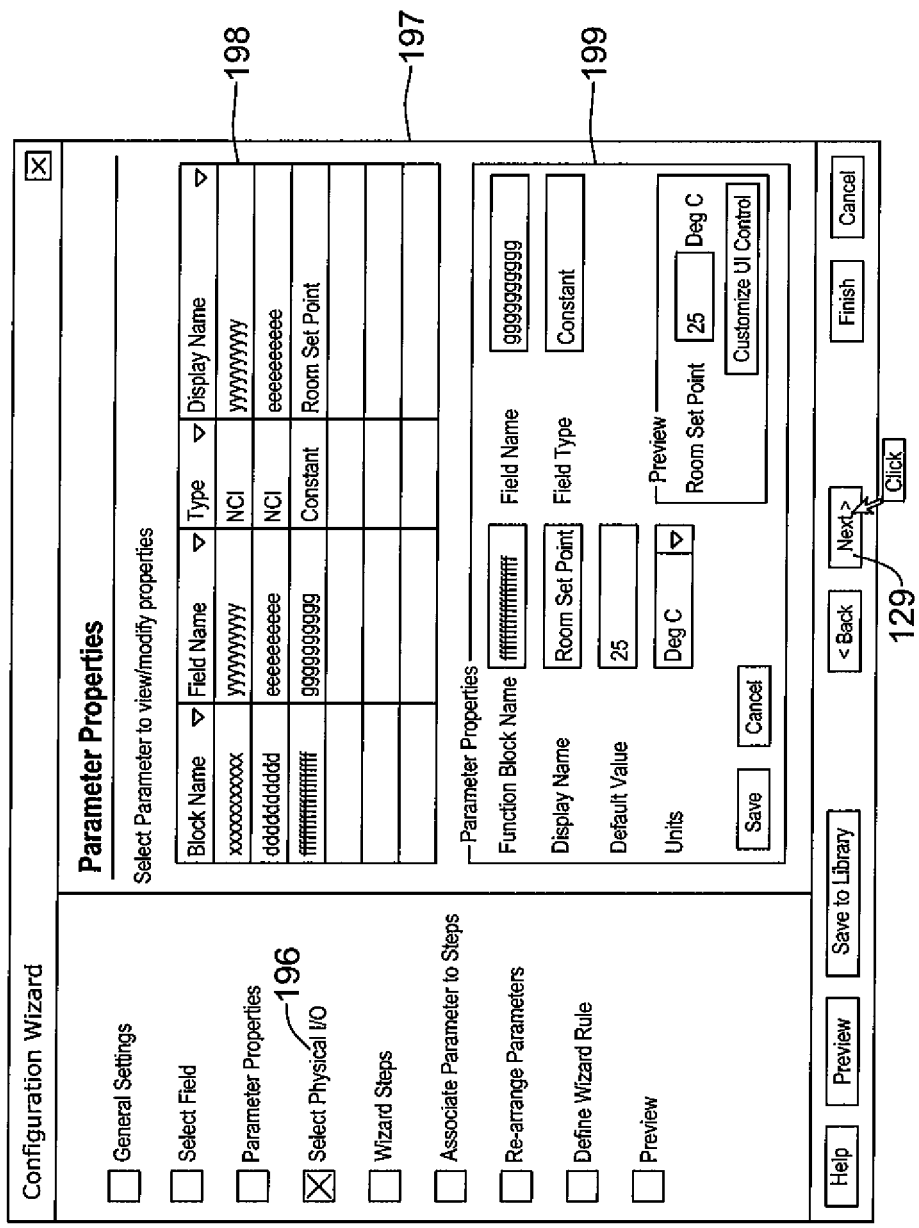

The Next button 129 may be clicked for a selection 196 of parameter properties in FIG. 43. A box 197 may appear for parameter properties. A parameter may be selected in table 198 to view or modify properties. The parameter properties, for the selected parameter in table 198, are shown in a box 199. The properties may be noted by function block name, field name, display name, field type, default value, and units. Box 199 may also show a preview. To proceed, a Next button 129 may be clicked.

Figure 44:
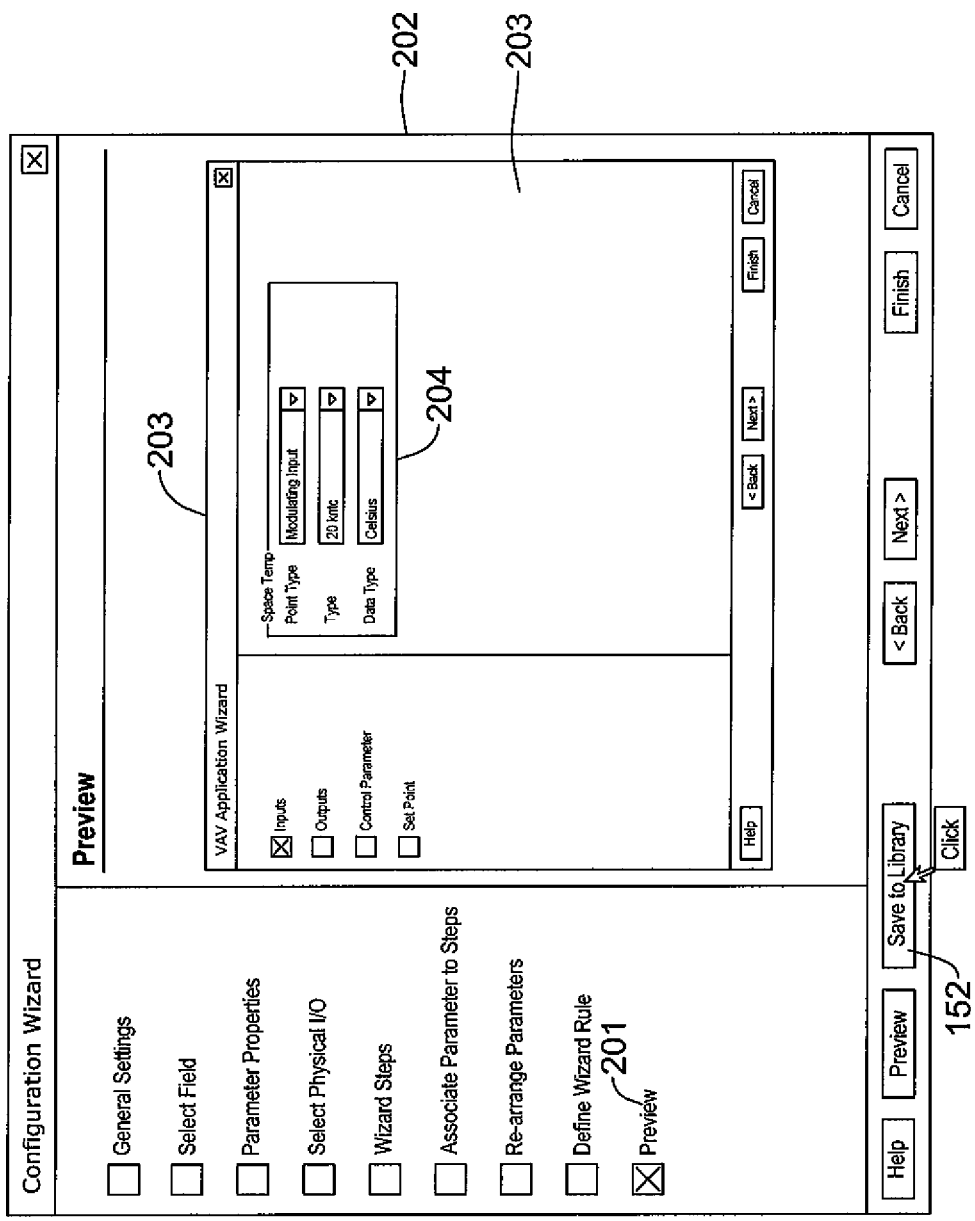
FIGS. 44-47 are diagrams of an illustrative example of an approach for saving a wizard in an application library for reuse according to a first option.
Figure 45:
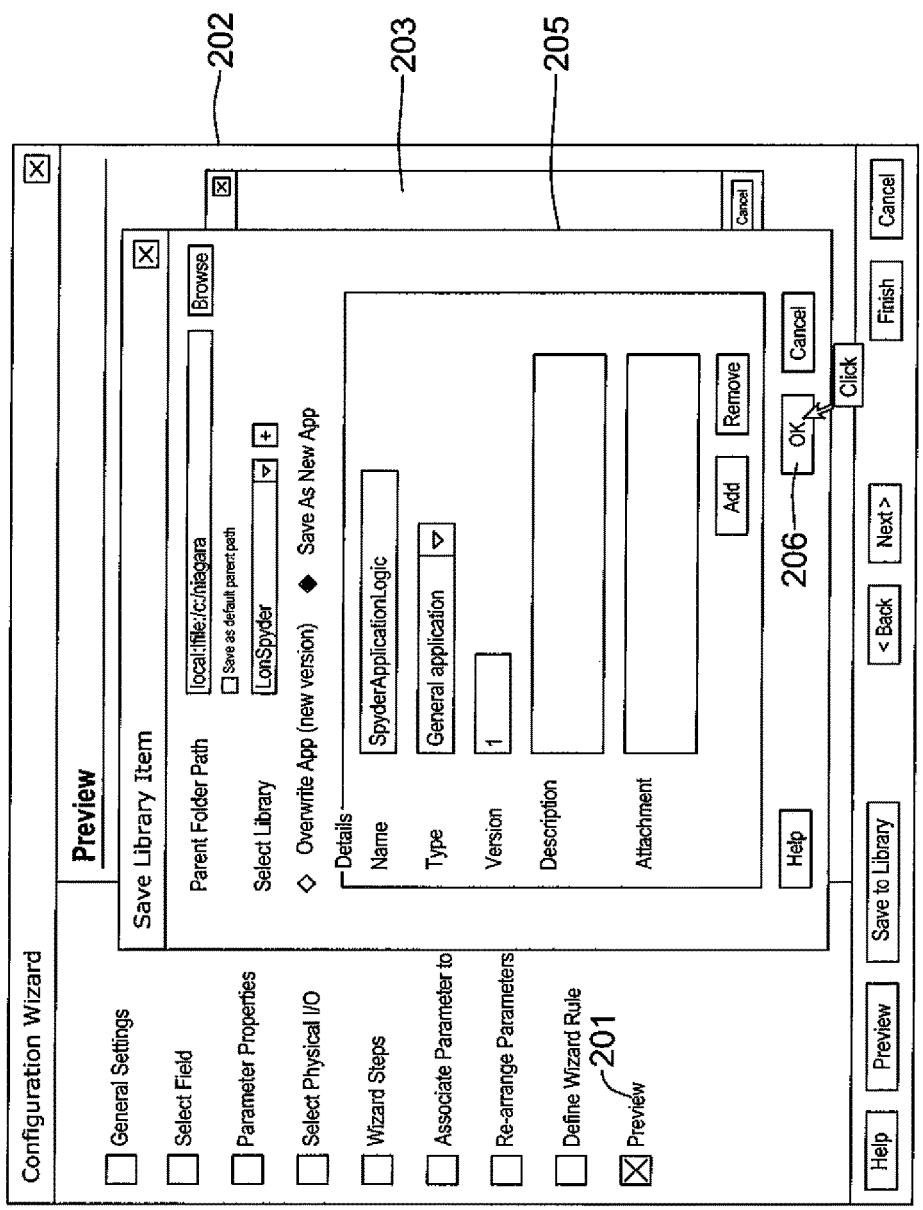

FIGS. 44-47 show an approach for saving wizard in an application library for reuse according to an option 1. In general, an application may be created using a Spyder programming tool. A wizard for the application may be created from the wizard creation tool. The wizard may be saved for different users. A selection 201 for preview with a preview box 202 is shown in FIG. 44. A box 203 for inputs, outputs, a control parameter and setpoint, is shown. Inputs may be selected and a box 204 may show information for space temperature. A save to library button 152 may be clicked. FIG. 45 may result with a box 205 for a save library item with information about a path, library and other details of the item in box 203. An OK button 206 may be clicked to pursue the save.

Figure 46:
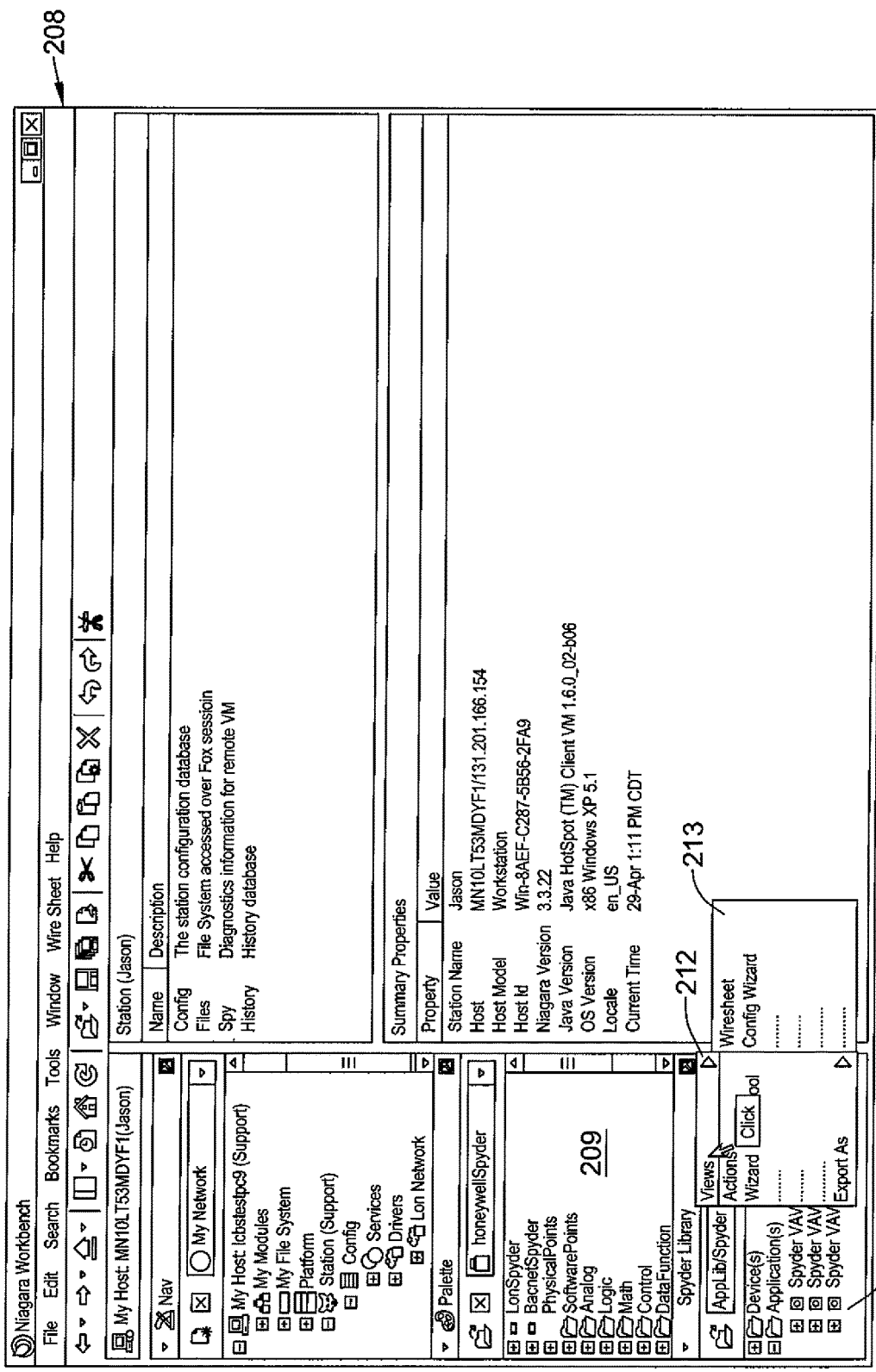
Figure 47:
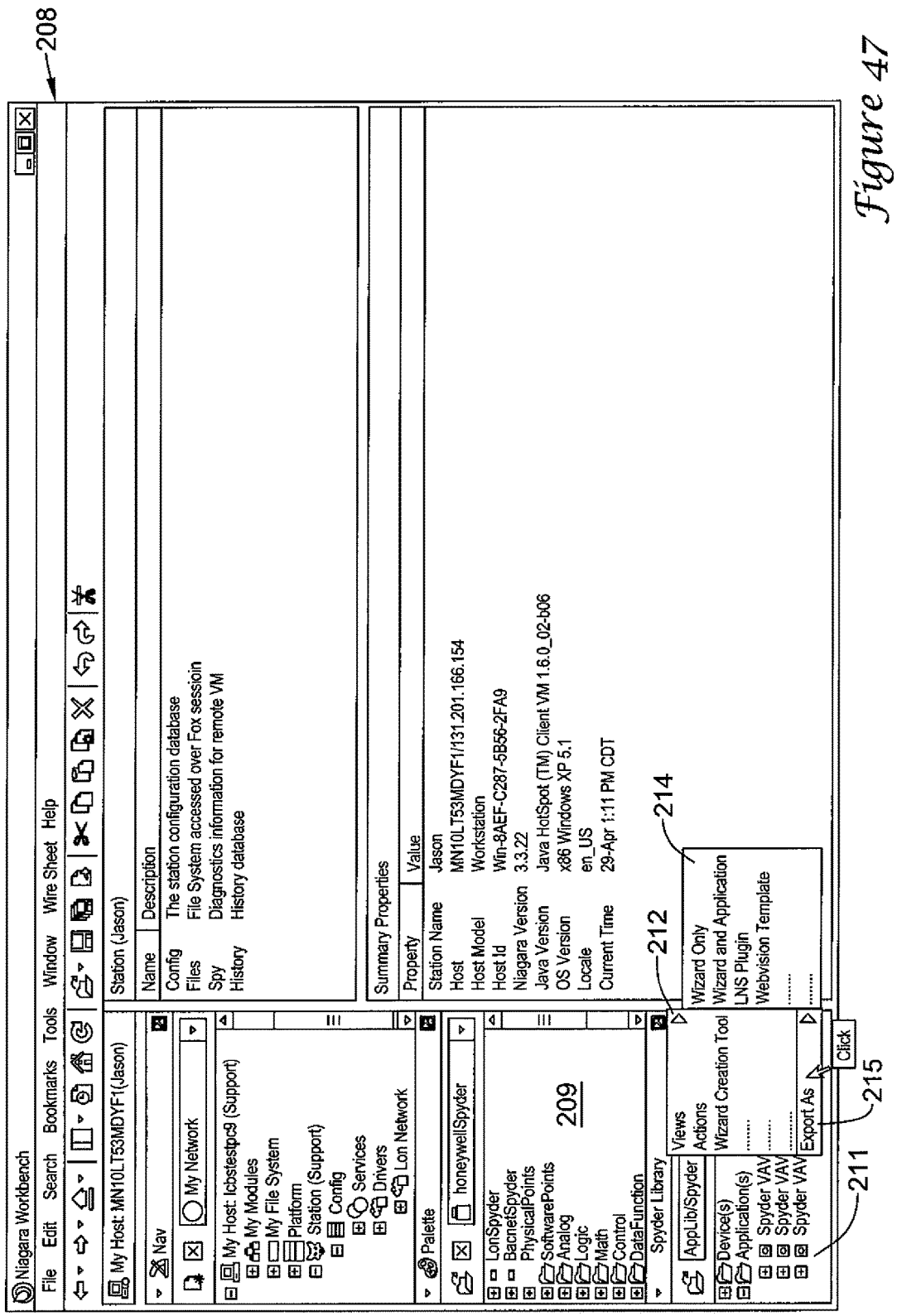

FIG. 46 is a diagram of a Niagara workbench screen 208. BACnet Spyder may be selected in Palette 209. Spyder VAV may be selected in applications of a Spyder Library 211. A drop-down menu 212 with views may be clicked to get another drop-down menu 213 showing "Wiresheet" and "Config Wizard".

BACnet Spyder may be selected in Palette 209. Spyder VAV may be selected in applications of Spyder Library to get the Views drop-down menu 212 but the "Export As" at 215 may be clicked to get a drop-down menu 214. For "export as", menu 214 may list "Wizard Only", "Wizard and Application", "LNS Plugin," "Webvision Template", and so forth.

FIGS. 48-57 may regard an option 2 for a wizard in the application library for reuse. Overall, an application may be created using a Spyder programming tool. A wizard for this application may be created from a wizard creation tool. The wizard may be saved for different users.

Figure 48:
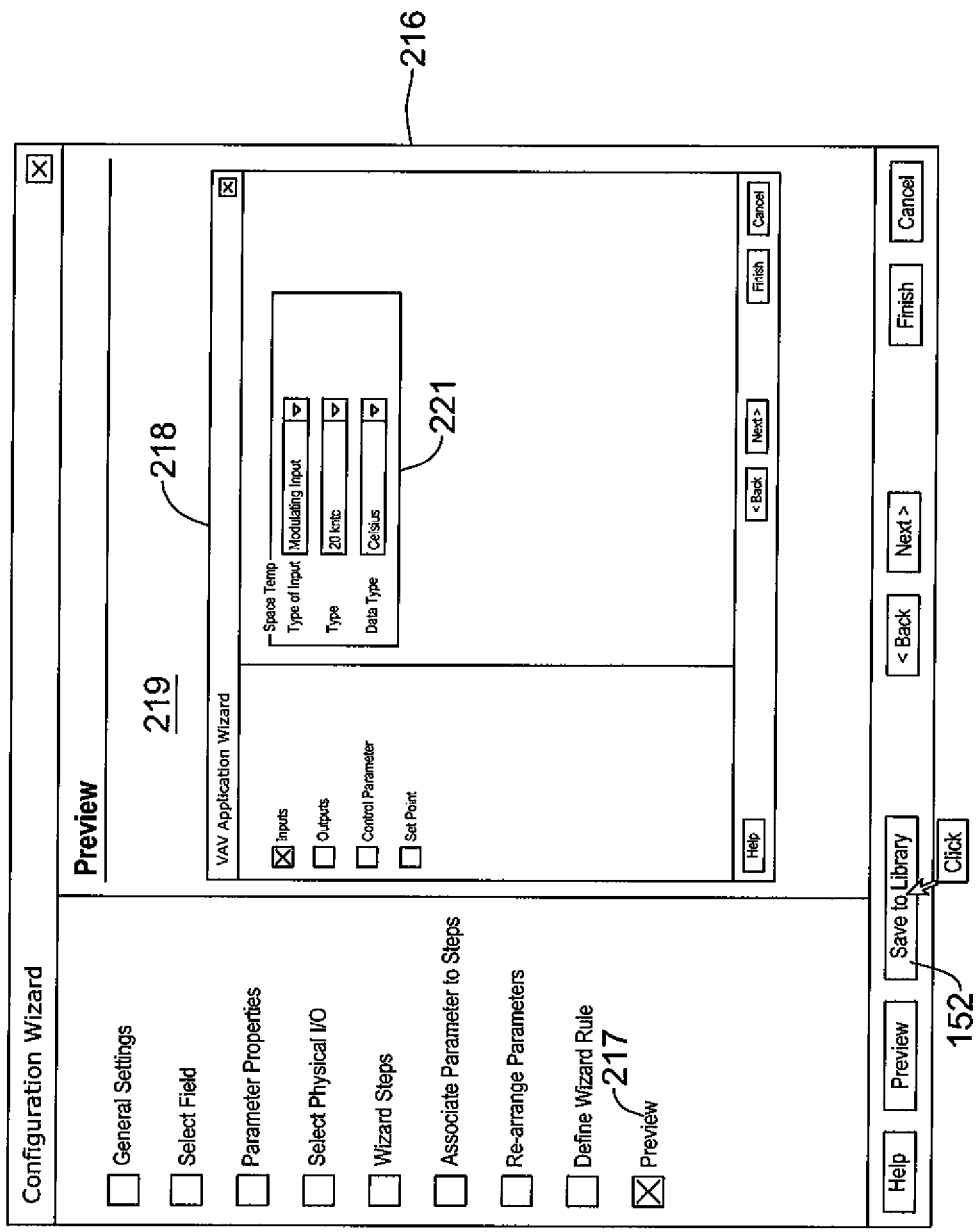
FIGS. 48-57 are diagrams of an illustrative example of an approach for saving a wizard in an application library for reuse according to a second option.
Figure 49:
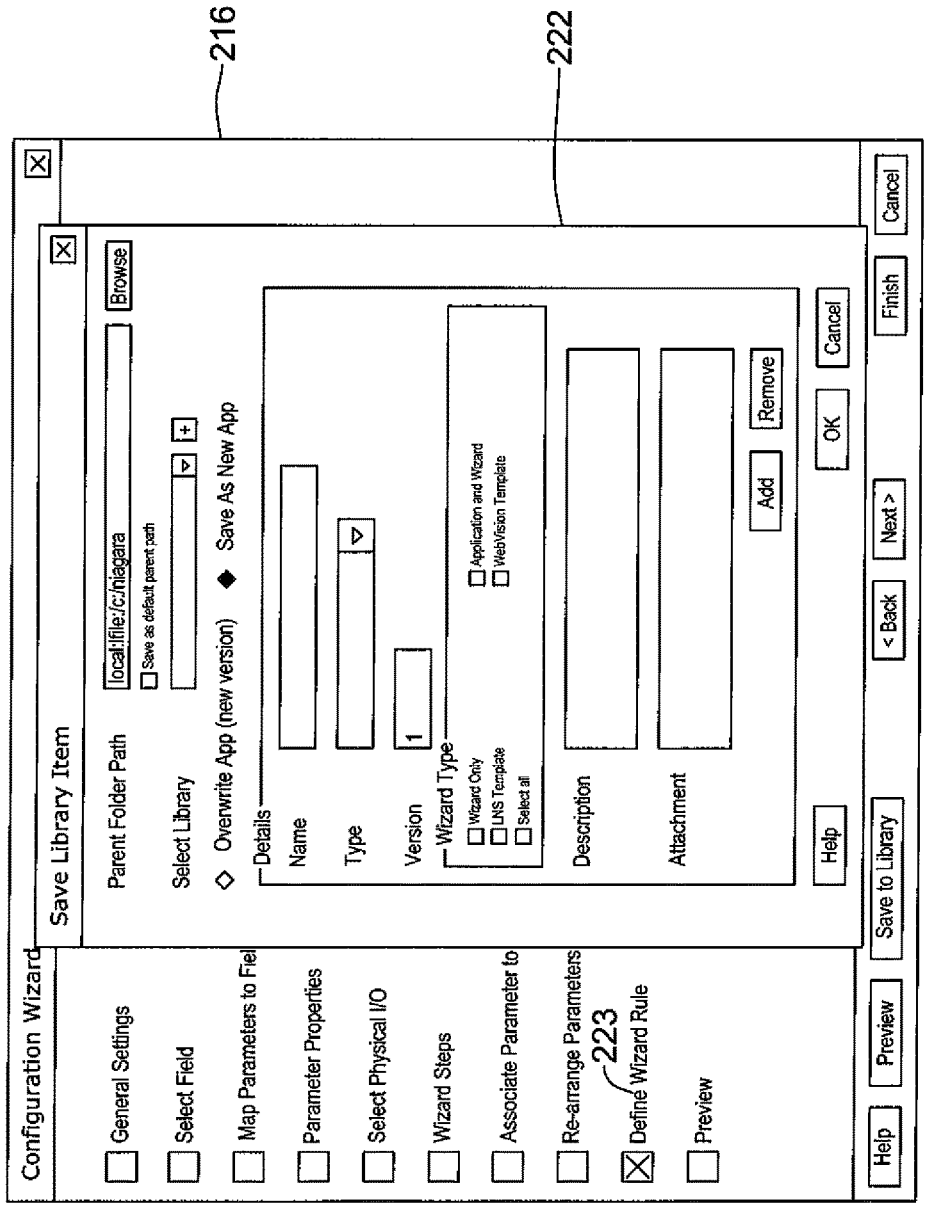
Figure 50:
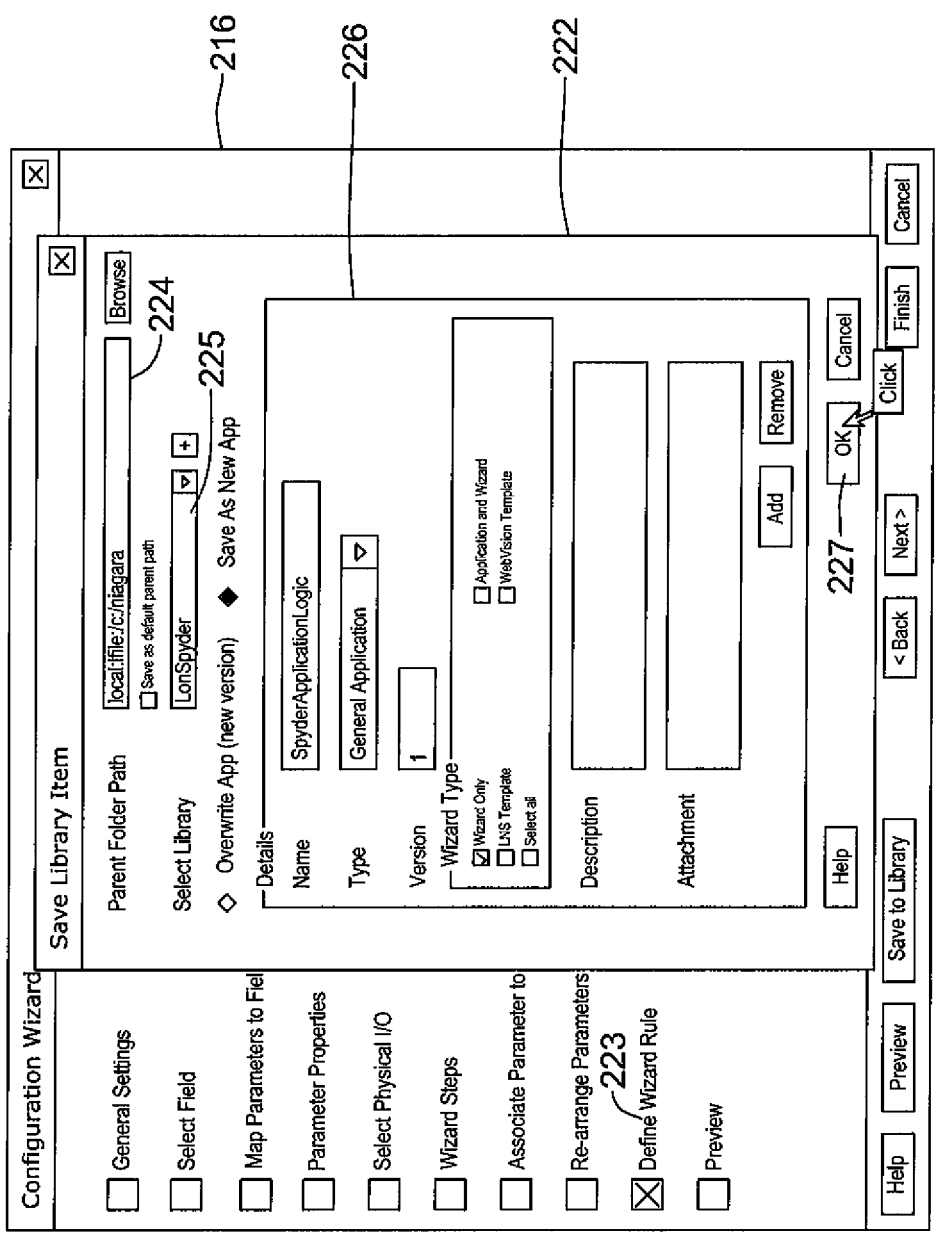

FIG. 48 shows a screen 210 with a "Preview" box 217 selected in the lower left portion of screen 210. A box 218 of a VAV application wizard may be present in a preview area 219. Box 218 may have layouts for inputs, outputs, control parameter and set point. In box 218 of FIG. 48, inputs may be selected, for example, with an instance of Space Temp 221. This preview may be saved to the library with a click of button 152. A save library item box 222 may come up on screen 216 in FIG. 49. A block 223, entitled "Define Wizard Rules", may be selected. In block 222, the parent folder path may be indicated in a slot 224. A library such as LonSpyder™ may be selected as an example in a select library slot 225, as shown in FIG. 50. A details block 226 may indicate a name of Spyder Application Logic and a type of general application. The wizard type selected may be checked as "Wizard only". An OK button 227 may be clicked for saving the library item.

Figure 51:
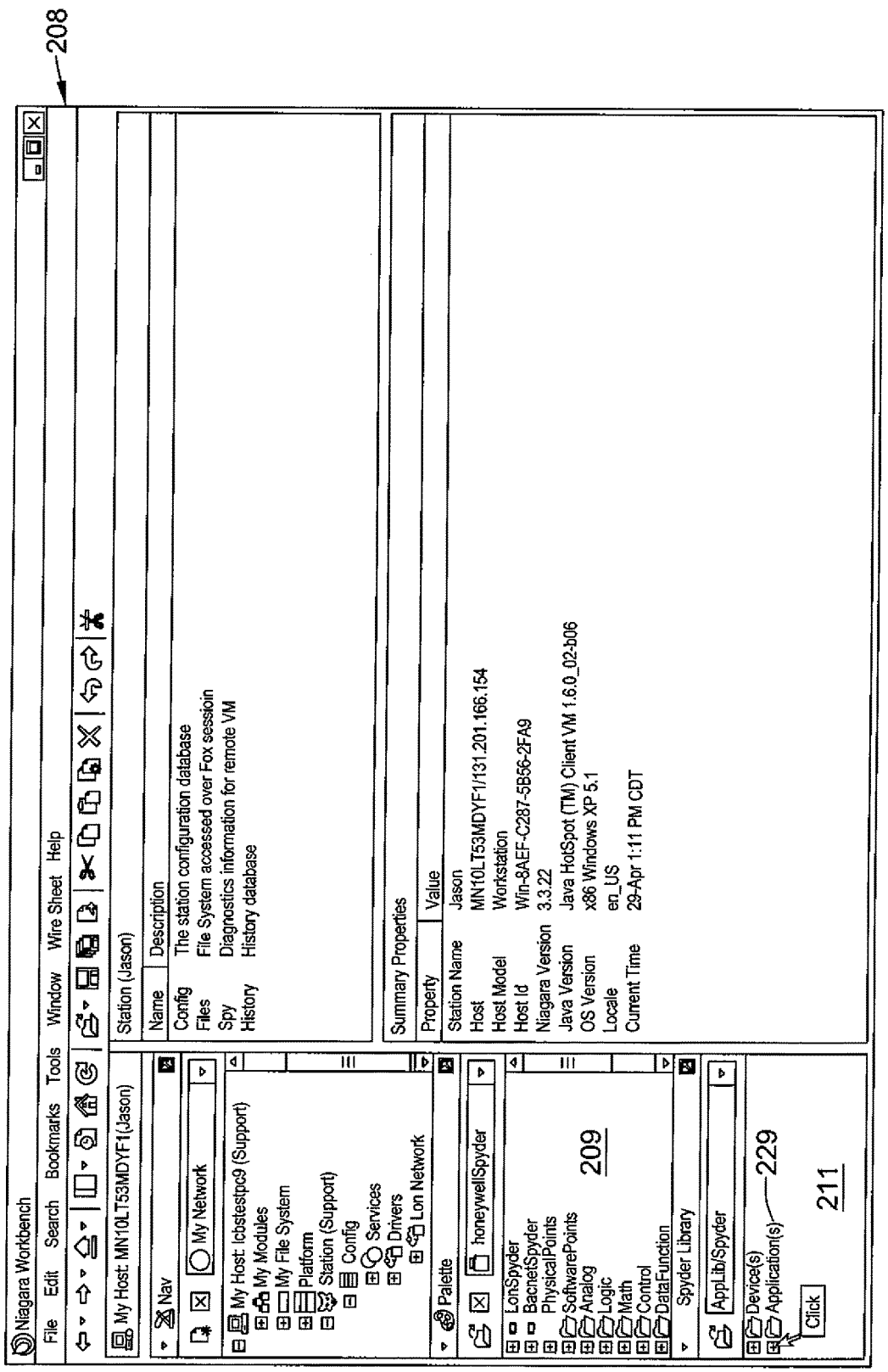
Figure 52:
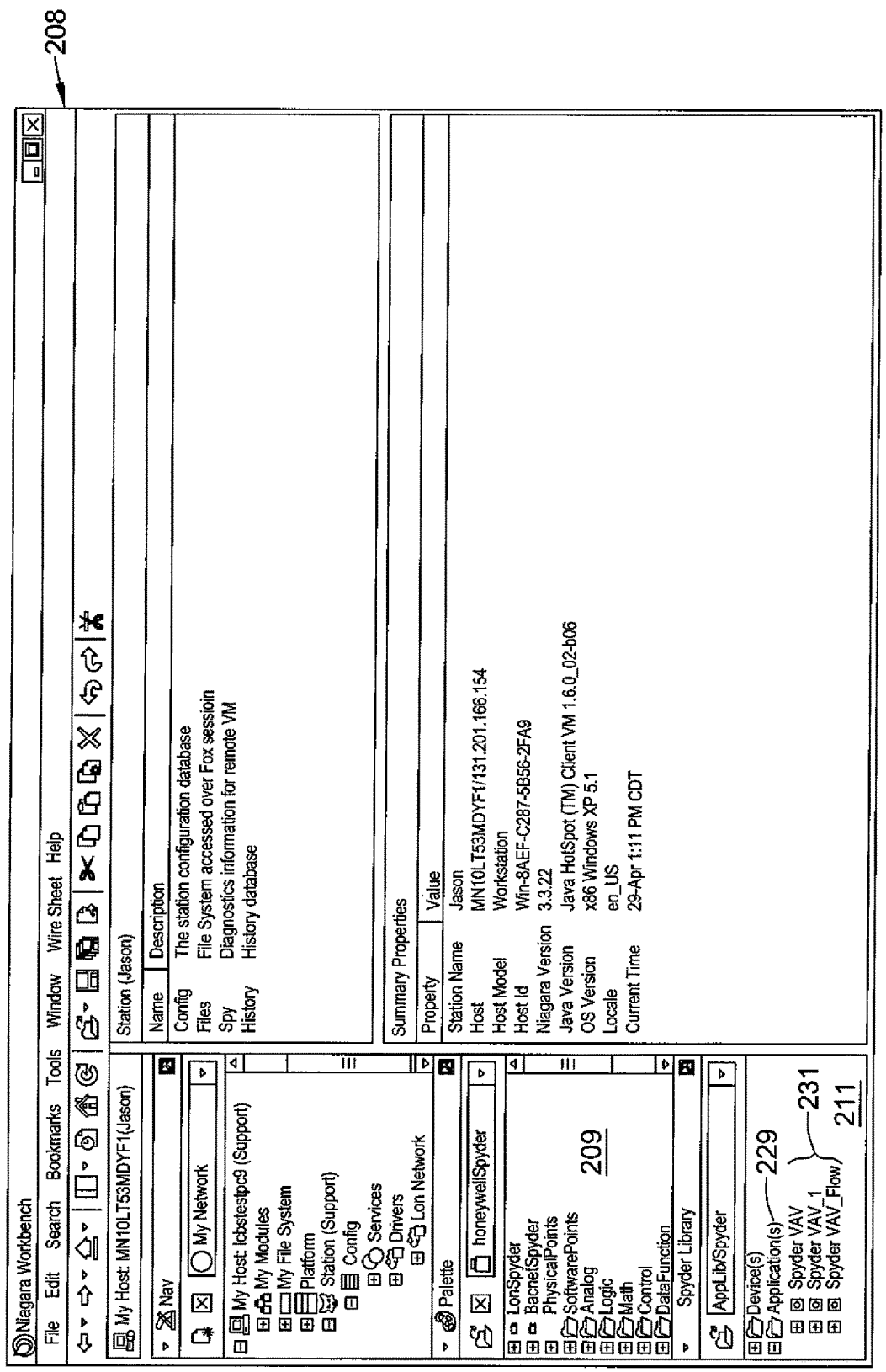
Figure 53:
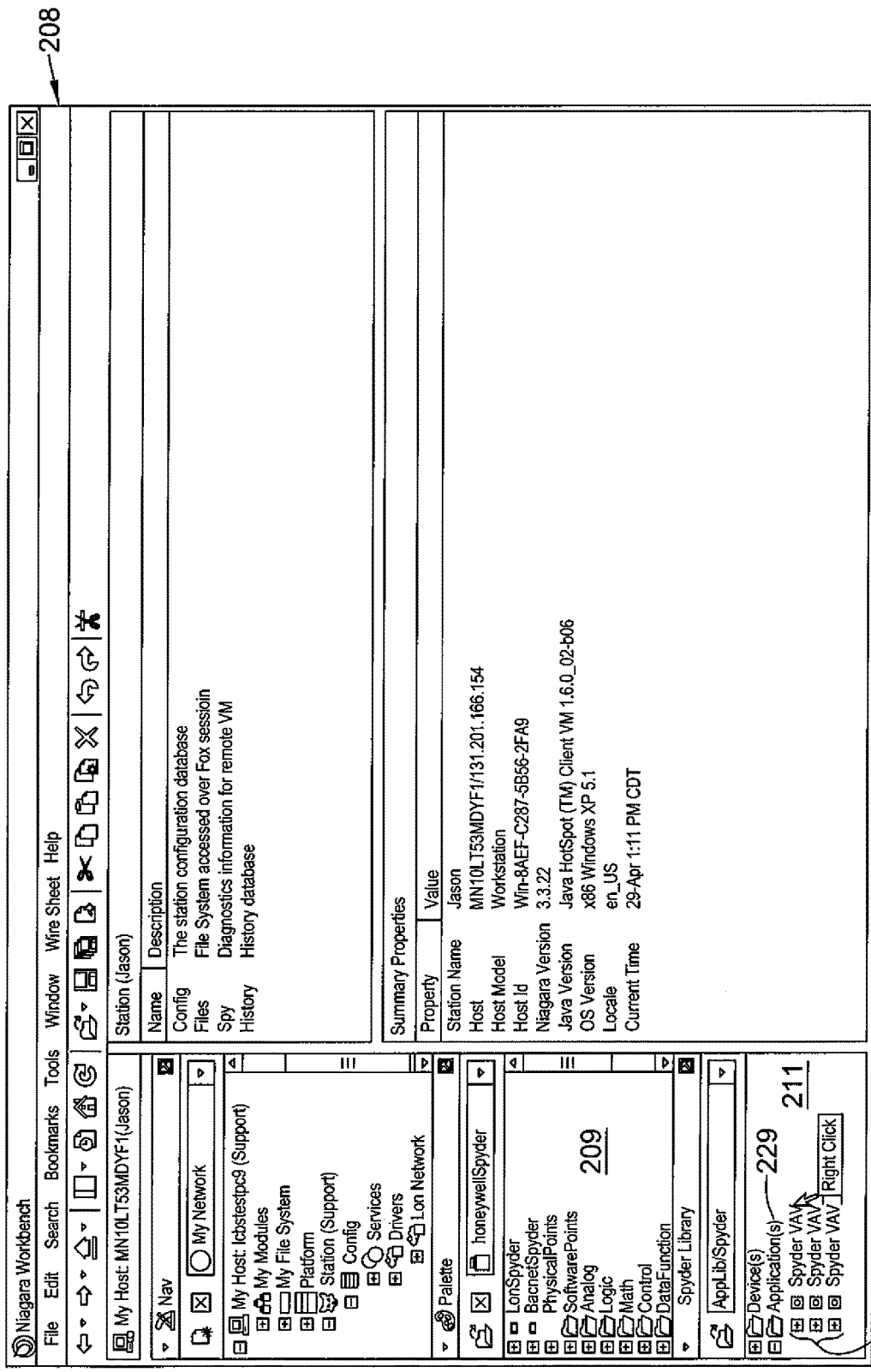
Figure 54:
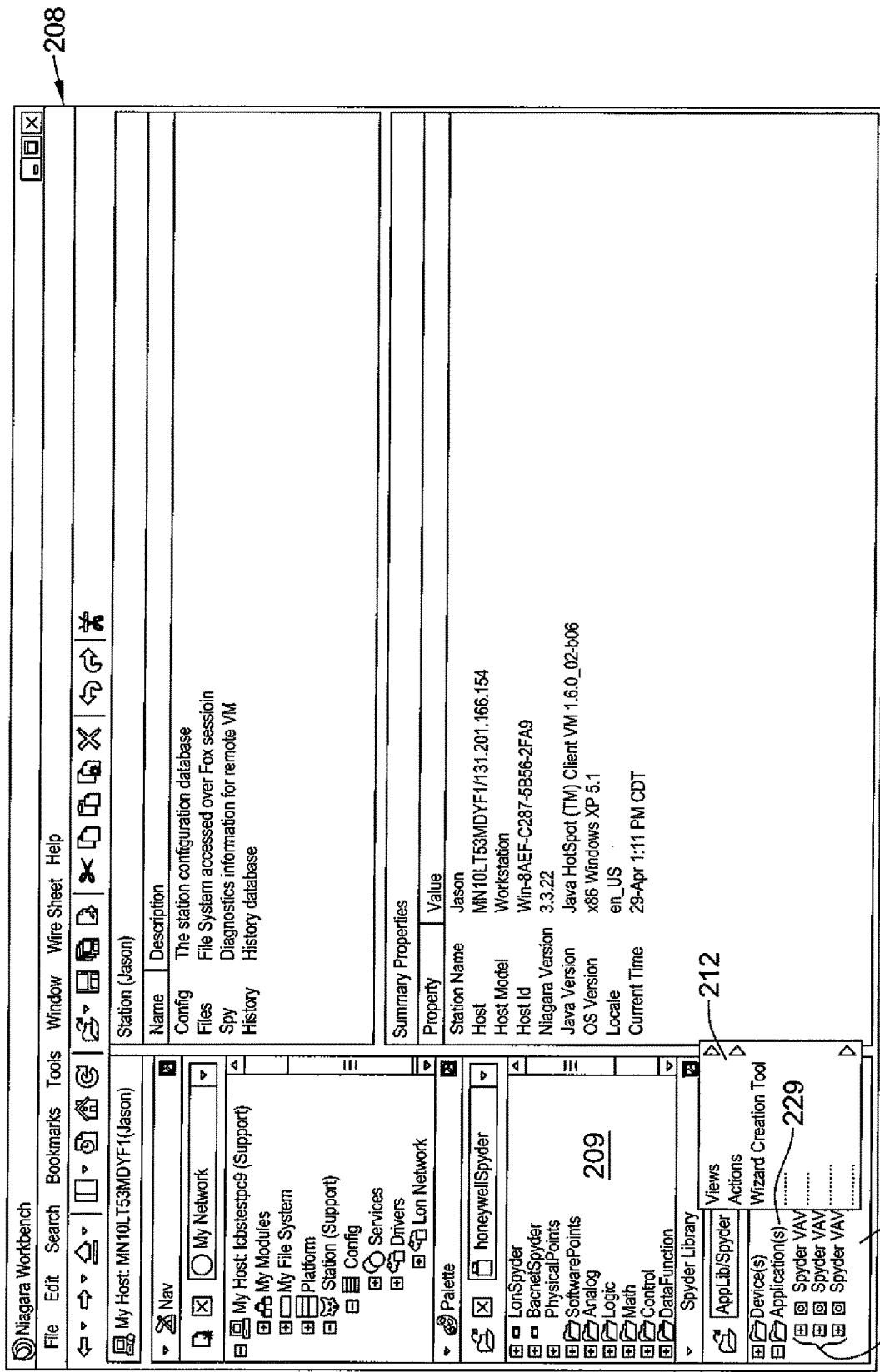
Figure 55:
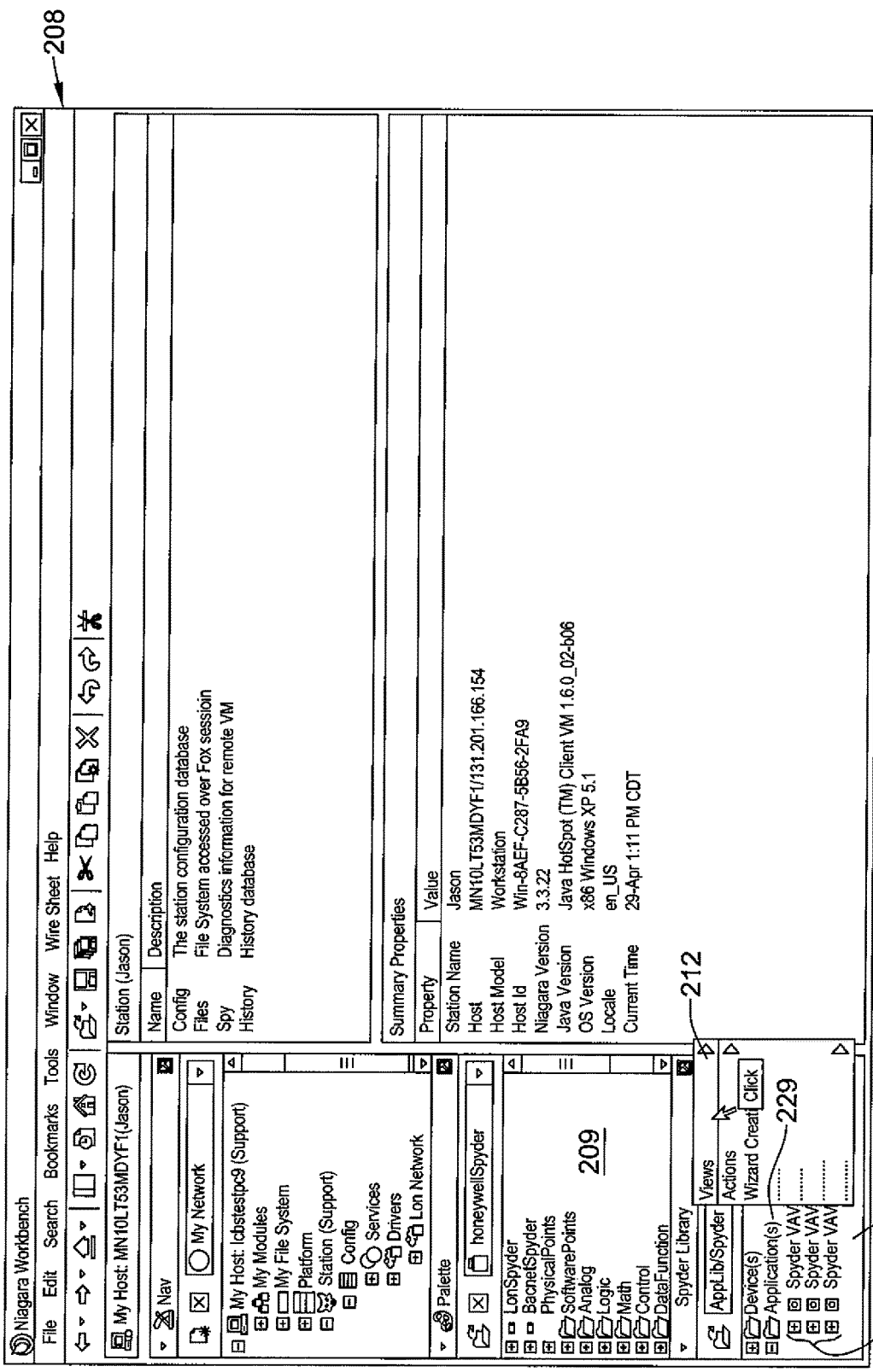
Figure 56:
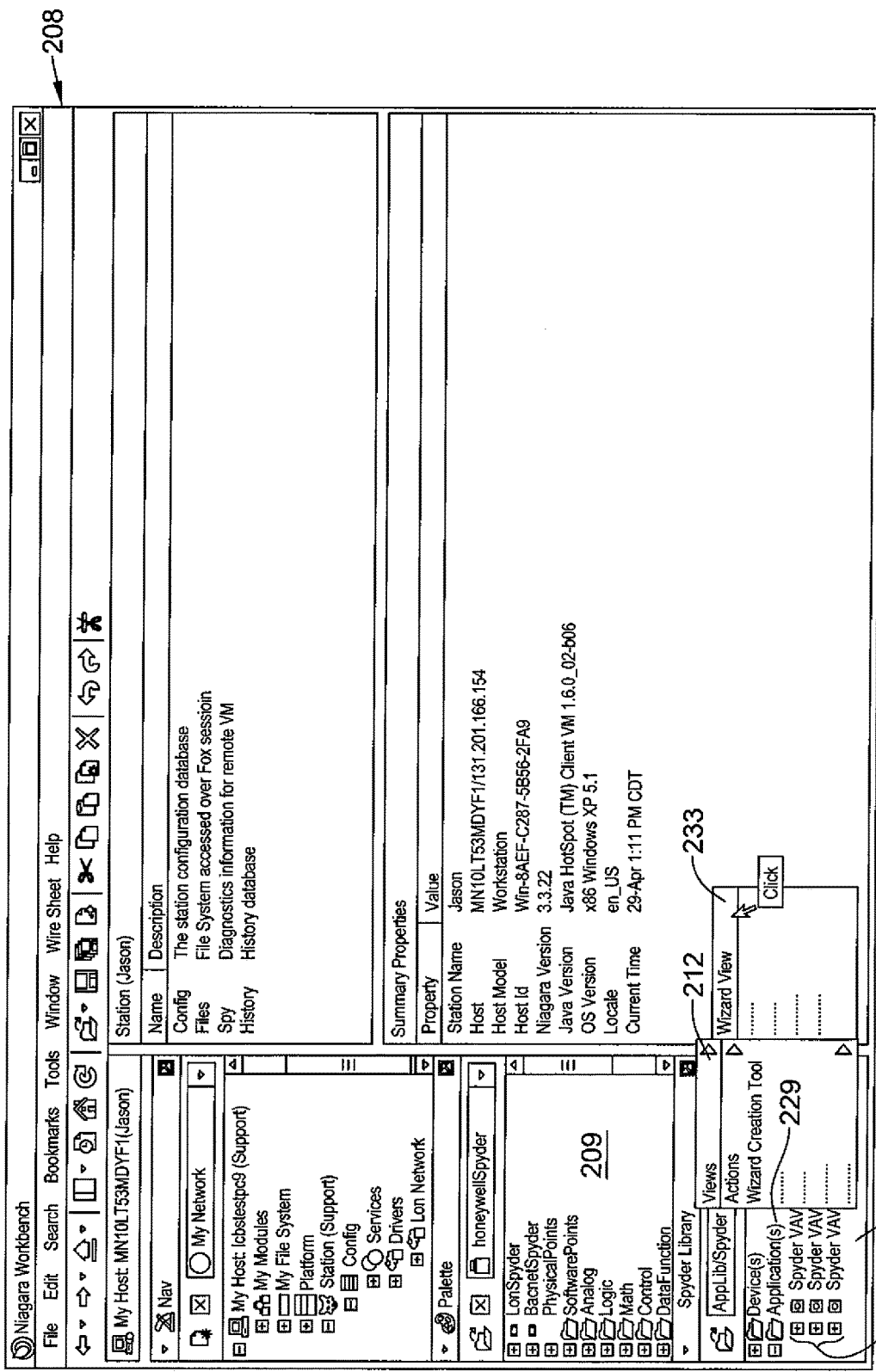
Figure 57:
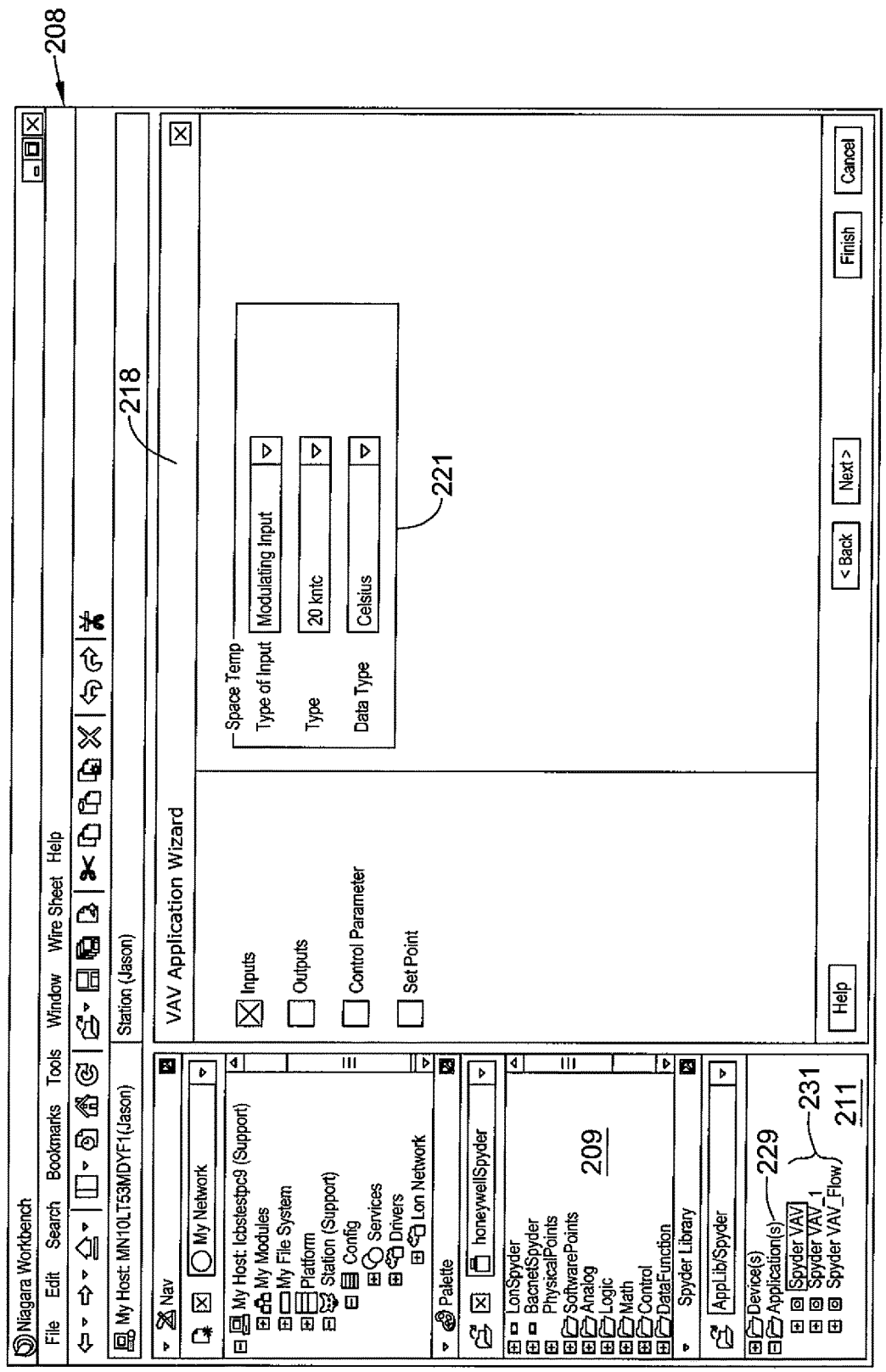

FIG. 51 may be a diagram of screen 208 like that in FIG. 46, where BACnet Spyder is selected in Palette 209. Application(s) 229 may be clicked in Spyder Library 211 resulting in a list 231 of Spyder VAV applications in FIG. 52. A right click on the first Spyder VAV application 232 in FIG. 53 may result in a views menu 212, as shown in FIG. 54, and be similar to menu 212 in FIG. 46. The views menu 212 may be clicked in FIG. 55 to result in a Wizard View menu 233 as shown in FIG. 56. Wizard View menu 233 may be clicked to result in an engineering mode in screen 208 of FIG. 57. Present in the engineering mode area is the VAV application wizard in box 218, which appeared to be present in the preview area 219 of FIG. 48, and saved to the library with a button 152 click. The VAV application wizard may later be retrieved with a click on menu 233 in FIG. 56 from the library to appear in FIG. 57.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A method for creating a wizard for a variable air volume (VAV) system, comprising:
    creating an application for the VAV system in a computer based programming tool and saved within a memory of a controller, the application operably coupled to and configured to control, at least in part, the VAV system;
    launching a utility for creating a VAV system wizard from the application, the utility displayed on a display;
    discovering parameters from the application which can be exposed to a user in the wizard, at least one parameter of the parameters being a control variable for the VAV system;
    obtaining a new template;
    selecting, using a user input, which discovered parameters are to be exposed to the user in the wizard;
    defining attributes including at least a data type, a limit or range for the selected parameters;
    creating two or more steps;
    re-ordering the two or more steps;
    assigning selected parameters to at least one of the two or more steps;
    rearranging the selected parameters under each step;
    defining rules;
    previewing the template; and
    saving the template as the wizard which is retrievable from a library in the application and configured to be displayed on a display and executed in response to a user input to configure one or more parameters of the VAV system; and
    wherein the utility is launchable from a work station, a building controller, and a multi-client operating system.

2. The method of claim 1, further comprising:
    launching a utility which opens the wizard for an application;
    customizing settings according to needs of the user;
    saving the settings; and
    loading the application to a controller.

3. The method of claim 1, further comprising:
    launching a workstation;
    dropping an application from the library to a worksheet upon which the wizard automatically appears;
    customizing settings;
    saving the settings; and
    loading the application to a controller.

4. The method of claim 3, wherein the customizing settings is according to needs of the user.

5. The method of claim 1, further comprising:
    launching a utility for using the wizard in a multi-client network operating system;
    importing the template into the multi-client network operating system upon which the wizard automatically appears;
    customizing settings; and
    saving the settings.

6. The method of claim 5, wherein the customizing settings is according to needs of the user.

7. The method of claim 1, wherein creating two or more steps comprises selecting at least one step from a standard block.

8. The method of claim 1, wherein defining rules comprises selecting rules from a library of rules.

\* \* \* \* \*